(12) United States Patent
Nakagawa

(10) Patent No.: US 8,134,668 B2
(45) Date of Patent: Mar. 13, 2012

(54) LIQUID CRYSTAL DISPLAY DEVICE AND PRODUCTION METHOD THEREOF

(75) Inventor: Hidetoshi Nakagawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 377 days.

(21) Appl. No.: 12/527,962

(22) PCT Filed: Nov. 2, 2007

(86) PCT No.: PCT/JP2007/071408
§ 371 (c)(1),
(2), (4) Date: Aug. 20, 2009

(87) PCT Pub. No.: WO2008/108032
PCT Pub. Date: Sep. 12, 2008

(65) Prior Publication Data
US 2010/0085524 A1    Apr. 8, 2010

(30) Foreign Application Priority Data
Mar. 5, 2007   (JP) ................................ 2007-054793

(51) Int. Cl.
*G02F 1/1337* (2006.01)
(52) U.S. Cl. ....................... 349/124; 349/129
(58) Field of Classification Search .................. 349/124, 349/129
See application file for complete search history.

(56) References Cited

U.S. PATENT DOCUMENTS

| | | | | |
|---|---|---|---|---|
| 7,581,203 B2 * | 8/2009 | Farrow et al. | ................... | 716/54 |
| 8,059,313 B2 * | 11/2011 | Nako | ........................ | 358/3.28 |
| 2003/0025864 A1 | 2/2003 | Chida et al. | | |
| 2003/0165749 A1 * | 9/2003 | Fritze et al. | ...................... | 430/5 |
| 2006/0227272 A1 | 10/2006 | Chida et al. | | |
| 2007/0285606 A1 | 12/2007 | Chida et al. | | |

(Continued)

FOREIGN PATENT DOCUMENTS
JP    2000-66235    3/2000
(Continued)

OTHER PUBLICATIONS

International Search Report for PCT/JP2007/071408 mailed Dec. 25, 2007.

*Primary Examiner* — James Dudek
(74) *Attorney, Agent, or Firm* — Nixon & Vanderhye, P.C.

(57) ABSTRACT

The present invention provides: a liquid crystal display device capable of improving display qualities and yield, the liquid crystal display device having two or more domains in a pixel through an alignment treatment that has been provided for a substrate over several times; and a production method thereof.

The present invention is a production method of a liquid crystal display device,
the liquid crystal display device including:
a pair of substrates facing each other;
a liquid crystal layer arranged between the pair of substrates;
an alignment film arranged on a liquid crystal layer-side surface of at least one of the pair of substrates; and
a pixel including two or more regions different in alignment direction,
the production method including
an exposure step of exposing a part of the alignment film using a photomask having a mask center part and a mask joint part,
the mask center part having a plurality of transmissive parts formed within a light-shielding region,
the mask joint part having a region where a plurality of transmissive parts are formed within a light-shielding region in a distribution density lower than a distribution density of the plurality of transmissive parts in the mask center part.

19 Claims, 25 Drawing Sheets

U.S. PATENT DOCUMENTS

| | | |
|---|---|---|
| 2008/0079852 A1* | 4/2008 | Nagaishi et al. ............... 348/739 |
| 2008/0291388 A1 | 11/2008 | Chida et al. |
| 2011/0091819 A1* | 4/2011 | Hagiwara ..................... 430/324 |

FOREIGN PATENT DOCUMENTS

| | | |
|---|---|---|
| JP | 2001-272667 | 10/2001 |
| JP | 2001-281669 | 10/2001 |
| JP | 2002-350858 | 12/2002 |
| JP | 2003-43492 | 2/2003 |
| WO | WO 03/052501 | 6/2003 |
| WO | WO 03/052502 | 6/2003 |
| WO | WO 2006/059693 | 6/2006 |
| WO | WO 2007/086474 | 8/2007 |

* cited by examiner (a)

(b)

LIQUID CRYSTAL DISPLAY DEVICE AND PRODUCTION METHOD THEREOF

This application is the U.S. national phase of International Application No. PCT/JP2007/071408, filed 2 Nov. 2007, which designated the U.S. and claims priority to Japan Application No. 2007-054793, filed 5 Mar. 2007, the entire contents of each of which are hereby incorporated by reference.

TECHNICAL FIELD

The present invention relates to a liquid crystal display device and a production method thereof. More particularly, the present invention relates to a matrix liquid crystal display device that includes a pixel having two or more domains and thereby provides high display qualities, and to a production method of such a device.

BACKGROUND ART

A liquid crystal display device is now being widely used in a TV, a monitor for PCs, a monitor for PDAs, and the like, because it is a display device with light weight, slim profile, and low electrical power consumption. According, to such a liquid crystal display device, a transmittance of light that passes through a liquid crystal layer is controlled by a tilt angle of a liquid crystal molecule, the tilt angle depending on a voltage applied between a pair of substrates (to the liquid crystal layer). So in the liquid crystal display device, the transmittance depends on a viewing angle. Accordingly, in conventional liquid crystal display devices, display defects are observed in some viewing directions. For example, a contrast ratio is reduced or gray-scale inversion occurs when an image is displayed in an intermediate gradation level. Accordingly, such conventional liquid crystal display devices generally have room for improvement in viewing angle characteristics.

An alignment division technology in which each pixel is divided into two or more regions different in tilt direction of liquid crystal molecules is now being researched and developed. According to this technology, the viewing angle characteristics can be improved by tilting the liquid crystal molecules in each pixel in different directions by applying a voltage to the liquid crystal layer. The respective regions which differ in the alignment direction of the liquid crystal molecules are also called domain. The alignment division is also called multi-domain.

As the multi-domain liquid crystal display devices, examples of horizontal alignment liquid crystal display devices include: a multi-domain TN (twist nematic) liquid crystal display device; a multi-domain ECB (electrically controlled birefringence) liquid crystal display device; and a multi-domain OCB (optically compensated birefringence) liquid crystal display device. In addition, examples of vertical alignment liquid crystal display devices include: a MVA (multi-domain vertical alignment) liquid crystal display device; a PVA (patterned vertical alignment) liquid crystal display device; and a multi-domain VAECB (vertical alignment electrically controlled birefringence) liquid crystal display device. These various liquid crystal display devices are now being further developed in order to show improved viewing angle characteristics.

A rubbing method, a photo-alignment method, and the like, are mentioned as a method for the alignment division. In the rubbing method, for example, an alignment film is rubbed, with a rubbing region and a non-rubbing region being separated from each other by a resist pattern. According to such a rubbing method, the alignment film surface is provided with the alignment treatment by being rubbed with a cloth wound on a roller. In this method, dusts such as a fiber of the cloth and rubbed scrapes are generated, and further, static electricity generated due to the fiber of the cloth might cause defects such as malfunction, a change in characteristics, and deterioration, of switching elements. In such a point, the rubbing method still has room for improvement.

In the photo-alignment method, a photo-alignment film is used as a material for the alignment film, and the photo-alignment film is exposed to light such as ultraviolet light, and thereby the alignment film is provided with an alignment regulating force and/or an alignment regulating direction of the alignment film is changed. Thus, in the photo-alignment method, the alignment film can be subjected to the alignment treatment in a contact-less manner, and so, soils, dusts, and the like that are generated by the alignment treatment can be reduced. In addition, in the photo-alignment method, by exposing the alignment film through a mask, desired regions in the alignment film plane can be photo-irradiated under different conditions. As a result, domains having a desirable design can be easily formed.

The following method is mentioned if one pixel is divided into two domains by the common photo-alignment method. Using a photomask where transmissive parts like slits each having a width about half of a pixel pitch are formed within a light-shielding region, a half region of the pixel is subjected to the 1st exposure, and the photomask is shifted by a half pixel pitch and then the rest region of the pixel is subjected to the 2nd exposure under conditions different from those in the 1st exposure. As a result of the 1st and 2nd exposure, each pixel can be easily divided into two or more domains. In addition, for example, Patent Document 1 discloses the following liquid crystal alignment film as a technology of providing a liquid crystal vertical alignment film that can provide multi-domain alignment without being rubbed, and a technology of providing a liquid crystal display device including such a film. The liquid crystal alignment film is composed of a thin film like a monomolecular film, and a molecule constituting the thin film has a fluorinated carbon group and a photosensitive group and is bonded and fixed to a substrate surface at an end part of the molecule constituting the thin film. Also the molecules constituting the thin film are aligned in a plurality of directions in a pattern per region of the thin film, and the molecules constituting the thin film are polymerized or cross-linked with themselves via the photosensitive groups. In addition, for example, Patent Document 2 discloses the following liquid crystal display device as a technology of stably aligning liquid crystals by a photo-alignment method and thereby achieving excellent display. The liquid crystal display device includes an alignment film composed of a mixture of polyamic acid including a diamine component and polyimide including a diamine component, the two diamine components being different, and this alignment film is irradiated with UV light, thereby being subjected to alignment treatment.

In addition, an increase in size of the liquid crystal display device is now rapidly proceeding. Liquid crystal TVs in 40 to 60-inch model are being rapidly developed, although plasma TVs have conventionally accounted for the greatest share of devices in such sizes. However, it is very difficult to provide a large liquid crystal display device such as a device in 60-inch model with alignment division by the above-mentioned conventional photo-alignment methods. The reason is given below. There is no exposure apparatus that can complete exposure for a substrate in 60-inch model through one exposure and can be placed at a plant, and so it is impossible to complete exposure for the entire substrate surface in 60-inch model through one exposure. Accordingly, the exposure for the substrate needs to be completed through several exposures, when a large liquid crystal display device is subjected to the alignment division by the photo-alignment method. In addition, when a relatively small liquid crystal display device in 20-inch model is subjected to the alignment division by the photo-alignment method, exposure for the substrate would be completed through several exposures if the exposure apparatus needs to be reduced in size as much as possible. However, in the liquid crystal display device including the substrate the exposure for which is completed through several exposures, a joint line between exposure regions might be clearly observed on a display screen, possibly resulting in inferior product. Accordingly, if the liquid crystal display device is subjected to the alignment division by completing the exposure for the substrate through several exposures, there is still room for improvement in display qualities and yield.

For example, Patent Document 3 discloses the following production method of a liquid crystal display device, as an exposure technology of pattern-forming a switching element, an electrode, and the like. The production method includes steps of: forming a resist film on a substrate on which a plurality of pixels are to be arranged; transferring a first mask pattern to a first region of the resist film by exposing the first region, which is a part of the resist film, through a first mask; transferring a second mask pattern to a second region of the resist film by exposing the second region, which partially overlaps with and is adjacent to the first region of the resist film, through a second mask, wherein the step of transferring the first mask pattern includes a step transferring the first mask pattern portion to one part of a pixel being in a position at an overlap exposure area, in which the first and the second areas are laid over each other, and the step of transferring the second mask pattern includes a step of transferring the second mask pattern to another part of the pixel.

[Patent Document 1]
  Japanese Kokai Publication No. 2001-281669
[Patent Document 2]
  Japanese Kokai Publication No. 2003-43492
[Patent Document 3]
  Japanese Kokai Publication No. 2000-66235

DISCLOSURE OF INVENTION

The present invention has been made in view of the above-mentioned state of the art. The present invention has an object to provide a liquid crystal display device capable of improving display qualities and yield, the liquid crystal display device having two or more domains in a pixel through an alignment treatment that has been provided for a substrate over several times. The present invention has an object to also provide a production method of such a device.

The present inventors made various investigations on a production method of a liquid crystal display device, capable of improving display qualities and yield even if the device includes a substrate that has been provided with alignment division by being exposed over several times. The inventors noted an embodiment where a substrate is exposed over several times. The inventors found the followings. Even if irradiation conditions are different between a center region and a peripheral region in the same exposure region, this difference continuously changes in the same plane, and a variation in display characteristics due to this difference is hardly perceived by human eyes. However, if irradiation conditions are different between adjacent exposure regions, the difference is perceived by human eyes as a joint line even though the difference is too small. Further, it is substantially impossible to exposure the respective regions of the substrate under completely the same conditions, even if the exposure is performed using an exposure apparatus and a photomask each having as high accuracy as possible.

The present inventors made further investigations and found the followings. The joint line is mainly generated due to the following differences between adjacent exposure regions in alignment of a photomask; an irradiation amount; an irradiation angle; a proximity gap, which is a distance between the mask and the substrate; and a polarization axis of polarized light; and a polarization degree of polarized light, in the case that polarized light is radiated. Among these differences, the difference in alignment of a photomask is most likely to occur. Even if a photomask is aligned with as high accuracy as possible in an exposure apparatus, a difference in alignment of the photomask is about ± several micrometers between adjacent exposure regions under the current level of technology.

The inventors also found the followings. The difference in the irradiation conditions between adjacent exposure regions leads to differences in luminance of a pixel and/or in a domain area ratio in a pixel opening, the differences discontinuously changing between the adjacent exposure regions. That is, the optical characteristics discontinuously change between the adjacent exposure regions, and so a luminance is discontinuous between the exposure regions particularly when a display screen is observed from an oblique direction. As a result, the boundary between the exposure regions is observed as the joint line. Further, the inventors found the followings. If the alignment film is exposed over several times using a photomask having a region where transmissive parts are arranged in a distribution density higher than that of transmissive parts in the center of the photomask, a sudden change of the luminance near the joint line can be suppressed. Thus, a liquid crystal display device and a production method thereof, each of which can improve display qualities and yield even if the substrate is provided with the alignment division treatment by being exposed over several times, can be provided. As a result, the above-mentioned problems have been admirably solved, leading to completion of the present invention.

That is, the present invention is a production method of a liquid crystal display device,
  the liquid crystal display device including:
  a pair of substrates facing each other;
  a liquid crystal layer arranged between the pair of substrates;
  an alignment film arranged on a liquid crystal layer-side surface of at least one of the pair of substrates; and
  a pixel including two or more regions different in alignment direction,
  the production method including
  an exposure step of exposing a part of the alignment film using a photomask having a mask center part and a mask joint part,
  the mask center part having a plurality of transmissive parts formed within a light-shielding region,
  the mask joint part having a region where a plurality of transmissive parts are formed within a light-shielding region in a distribution density lower than a distribution density of the plurality of transmissive parts in the mask center part.

The production method of the liquid crystal display device is mentioned below in detail.

The production method of the liquid crystal display device of the present invention includes an exposure step of exposing a part of the alignment film using a photomask having a mask center part and a mask joint part, the mask center part having a plurality of transmissive parts formed within a light-shielding region, the mask joint part having a region where a plurality of transmissive parts are formed within a light-shielding region in a distribution density lower than a distribution density of the plurality of transmissive parts in the mask center part. As a result, an embodiment in which a plane of the substrate (alignment film) is compartmentalized into some regions and the regions are separately exposed, more specifically, an embodiment in which a plane of the alignment film is compartmentalized into two or more exposure regions and a joint part (hereinafter, also referred to as a "joint exposure part") interposed between adjacent two exposure regions of the two or more exposure regions, the alignment film in one of the adjacent two exposure regions is exposed through the mask center part, and the alignment film in the joint exposure part is exposed through the mask joint part. That is, the mask joint part can face the joint exposure part and the mask center part can face the region (exposure region) except for the joint exposure part. So even if adjacent two exposure regions (hereinafter, also referred to as a "first exposure region" and a "second exposure region") are exposed under different irradiation conditions and as a result, a luminance and/or a domain area ratio in a pixel opening are/is different between pixels that are positioned in the first exposure region and pixels that are positioned in the second exposure region, the joint exposure part, which has been exposed through the mask joint part including the region where the transmissive parts are formed in a distribution density lower than a distribution density of the transmissive parts in the mask center part, includes both of pixels (hereinafter, also referred to as "first pixels") that exhibit optical characteristics equivalent to those of the pixels that are positioned in the first exposure region and pixels (hereinafter, also referred to as "second pixels") that exhibit optical characteristics equivalent to those of the pixels that are positioned in the second exposure region. In the joint exposure part, the first and second pixels are mixed. As a result, in the liquid crystal display device produced by the present invention, if two display regions corresponding to the first exposure region and the second exposure region have different luminances, a luminance in the display region corresponding to the joint exposure region is between the luminances of the two display regions. So the luminance does not suddenly change between the two display regions due to the display region corresponding to the joint exposure part. As a result, the liquid crystal display device can be improved in display qualities and yield. According to the production method of the present invention, the substrate can be exposed over several times using the above-mentioned photomask. Accordingly, even in a large liquid crystal display device, the entire substrate can be efficiently provided with alignment division treatment using an exposure apparatus in a normal size.

The above-mentioned alignment film is a photo-alignment film, and exposure is employed for providing such a photo-alignment film with alignment treatment. The alignment film is generally formed of a material (photo-alignment material) that can align liquid crystal molecules in directions different depending on a photo-irradiation direction or a moving direction of a photo-irradiation region.

It is preferable that the alignment film is arranged on liquid crystal layer side-surfaces of both of the pair of substrates in order to improve display qualities and responsivity of the liquid crystal display device.

In order to further exhibit the advantages of the present invention, it is preferable that each substrate including the alignment film on its liquid crystal layer side-surface is subjected to the above-mentioned exposure step.

The planar shape of the plurality of transmissive parts in the mask center part and the mask joint part is not especially limited. In order to provide pixels with alignment division efficiently and form the transmissive parts with accuracy, it is preferable that the planar shape is a substantially rectangular shape. In order to efficiently provide pixels arrayed in a matrix pattern with alignment division and to reduce production costs of the photomask, it is preferable in the photomask that a plurality of light-shielding parts are formed in a repeated pattern within the light-shielding region. It is more preferable in the photomask that a plurality of light-shielding parts having a substantially rectangular shape as viewed in plane are formed within the light-shielding region in a repeated pattern, and the repeated pattern is formed substantially from one end to the other of the photomask. That is, it is more preferable in the photomask that the plurality of transmissive parts are what is so-called slits and formed in what is so-called a stripe pattern. Accordingly, it is also more preferable that a plurality of slits are formed in a stripe pattern within the light-shielding region in the photomask, and the photomask has a mask center part where the plurality of slits are formed within the light-shielding region and a mask joint part having a region where the plurality of slits are formed in a distribution density lower than that of the slits in the mask center part. The repeated pattern is not especially limited to the stripe pattern, and may be a dot pattern, for example.

The term "distribution density" used herein means the number of transmissive parts per given area.

According to the production method of the liquid crystal display device of the present invention, it is preferable that the plurality of transmissive parts in the mask center part and the mask joint part have substantially the same planar shape and size, generally. If the photomask has a repeated pattern, it is preferable that the mask joint part has a region where the transmissive parts are formed in the same pattern as in the mask center part and the number of the transmissive parts is (appropriately) smaller than that in the mask center part. The distribution density of the transmissive parts in the mask center part of the above-mentioned photomask is substantially uniform, generally.

In the production method of the liquid crystal display device of the present invention, other steps are not especially limited as long as the above-mentioned exposure steps are included.

The liquid crystal display device produced by the present invention includes: a pair of substrates facing each other; a liquid crystal layer arranged between the pair of substrates; an alignment film arranged on a liquid crystal layer side-surface of at least one of the pair of substrates; and a pixel having two or more regions different in alignment direction. The liquid crystal display device produced by the production method of the present invention may or may not include other components as long as it essentially includes such common components a multi-domain matrix liquid crystal display device has.

The liquid crystal display device of the present invention is preferably an active matrix liquid crystal display device, but it may be a passive matrix liquid crystal display device.

In the present description, the regions which differ (different) in alignment direction are regions which differ (different) in tilt direction of a liquid crystal molecule included in the liquid crystal layer, the tilt direction depending on a voltage applied to the liquid crystal layer. The regions mean a so-called domain.

Preferred embodiments of the production method of the liquid crystal display device of the present invention are mentioned below in detail. Various embodiments mentioned below may be appropriately employed in combination.

It is preferable that the exposure step includes a step of exposing the alignment film as follows:

a plane of the alignment film is compartmentalized into two or more exposure regions and a joint part (hereinafter, also referred to as a "joint exposure part") interposed between adjacent two exposure regions of the two or more exposure regions, the alignment film in one of the adjacent two exposure regions is exposed through the mask center part, and the alignment film in the joint exposure part is exposed through the mask joint part. As a result, the advantages of the present invention are sufficiently exhibited, and the production method of the liquid crystal display device of the present invention can be more easily performed. In the production method of the liquid crystal display device of the present invention, the form of the compartment of the exposure region is not especially limited and it may be appropriately determined. For example, the substrate plane may be compartmentalized into just two, in a stripe pattern, or into four in a matrix pattern. The number of the exposure regions is not especially limited, and it may be appropriately determined.

Thus, it is preferable that in the exposure step, the alignment film is exposed through the mask joint part, which faces the joint exposure part interposed between the adjacent two exposure regions, and through the mask center part, which faces the region (exposure region) except for the joint exposure part. In addition, the exposure step may include a step of exposing the alignment film using the photomask having the mask joint part and the mask center part as follows: the alignment film plane is compartmentalized into two or more exposure regions and a joint exposure part interposed between adjacent two of the two or more exposure regions, and the alignment film in the joint exposure part and in one of the two or more exposure regions is simultaneously exposed through the mask joint part and the mask center part, respectively.

It is preferable that the exposure step includes a step of exposing the alignment film using a plurality of the photomasks, the alignment film in a first exposure region of the adjacent two exposure regions and in the joint exposure region is exposed through a first photomask of the plurality of the photomasks, the alignment film in a second exposure region of the adjacent two exposure regions and in the joint exposure region is exposed through a second photomask of the plurality of the photomasks, the plurality of transmissive parts are formed in the mask joint parts in the first and second photomasks in such a way that the plurality of transmissive parts in the mask joint part of the first photomask face a pixel group and the plurality of transmissive parts in the mask joint part of the second photomask face another pixel group, the two pixel groups satisfying a mutually complementary arrangement relationship. As a result, every pixel region in the joint exposure part can be exposed. According to this embodiment, the plurality of different photomasks may be the same in an arrangement form (pattern) of the transmissive parts as long as the number of the photomasks is two or more. Similarly, the first photomask and the second photomask may have the same arrangement form (pattern) of the transmissive parts. In this embodiment, it is preferable that in any pair of two photomasks used for exposing adjacent two exposure region, the plurality of transmissive parts are formed in the mask joint parts in such a way that the plurality of transmissive parts in the mask joint part of one photomask face a pixel group and the plurality of transmissive parts in the mask joint part of the other photomask face another pixel group, the two pixel groups satisfying a mutually complementary arrangement relationship. As a specific example of the embodiment in which the plurality of different photomasks are the same in an arrangement form (pattern) of the transmissive parts, the below-mentioned embodiment in which in the mask joint part, the plurality of transmissive parts and the light-shielding region are arranged in such a way that the plurality of transmissive parts face a pixel group and the light-shielding region faces another pixel group, the two pixel groups being arranged symmetrically with respect to a center line of the mask joint part is preferable. According to the production method of the liquid crystal display device of the present invention, generally, each pixel is divided into domains by exposing the alignment film that is arranged on the substrate several times through one photomask.

Thus, the present invention may be the following production method of a liquid crystal display device.

A production method of a liquid crystal display device, the liquid crystal display device including:

a pair of substrates facing each other;

a liquid crystal layer arranged between the pair of substrates;

an alignment film arranged on a liquid crystal layer-side surface of at least one of the pair of substrates; and a pixel including two or more regions different in alignment direction, wherein the production method includes an exposure step of exposing the alignment film as follows:

a plane of the alignment film is compartmentalized into adjacent first and second exposure regions, and a joint exposure part interposed between the first and second exposure regions, the exposure step includes a first exposure step and a second exposure step, in the first exposure step, the alignment film in the first exposure region and the joint exposure part is exposed through a first photomask including a plurality of transmissive parts formed within a light-shielding region;

in the second exposure step, the alignment film in the second exposure region and the joint exposure part is exposed through a second photomask including a plurality of transmissive parts formed within a light-shielding region, the first and second photomasks have a mask joint part that faces the joint exposure region and a mask center part that faces the first or second exposure region, (the first photomask has a mask joint part that faces the joint exposure part and, a mask center part that faces the first exposure region, the second photomask has a mask joint part that faces the joint exposure part and a mask center part that faces the second exposure region,)

in each of the first and second photomasks, a distribution density of the transmissive parts in the mask joint part is lower than a distribution density of the transmissive parts in the mask center part, in the first and second photomasks, the plurality of transmissive parts are formed in the mask joint parts in the first and second photomasks in such a way that the plurality of transmissive parts in the mask joint part of the first photomask face a pixel group and the plurality of transmissive parts in the mask joint part of the second photomask face another pixel group, the two pixel groups satisfying a mutually complementary arrangement relationship, the first exposure step includes the following two steps of:

exposing the alignment film in a part of a pixel positioned in the first exposure region through (the mask center part of)

the first photomask and the alignment film in a part of a the first pixel positioned in the joint exposure part through (the mask joint part) the first photomask; and exposing the alignment film in the other or another part of the pixel positioned in the first exposure region through (the mask center part of) the first photomask and the alignment film in the other or another part of the first pixel through (the mask joint part of) the first photomask, the second exposure step includes the following two steps of:

exposing the alignment film in a part of a pixel positioned in the second exposure region through (the mask center part of) the second photomask and the alignment film in a part of a second pixel, which is different from the first pixel, positioned in the joint exposure part through (the mask joint part of) the second photomask; and exposing the alignment film in the other or another part of the pixel positioned in the second exposure region through (the mask center part of) the second photomask and the alignment film in the other or another part of the second pixel through (the mask joint part) of the second photomask.

In the present invention, the number of the photomasks that can be used in the exposure step is not especially limited, and may be appropriately determined in view of a size of the substrate, the exposure apparatus, and the photomask, the exposure way, and the like.

It is preferable that the exposure step is performed by scanning exposure or shot exposure. That is, it is preferable in the exposure step that the alignment film is exposed by moving at least one of the substrate and a light source (scanning exposure) or that the alignment film is exposed, with the substrate and a light source being fixed (shot exposure). According to the scanning exposure, a stable amount of light is radiated to the substrate plane and so a variation in characteristics of the alignment film such as an alignment direction and a pretilt angle can be effectively suppressed. Further, a small exposure apparatus is enough for the scanning exposure and so apparatus costs can be reduced. In addition, even if the photomask has a defect or it is damaged, costs on replacement of the photomask are low. In the scanning exposure, if another panel that is different in pitch of the transmissive parts is arranged in the scanning direction, the photomask needs to be replaced with another one suitable for the panel. In contrast, according to the shot exposure, various kinds of panels can be exposed in one shot using a photomask including patterns for the various kinds of panels. In the scanning exposure, if the light source is moved, the light source and the photomask are generally moved together.

It is preferable that the distribution density of the plurality of transmissive parts in the mask joint part is half of the distribution density of the plurality of transmissive parts in the mask center part. As a result, even if the luminance is different between the two display regions corresponding to the first and second exposure regions, the first pixels and the second pixels can be mixed in the display region corresponding to the joint exposure part on about 50:50 basis. Accordingly, the two display regions corresponding to the first and second exposure regions can be connected to each other by the display region corresponding to the joint exposure part where the luminance is almost intermediate between luminances of the two display regions. As a result, the joint line on the display screen becomes hard to perceive.

The term "half" used herein does not necessarily mean "just half" but may mean "substantially half" as long as the advantages of the present invention are exhibited.

In the photomask, the mask joint part has a region where the distribution density of the plurality of transmissive parts decreases with increasing distance from the mask center part. As a result, even if the luminance is different between the two display regions corresponding to the first and second exposure regions, the first and second pixels can be mixed in the display region corresponding to the joint exposure part in such a way that distribution densities each of the first and second pixels gradually change. Accordingly, the two display regions corresponding to the first and second display regions can be connected to each other by the display region corresponding to the joint exposure part where the luminance is almost intermediate between luminances of the two display regions and gradually changes. As a result, the joint line on the display screen becomes harder to perceive. Thus, it is also preferable that the mask joint part has a region where the distribution density of the transmissive parts monotonically decreases with increasing distance from the mask center part.

It is preferable that the mask joint part has a region where the number of the plurality of transmissive parts decreases at a constant rate with increasing distance from the mask center part. That is, it is preferable that the mask joint part has a region where the distribution density of the plurality of transmissive parts linearly decreases with increasing distance from the mask center part. As a result, even if the luminance is different between the two display regions corresponding to the first and second exposure regions, the first pixels and the second pixels can be mixed in the display region corresponding to the joint exposure part in such a way that the distribution densities each of the first and second pixels smoothly change. Accordingly, the two display regions corresponding to the first and second display regions can be connected to each other by the joint exposure part where the luminance is almost intermediate between luminances of the two display regions and smoothly changes. As a result, the joint line on the display screen is substantially not perceived.

According to the embodiment in which the distribution density of the plurality of transmissive parts linearly changes, the rate of change in the distribution density of the plurality of transmissive parts is not especially limited, and may be appropriately determined. That is, the mask joint part may have a region where the number of the plurality of transmissive parts per given area decreases by any natural number with increasing distance from the mask center part. It is particularly preferable that the mask joint part has a region where the number of the plurality of transmissive parts per given area decreases by one with increasing distance from the mask center part. As a result, even if the luminance is different between the two display regions corresponding to the first and second exposure regions, the luminance can more smoothly change between the two display regions due to the display region corresponding to the joint exposure part. As a result, the joint line on the display screen becomes much harder to perceive.

In the present description, the term "given area" generally have a value that is an integral multiple of an area of a plurality of pixels, picture elements, or sub-pixels, and may be given region, range, partition, or block.

It is preferable that in the mask joint part, the number of the plurality of transmissive parts per given area decreases by one with increasing distance from the mask center part. As a result, even if the luminance is difference between the two display regions corresponding to the first and second exposure regions, the luminance can still more smoothly change between the two display regions due to the display region corresponding to the joint exposure part. As a result, the joint line on the display screen becomes much more harder to perceive.

It is preferable that the plurality of transmissive parts are evenly distributed in the region where the number of the plurality of transmissive parts per given area decreases by one with increasing distance from the mask center part. As a result, the distribution density of the slits can substantially linearly change in the mask joint part. Accordingly, even if the luminance is difference between the two display regions corresponding to the first and second exposure regions, the luminance still more smoothly changes between the two regions due to the display region corresponding to the joint exposure part. As a result, the joint line on the display screen becomes much more harder to perceive.

The term "evenly" used herein does not necessarily mean "completely evenly" and may mean "substantially evenly" as long as the advantages of the present invention are exhibited.

In addition, the photomask may have, in the center of the region where the number of the plurality of transmissive parts per given area decreases by one with increasing distance from the mask center part, a region where the plurality of transmissive parts are formed in a distribution density half of the distribution density of the plurality of transmissive parts in the mask center part. In addition, the photomask may have, in the region where the number of the plurality of transmissive parts per given area decreases by one with increasing distance from the mask center part, an additional region where the plurality of transmissive parts are formed in a distribution density that is between distribution densities of the plurality of transmissive parts in two given areas adjacent to the additional region. As a result, even if it is difficult to decrease the number of the plurality of transmissive parts per given area by one in the entire mask joint part, the luminance can relatively smoothly change between the two display regions corresponding to the first and second exposure regions due to the display region corresponding to the joint exposure part.

The term "center" used herein does not necessarily mean just center but may be substantially center as long as the advantages of the present invention are exhibited.

In the mask joint part, the plurality of transmissive parts and the light-shielding region are arranged
in such a way that the plurality of transmissive parts face a pixel group and the light-shielding region faces another pixel group,
the two pixel groups being arranged symmetrically with respect to a center line of the mask joint part. Also in this embodiment, the joint line is not perceived.

It is preferable that the liquid crystal display device includes a plurality of the pixels, in the exposure step, the alignment film is exposed so that each pixel includes two regions different in an alignment direction of liquid crystal molecules near a surface of the alignment film when the pair of substrates are viewed in plane, and
the alignment direction in one region is parallel and opposite to the alignment direction in the other region. In this case, wide viewing angle liquid crystal display devices such as a multi-domain TN liquid crystal display device, a multi-domain SOB liquid crystal display device, a multi-domain VAECB (vertical alignment electrically controlled birefringence) liquid crystal display device, a multi-domain VAHAN (vertical alignment hybrid-aligned nematic) liquid crystal display device, and a multi-domain VATN (vertical alignment twisted nematic) liquid crystal display device can be easily produced. In the present description, the "near a surface of the alignment film" is preferably the alignment film surface.

It is preferable that the alignment film is arranged on each of the pair of substrates,
the production method includes:
exposure of the alignment films; and
attachment of the pair of substrates,
each performed so that
in each substrate, liquid crystal molecules near a surface of the alignment film in each pixel are aligned in two parallel and opposite directions when the pair of substrates are viewed in plane, and
an alignment direction of liquid crystal molecules near a surface of the alignment film on one of the pair of substrates is perpendicular to an alignment direction of liquid crystal molecules near a surface of the alignment film on the other substrate when the pair of substrates are viewed in plane. As a result, one pixel is divided into four domains, easily. Accordingly, the viewing angle can be increased in four directions perpendicular to each other, i.e., upper, lower, right, and left directions. The four domains are excellent in symmetric property and so viewing angle characteristics in the four directions can be the same. As a result, the liquid crystal display device shows display characteristics without viewing angle dependence.

The term "perpendicular" used herein does not always means "perfectly perpendicular" and it may means "substantially perpendicular" to such an extent that the advantages of the present invention are exhibited. Specifically, it is preferable that the liquid crystal molecules on the alignment film surface of one substrate and those on the alignment film surface of the other substrate are aligned perpendicular to each other to such an extent that images can be displayed in VATN mode.

Further, it is preferable that the liquid crystal layer includes liquid crystal molecules with negative dielectric anisotropy, and the alignment film aligns the liquid crystal molecules nearly vertically to a surface of the alignment film when no voltage is applied to the liquid crystal layer (vertical alignment film). According to this embodiment, a VA liquid crystal display device can be produced.

The term "nearly vertically" used herein means "vertically" to such an extent that the advantages of the present invention are exhibited. Specifically, it is preferable that the liquid crystal molecules are aligned vertically to such an extent that images can be displayed in VAIN mode. More specifically, it is preferable that the liquid crystal molecules are aligned in such a way that an angle made by a long axis of the molecule and the normal direction of the alignment film surface is about 0.1° to 5°.

Alternatively, it is preferable that the liquid crystal layer includes liquid crystal molecules with positive dielectric anisotropy, and the alignment film aligns the liquid crystal molecules nearly horizontally to a surface of the alignment film when no voltage is applied to the liquid crystal layer (horizontal alignment film). According to this embodiment, a horizontal alignment liquid crystal display device can be produced.

The term "nearly horizontally" used herein means "horizontally" to such an extent that the advantages of the present invention are exhibited. Specifically, it is preferable that the liquid crystal molecules are aligned horizontally to such an extent that images can be displayed in TN mode.

The present invention is also a liquid crystal display device produced by the production method of the liquid crystal display device of the present invention. In the liquid crystal display device produced by the production method of the present invention, the first pixels and the second pixels are mixed in the display region corresponding to the joint exposure part. So even if the first and second exposure regions that are adjacent to each other are exposed under different irradiation conditions and, between pixels that are positioned in the first exposure region and pixels that are positioned in the second exposure region, a luminance and/or domain area ratio in a pixel opening are/is different, and as a result, two display regions corresponding to the first and second exposure regions have different luminances, the luminance does not so suddenly change between the first exposure region and the second exposure region, due to the display region corresponding to the joint exposure part. As a result, the liquid crystal display device including two or more domains in a pixel through alignment treatment that has been provided for the substrate over several times can exhibit excellent display qualities.

Such a liquid crystal display device having a region where the first pixels and the second pixels are mixed is mentioned, as one embodiment of the present invention. That is, the present invention is a liquid crystal display device including:

a pair of substrates facing each other;

a liquid crystal layer arranged between the pair of substrates;

an alignment film arranged on a liquid crystal layer-side surface of at least one of the pair of substrates; and a pixel including two or more regions different in alignment direction, wherein the liquid crystal display device has adjacent first and second display regions, and a joint display region interposed between the first and second display regions, a plurality of first pixels are arrayed in the first display region, a plurality of second pixels are arrayed in the second display region, the plurality of second pixels being different from the plurality of first pixels in at least one of a luminance and an area ratio of the two or more regions different in alignment direction in each pixel opening, and in the joint display region, the plurality of first pixels and the plurality of second pixels are arrayed and mixed.

The liquid crystal display device of the present invention is mentioned below.

The liquid crystal display device of the present invention includes: a pair of substrates facing each other; a liquid crystal layer arranged between the pair of substrates; an alignment film arranged on a liquid crystal layer side-surface of at least one of the pair of substrates; and a pixel including two or more regions (domains) different in alignment direction. Accordingly, the liquid crystal display device of the present invention shows excellent viewing angle characteristics and it is preferably used as a multi-domain matrix liquid crystal display device.

The liquid crystal display device of the present invention is preferably an active matrix liquid crystal display device, but it may be a passive matrix liquid crystal display device.

The liquid crystal display device has adjacent first and second display regions, and a joint display region interposed between the first and second display regions, a plurality of first pixels are arrayed in the first display region, a plurality of second pixels are arrayed in the second display region, the plurality of second pixels being different from the plurality of first pixels in at least one of a luminance and an area ratio of the two or more regions different in alignment direction in each pixel opening. Thus, according to the liquid crystal display device of the present invention, optical characteristics of the pixels are different between the adjacent first and second display regions, and so the luminance might be different between the first and second display regions in some viewing directions The term "pixel opening" used herein means an opening in a pixel (a region that transmits light of a pixel). Each pixel generally includes the opening and a light-shielding region, which is formed along the contour of the opening. The light-shielding region is a region light-shielded by a light-shielding member.

In the present description, the pixel is the minimum unit constituting a display image. According to a monochrome active matrix liquid crystal display device, the pixel is a region determined by a pixel electrode and a common electrode facing the pixel electrode. According to a color active matrix liquid crystal display device, the pixel is generally a region composed of picture elements of a plurality of colors (for example, three colors). The picture element is a region of a single color, constituting the pixel. The picture element is generally a region determined by a pixel electrode and a common electrode facing the pixel electrode. The picture element may have a plurality of driving elements (for example, TFTs) and a plurality of pixel electrodes that are connected to each of the plurality of driving elements. That is, the picture element may be further divided into a plurality of sub-pixels. The sub-pixel is a region determined by one pixel electrode and a common electrode facing the pixel electrode, in the picture element. Accordingly, if the liquid crystal display device of the present invention and the production method of the liquid crystal display device of the present invention are applied to a color active matrix liquid crystal display device and a production method thereof, the pixel may be the picture element or the sub-pixel. In a common color active matrix liquid crystal display device, each pixel is generally composed of picture elements of three colors of red, blue, and green. In the liquid crystal display device of the present invention, the kind and number of colors of picture elements constituting each pixel are not especially limited and may be appropriately determined. That is, in the liquid crystal display device of the present invention, each pixel may be composed of picture elements of three colors of cyan, magenta, and yellow, or picture elements of four or more colors. Further, in a passive matrix liquid crystal display device, the pixel is generally a region determined by an intersection of the signal electrodes and the scanning electrodes, arranged in a stripe pattern.

In the joint display region, the first pixels and the second pixels are arrayed and mixed. The first pixels have optical characteristics equal to those of the pixels that are positioned in the first display region and the second pixels have optical characteristics equal to those of the pixels that are positioned in the second display region, and in the joint display region, the first and second pixels are mixed. So the joint display region has a luminance that is almost intermediate between of the first and second display regions. Accordingly, the luminance does not suddenly change between the first display region and the second display region due to the joint exposure region. As a result, the display qualities and the yield can be improved.

The liquid crystal display device of the present invention may or may not include other components as long as it essentially includes such components. The configuration of the liquid crystal display device of the present invention is not especially limited.

The method for producing the liquid crystal display device of the present invention is not especially limited, but the above-mentioned production method of the liquid crystal display device of the present invention is preferable. The liquid crystal display device of the present invention can be more easily produced by the above-mentioned production method. In this case, it is preferable that the liquid crystal display device of the present invention includes a photo-alignment film as the alignment film, and exposure is employed as an alignment treatment for such a photo-alignment film. It is also preferable that the alignment film is formed of a material (photo-alignment material) that can align liquid crystal molecules in directions different depending on a photo-irradiation direction or a moving direction of a photo-irradiation region. In addition, the first and second display regions in the liquid crystal display device of the present invention correspond to the adjacent exposure regions (the first exposure region and the second exposure region) in the production method of the liquid crystal display device of the present invention; and the joint display region in the liquid crystal display device of the present invention corresponds to the joint exposure region in the production method of the liquid crystal display device of the present invention.

Preferable embodiments of the liquid crystal display device of the present invention are mentioned below in detail. Various embodiments mentioned below may be appropriately combined.

It is preferable that the joint display region has a region where the plurality of first pixels and the plurality of second pixels are alternately arrayed. According to this embodiment, in the joint display region, the first pixels and the second pixels are mixed on about 50:50 basis. Accordingly, the joint display region where the luminance is almost intermediate between luminances of the first and second display regions connects the first and second display regions to each other. As a result, the joint line on the display screen becomes hard to perceive.

The joint display region may include a region where a distribution density of the plurality of first pixels decreases with increasing distance from the first display region. As a result, in the joint display region, both of the first pixels and the second pixels can be mixed in such a way that the distribution densities each of the first and second pixels gradually change. Accordingly, the first and second display regions are connected to each other by the joint display region where the luminance is almost intermediate between luminances of the first and second display regions and gradually changes. As a result, the joint line on the display screen becomes much harder to perceive. Thus, it is also preferable that the joint display region has a region where the distribution density of the first pixels monotonically decreases with increasing distance from the first display region.

It is preferable that the joint display region has a region where the distribution density of the plurality of first pixels and a distribution density of the plurality of second pixels each linearly change. As a result, the first pixels and the second pixels can be mixed in the joint display region in such a way that each distribution density of the first and second pixels smoothly changes. Accordingly, the first and second display regions are connected to each other by the joint display region where the luminance is almost intermediate between luminances of the first and second display regions and smoothly changes. As a result, the joint line on the display screen is substantially not perceived.

It is preferable that the joint display region has a region where the number of the plurality of first pixels per given area and the number of the plurality of second pixels per given area each change by one. As a result, the luminance between the first display region and the second display region can more smoothly change due to the joint display region. As a result, the joint line on the screen becomes much harder to perceive.

It is preferable that in the joint display region, the number of the plurality of first pixels per given area and the number of the plurality of second pixels per given area each change by one. As a result, the luminance can much more smoothly change between the first display region and the second display region due to the joint display region. As a result, the joint line on the display screen becomes much more harder to perceive.

It is preferable that the plurality of first pixels or the plurality of second pixels are evenly distributed in the region where the number of the plurality of first pixels per given area and the number of the plurality of second pixels per given area each change by one. As a result, the luminance can much more smoothly change between the first display region and the second display region due to the joint display region. As a result, the joint line on the display screen becomes much more harder to perceive.

It is preferable that the liquid crystal display device has, in the center of the region where the distribution density of the plurality of first pixels and the distribution density of the plurality of second pixels each change by one, a region where the plurality of first pixels and the plurality of second pixels are alternately arrayed. In addition, the liquid crystal display device may have, in the region where the number of the plurality of first pixels per given area and the number of the plurality of second pixels per given area each change by one, an additional region where the plurality of first pixels and the plurality of second pixels are arrayed in such a way that the distribution density of the plurality of first pixels is between distribution densities of the plurality of first pixels in two given areas adjacent to the additional region. Even if it is difficult to change the numbers each of the first and second pixels per given area by one in the entire joint display region, the luminance can relatively smoothly change between the first and second display regions due to the joint display region.

In the joint display region, the plurality of first pixels and the plurality of second pixels are arranged symmetrically with respect to a center line of the joint display region. As a result, the joint line on the display screen is not perceived.

Further, it is preferable that the liquid crystal layer includes liquid crystal molecules with negative dielectric anisotropy,
the alignment film is arranged on each of the pair of substrates, and
the alignment films align the liquid crystal molecules nearly vertically to surfaces of the alignment films when no voltage is applied to the liquid crystal layer (vertical alignment film). As a result, a vertical alignment liquid crystal display device can be produced.

The liquid crystal layer includes liquid crystal molecules with positive dielectric anisotropy,
the alignment film is arranged on each of the pair of substrates, and
the alignment films align the liquid crystal molecules nearly horizontally to surfaces of the alignment films when no voltage is applied to the liquid crystal layer (horizontal alignment film). As a result, a horizontal alignment liquid crystal display device can be produced.

It is preferable that the pixel includes four or less regions different in alignment direction, and it is more preferable that the pixel includes four regions different in alignment direction. According to this, the production steps can be suppressed from being complicated, and further the liquid crystal display device can be excellent in viewing angle characteristics. If the pixel includes two domains, the viewing angle characteristics in one of the upper-lower direction and the right-left direction can be improved, but those in the other direction is difficult to improve. In contrast, if the pixel includes four domains, the viewing angle characteristics in four directions perpendicular to each other, i.e., upper, lower, right, and left directions, can be all improved. Additionally, the viewing angle characteristics in the four directions can be almost uniform, i.e., the viewing angle characteristics excellent in symmetric property can be produced. As a result, the liquid crystal display device shows display characteristics free from viewing angle dependency. The pattern in which the four domains are arranged is not especially limited, and a matrix pattern, a horizontal-stripe pattern may be mentioned. One pixel region may include four or more domains, but it complicates production processes and increases the time for alignment treatment. Further, it has been known that the viewing angle characteristics are not so different practically between the four-domain alignment division and five or more-domain alignment division.

That is, it is preferable that an alignment direction of the liquid crystal molecules near a surface of the alignment film on one of the pair of substrates is perpendicular to an alignment direction of the liquid crystal molecules near a surface of the alignment film on the other substrate when the pair of substrates are viewed in plane. As a result, a multi-domain TN or multi-domain VATN liquid crystal display device can be produced. According to the VATN (vertical alignment twisted nematic) liquid crystal display device, liquid crystal molecules are vertically aligned and form a twist structure when no voltage is applied to a liquid crystal layer due to vertical alignment films that are arranged on substrates, respectively, in such a way that their alignment treatment directions are substantially perpendicular to each other when the substrates are viewed in plane.

EFFECT OF THE INVENTION

The liquid crystal display device and the production method thereof of the present invention provide a liquid crystal display device capable of improving display qualities and yield, the liquid crystal display device having two or more domains in a pixel through an alignment treatment that has been provided for a substrate over several times.

BEST MODES FOR CARRYING OUT THE INVENTION

The present invention is mentioned in more detail below with reference to Embodiments using drawings, but not limited to only these Embodiments.

Embodiment 1

A configuration of a liquid crystal display device in accordance with Embodiment 1 is mentioned first. FIG. 1 is a cross-sectional view schematically showing the configuration of the liquid crystal display device in accordance with Embodiment 1. As shown in FIG. 1, a liquid crystal display panel 100 in the present Embodiment includes: a pair of substrates facing each other, i.e., a first substrate 1 (e.g., a TFT array substrate) and a second substrate 2 (e.g., a CF substrate); and a liquid crystal layer 3 interposed between the first substrate 1 and the second substrate 2. The first substrate 1 includes a transparent electrode (pixel electrode) 4a and a vertical alignment film 5a on a liquid crystal layer 3 side-surface of an insulating substrate 26a in this order toward the liquid crystal layer 3. The transparent electrode 4a applies a driving voltage to the liquid crystal layer 3. Similarly, the second substrate 2 includes a transparent electrode (common electrode) 4b and a vertical alignment film 5b on a liquid crystal layer 3 side-surface of an insulating substrate 26b in this order toward the liquid crystal layer 3. The transparent electrode 4b applies a driving voltage to the liquid crystal layer 3. A retarder 7a and a polarization plate 6a are arranged in this order on a surface on the side opposite to the liquid crystal layer 3 side of the first substrate 1. A retarder 7b and a polarization plate 6b are arranged in this order on a surface on the side opposite to the liquid crystal layer 3 side of the second substrate 2. The retarders 7a and 7b may not be arranged, but preferably arranged in view of wide viewing angle. Only one of the retarders 7a and 7b may be arranged. Thus, the liquid crystal display device 100 includes a so-called liquid crystal display panel.

The liquid crystal layer 3 includes a nematic liquid crystal material with negative dielectric anisotropy (negative nematic liquid crystal material), for example. Liquid crystal molecules in the liquid crystal layer 3 are aligned substantially vertically to the surfaces of the vertical alignment films 5a and 5b when no driving voltage is applied to the liquid crystal layer 3 (during non-voltage application). In fact, the liquid crystal molecules are aligned to have a small pretilt angle of about 0.1 degrees to several degrees with respect to the normal direction of the surfaces of the vertical alignment films 5a and 5b. That is, the vertical alignment films 5a and 5b provide the liquid crystal molecules with a small pretilt angle. The term "pretilt angle" used herein means an angle made by a substrate surface and a long axis direction of a liquid crystal molecule that is positioned near the alignment film surfaces, when no voltage is applied. As the substrates are viewed in plane, a direction where the liquid crystal molecule that is positioned near the alignment film surfaces is tilted when no voltage is applied is a pretilt direction. When a sufficient driving voltage not smaller than a certain threshold value is applied to the liquid crystal layer 3 (during voltage application), the liquid crystal molecules are further tilted in a direction in accordance with a predetermined pretilt angle. More specifically, a liquid crystal molecule 3a, which is positioned at substantially the center in the thickness direction of the liquid crystal layer 3, is tilted substantially parallel to surfaces of the first substrate 1 and the second substrate 2. The vertical alignment films 5a and 5b are formed of a photo-alignment material. The pretilt directions which the vertical alignment films 5a and 5b regulate are determined by exposing surfaces of the vertical alignment films 5a and 5b through a photomask, for example, from a direction oblique to the substrate surface.

FIG. 2 is a plan view schematically showing a direction of photo-irradiation to the vertical alignment film in each picture element in the liquid crystal display device in accordance with Embodiment 1. FIG. 2(a) shows the first substrate. FIG. 2(b) shows the second substrate. FIG. 3 is a plan view schematically showing: a direction of photo-irradiation to the vertical alignment film; an alignment direction of a liquid crystal molecule when a voltage is applied; and a direction of a polarization axis of a polarization plate, in each picture element in the liquid crystal display device in accordance with Embodiment 1. In FIGS. 2 and 3, the dotted arrow shows a direction of photo-irradiation to the first substrate and the solid arrow shows a direction of photo-irradiation to the second substrate. FIG. 3 shows a liquid crystal molecule 3a, which is positioned at substantially the center in the thickness direction of the liquid crystal layer and in each domain when the substrates are viewed in plane.

As shown in FIG. 2, in a picture element 8, the vertical alignment films 5a and 5b are exposed from directions (A and B) that are opposite and parallel to each other as the substrates are viewed in plane. The directions of the photo-irradiation to the vertical alignment films 5a and 5b are set to be different from each other by about 90° when the first substrate 1 is attached to the second substrate 2, as shown in FIGS. 2 and 3. As a result, a pretilt direction which the vertical alignment film 5a regulates and a pretilt direction which the vertical alignment film 5b regulates are different from each other by about 90° in each domain. Accordingly, in each domain, the liquid crystal molecules are twisted about 90° as the substrates are viewed in plane. In addition, the liquid crystal molecule 3a is aligned in a direction different from the photo-irradiation direction by about 45° as the substrates are viewed in plane. The liquid crystal molecules 3a are tilted in four directions different depending on the domain. Thus, in the liquid crystal display device 100, the liquid crystal molecules are twisted about 90° between the vertical alignment films whose pretilt directions (alignment treatment directions) are perpendicular to each other. So the liquid crystal display device 100 is a 4 domain-VATN liquid crystal display device. Each picture element 8 is divided into eight regions, but the liquid crystal molecules 3a are aligned in four different tilt directions. Therefore, the liquid crystal display device 100 is a four domain-liquid crystal display device.

The four-domain VATN mode has an advantage in that the number of apparatus and the time for the alignment treatment (tact time) can be reduced because four domains different in alignment direction of the liquid crystal molecules 3a can be formed just by performing exposure twice for each of the first substrate 1 and the second substrate 2, totally four times, as shown in FIG. 2. Further, the embodiment in which one pixel (one picture element) is divided into four domains is preferable in order to improve viewing angle characteristics of a liquid crystal display device. In addition, a photomask that is used for forming an alignment control structure such as a rib (projection), which is used in a conventional MVA mode and the like, is not needed, that is, photolithography does not need to be performed. As a result, the production processes can be simplified. If one pixel (one picture element) is divided into two domains, the viewing angle characteristics in one of the vertical direction and the horizontal direction can be improved, but the viewing angle characteristics in the other direction can not be improved. It is not recommended that one pixel is divided into five or more domains because the production processes become complex and the treatment needs more time. Further, it has been known that the viewing angle characteristics are not so different practically between four domains and five or more domains.

According to the present Embodiment, the polarization plates 6a and 6b are arranged in such a way that a polarization axis direction P of the polarization plate 6a is substantially perpendicular to a polarization axis direction Q of the polarization plate 6b as the panel (substrates) is viewed in plane. The polarization plates 6a and 6b are arranged in such a way that one of the polarization axis direction P of the polarization plate 6a and the polarization axis direction Q of the polarization plate 6b is the same as the direction of photo-irradiation to the vertical alignment film 5a and the other is the same as the direction of photo-irradiation to the vertical alignment film 5b. Accordingly, when a voltage is applied, light incident from the polarization plate 6b side is polarized in the polarization axis direction P and then rotated by 90° along the twist of the liquid crystal molecules in the liquid crystal layer 3, and then turned into light polarized in the polarization axis direction Q and emitted from the polarization plate 6a. When no voltage is applied, the liquid crystal molecules in the liquid crystal layer 3 remain to be vertically aligned, and so light polarized in the polarization axis direction P passes through the liquid crystal layer 3 without being rotated, and then blocked by the polarization plate 6a. Thus, the liquid crystal display device 100 is a normally black liquid crystal display device. The term "polarization axis" used herein means an absorption axis. The polarization axis direction P of the polarization plate 6a and the polarization axis direction Q of the polarization plate 6b are not especially limited to the directions shown in FIG. 2, respectively, and they may be appropriately determined. It is preferable that the polarization axis directions of the pair of polarization plates 6a and 6b are different from each other by about 90° when the panel (substrates) is viewed in plane. It is preferable that the polarization plates 6a and 6b are arranged in a Cross-Nicol relationship.

According to the present Embodiment, the vertical alignment liquid crystal display device is mentioned. However, the liquid crystal display device in the present Embodiment may be a horizontal alignment liquid crystal display device. In this case, the liquid crystal layer 3 includes nematic liquid crystal materials with positive dielectric anisotropy (positive nematic liquid crystal materials), and instead of the vertical alignment films 5a and 5b, horizontal alignment films may be arranged on the liquid crystal layer 3 side surfaces of the first and second substrates 1 and 2.

A production method of the liquid crystal display device in accordance with Embodiment 1 is mentioned below. FIG. 4(a) is a plan view schematically showing the first substrate (TFT array substrate) in accordance with Embodiment 1. FIG. 4(b) is a plan view schematically showing the second substrate (CF substrate) in accordance with Embodiment 1.

First, the pair of substrates, the first substrate 1 and the second substrate 2, on which an alignment film is not arranged, are produced by a common method. The following TFT array substrate is used as the first substrate 1, for example. As shown in FIG. 4(a), on an insulating substrate (not shown) such as a glass substrate, scanning signal lines 9, TFTs 11, data signal lines 10, and pixel electrodes 12 are successively arranged in such a way that the scanning signal lines 9 and the data signal lines 10 are arranged in a lattice pattern with an insulating film (not shown) therebetween. At each intersection of the scanning signal lines 9 and the data signal lines 10, the TFT 11 and the pixel electrode 12 are arranged. The following CF substrate is used as the second substrate 2, for example. As shown in FIG. 4(b), on an insulating substrate (not shown) such as a glass substrate, a black matrix (BM) 13, a color filter 14 composed of colored layers of three colors, red (R), blue (G), and green (B), a protective film (not shown), and a transparent electrode film (not shown) are successively arranged. Thus, on the insulating substrate, the BM 13 is arranged in a lattice pattern, and the color filter 14 is arranged in each region surrounded by the BM 13. Thus, according to the present Embodiment, one pixel is composed of three picture elements of RGB arrayed in an x-axis direction (in the lateral direction as the display face is viewed in front). The insulating substrates are not especially limited to a glass substrate as long as it has an insulating surface. Materials commonly used may be mentioned as materials for the above-mentioned components.

Then, a solution containing a material for the photo-alignment film is applied to the first TFT array substrate and the CF substrate by spin casting and the like, and then the material is calcined at 180° C. for 60 minutes, and as a result, vertical alignment films are formed. The material is not especially limited, and a resin containing a photosensitive group and the like is mentioned. More specifically, a polyimide containing a photosensitive group such as a 4-chalcone group (the following formula (1)), a 4'-chalcone group (the following formula (2)), a coumarin group (the following formula (3)), and a cinnamoyl group (the following formula (4)) is preferable, for example. The photosensitive groups represented by the formulae (1) to (4) undergo a crosslinking reaction (including dimerization reaction), an isomerization reaction, a photore-orientation, and the like by light (preferably UV light). If these materials are used, a variation in pretilt angle of the liquid crystal molecules in the alignment film plane can be effectively suppressed in comparison to the case where a photodecomposition material is used as a material for the photo-alignment film. The photosensitive groups represented by the following formulae (1) to (4) may have a structure in which a substituent group is bonded to a benzene ring. A cinnamate group ($C_6H_5$—CH=CH—COO—) in which an oxygen atom is further bonded to a carbonyl group in the cinnamoyl group represented by the following formula (4) has the advantage of being easily synthesized. Accordingly, a polyimide containing such a cinnamate group is more preferable as the material for the photo-alignment film. The calcination temperature, the calcination time, and the thickness of the photo-alignment film are not especially limited and they may be appropriately determined.

[Formula 1]

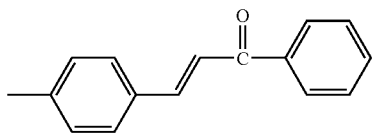

(1)

[Formula 2]

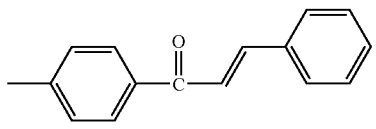

(2)

[Formula 3]

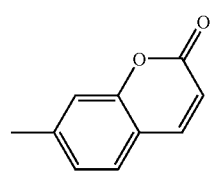

(3)

[Formula 4]

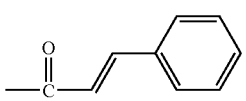

(4)

According to the present Embodiment, a photo-alignment material that is a photo-reactive material and provides a liquid crystal molecule with a pretilt angle in an irradiation direction of a light beam is used. A photo alignment film material that can regulate a pretilt direction in accordance with a moving direction of a photo-irradiation region can be used, as disclosed in "Photo-Rubbing Method: A Single-Exposure Method to Stable Liquid-Crystal Pretilt Angle on Photo-Alignment Film," M. Kimura and three et al, IDW' 04: proceedings of the 11th International Display Workshops, IDW' 04 Publication committee, 2004, and LCT2-1, p. 35-38". In this case, there is no need to cause light to enter the substrate from an oblique direction, and light can be caused to enter the substrate substantially vertically.

Procedures for exposure for the alignment film are mentioned below. FIGS. 5(a) to 5(e) are plan views each schematically showing the first substrate in an exposure step in accordance with Embodiment 1. FIG. 6 is a cross-sectional view schematically showing the first substrate in the exposure step in accordance with Embodiment 1 and showing an embodiment of photo-irradiation to the first substrate. FIGS. 7(a) to 7(e) are plan views schematically showing the second substrate in the exposure step in accordance with Embodiment 1.

According to the present Embodiment, the alignment film is exposed by scan exposure. Steps of exposure for the first substrate are mentioned. A photomask 21a and a photomask 21b are used. The photomask 21a has a mask center part 19a and a mask joint part 20a. The photomask 21b has a mask center part 19b and a mask joint part 20b. As shown in FIG. 5(a), the photomasks 21a and 21b are arranged in such a way that the mask joint part 20a and the mask joint part 20b overlap with each other in the x-axis direction. The photomasks 21a and 21b each have a plurality of slits that extend toward the y-axis direction and are arrayed in the x-axis direction. More specifically, the mask center parts 19a and 19b each have a plurality of transmissive parts each having a rectangular shape as viewed in plane, within a light-shielding region. Each transmissive part has a width substantially half of a pitch of picture elements in the x-axis direction (the lateral direction as the display face is viewed in front). The plurality of transmissive parts are arranged at a pitch substantially the same as the pitch of picture elements in the x-axis direction. The mask joint parts 20a and 20b have a plurality of slits like those in the mask center parts 19a and 19b within the light-shielding region. The slits of the mask joint parts 20a and 20b are arranged in a distribution density lower than that of the slits of the mask center parts 19a and 19b. The arrangement form of the slits of the mask joint parts 20a and 20b is mentioned below. A light source (not shown) is arranged above the photomasks 21a and 21b.

The position between the slits in the photomasks 21a and 21b and the picture elements in the first substrate 1 is adjusted, and then, as shown in FIG. 5(b), a polarized UV light is radiated to the first substrate 1 while the first substrate 1 is moved in the +y direction, thereby exposing the alignment film that is arranged on the first substrate 1 surface from one end to the other through the photomasks 21a and 21b (the 1st scan). In this case, the first substrate 1 is moved in such a way that the slits of the photomasks 21a and 21b are positioned along the bus wirings such as the data signal line 10 and the scanning signal line 9 arranged in the first substrate 1. As shown in FIG. 6, the first substrate 1 is irradiated with polarized UV light 15 from an oblique direction. The photomasks 21a and 21b, and the first substrate 1 are arranged with a certain distance (a promixity gap 16). Attributed to this distance, the first substrate 1 is moved smoothly, and even if the photomasks 21a and 21b sag under its own weight, the photomask 21a and 21b are suppressed from being in contact with the first substrate 1. As a result of the 1st scan, a substantially half region of each pixel (each picture element) is provided with the alignment treatment. As shown in FIG. 6, the liquid crystal molecules 3b, which are positioned near the vertical alignment film 5a surface, each have a pretilt angle 17. This pretilt angle 17 is substantially uniform in each exposure region. In addition, as a result of the 1st scan, the first substrate 1 has an exposure region 22, an exposure region 23, and a joint exposure region 24, as shown in FIG. 5(c). The exposure region 22 is exposed through the mask center part 19a of the photomask 21a. The exposure region 23 is exposed through the mask center part 19b of the photomask 21b. The joint exposure part 24 is exposed through the mask joint parts 20a and 20b of the photomasks 21a and 21b. That is, the exposure step in the present Embodiment includes a step of exposing the alignment film that is arranged on the first substrate 1 as follows: the alignment film plane is compartmentalized into the adjacent exposure regions 22 and 23, and the joint exposure part 24 interposed between the regions 22 and 23, and the alignment film in the exposure joint part 24 is exposed through the mask joint parts 20a and 20b, and the alignment film in the exposure regions 22 and 23 is exposed through the mask center parts 19a and 19b. The scanning exposure in the present invention may have an embodiment in which the substrate is fixed and the photomasks and the light-source are moved.

The first substrate 1 is rotated 180° in the first substrate 1 plane, and then as shown in FIG. 5(d), the first substrate 1 is horizontally moved by about a half of a picture element pitch in the x-axis direction in such a way that each slit in the photomasks 21a and 21b is positioned in an unexposed region of each picture element. Then, as shown in FIG. 5(e), with the first substrate 1 being moved, the alignment film from one end to the other (the 2nd scan) is exposed, as performed in the 1st scan shown in FIG. 5(b). As a result of the 2nd scan, the rest substantially half region of each pixel (each picture element) is provided with alignment treatment, and thus, the entire region of the vertical alignment film that is on the first substrate 1 is exposed. The light source and the photomasks 21a and 21b are fixed during the 1st and 2nd scan. So an incident angle of the light beam (the polarized UV light 15) in the 2nd scan with respect to the first substrate 1 is substantially the same as an incident angle of the light beam (the polarized UV light 15) in the 1st scan with respect to the first substrate 1. In addition, the first substrate 1 is rotated 180° before the 2nd scan, and so the direction of the light beam radiated to the first substrate 1 in the 1st scan is just opposite to the direction of the light beam radiated to the first substrate 1 in the 2nd scan when the first substrate 1 is viewed in plane, as shown in FIG. 2(a). That is, each picture element in the first substrate 1 has two regions as shown in FIG. 2(a), and the alignment directions of the liquid crystal molecules in the two regions are opposite and parallel to each other.

Then, steps of exposure for the second substrate are mentioned. Exposure for the second substrate is performed in almost the same procedures as in the exposure for the first substrate, except for the kind of the photomasks. That is, a photomask 21c and a photomask 21d are used. The photomask 21c has a mask center part 19c and a mask joint part 20c. The photomask 21d has a mask center part 19d and a mask joint part 20d. As shown in FIG. 7(a), the photomasks 21c and 21d are arranged in such a way that the mask joint part 20c and the mask joint part 20d overlap with each other in the y-axis direction. The photomasks 21c and 21d each have a plurality of slits that extend toward the x-axis direction and are arrayed in the y-axis direction. More specifically, the mask center parts 19c and 19d each have a plurality of transmissive parts each having a rectangular shape as viewed in plane, within a light-shielding region. Each transmissive part has a width about quarter of a pixel pitch in the y-axis direction (the vertical direction as the display face is viewed in front). The plurality of transmissive parts are arranged at a pitch substantially half of the pixel pitch in the y-axis direction. The mask joint parts 20c and 20d have a plurality of slits like those in the mask center parts 19c and 19d within the light-shielding region. The slits of the mask joint parts 20c and 20d are arranged in a distribution density lower than that of the slits of the mask center parts 19c and 19d. The arrangement form of the slits of the mask joint parts 20c and 20d is mentioned below. A light source (not shown) is arranged above the photomasks 21c and 21d. According to the present Embodiment, the pixel pitch and the picture element pitch are the same in the vertical direction as the display screen is viewed in front.

The position between the slits in the photomasks 21c and 21d, and the pixels in the second substrate 2 is adjusted, and then, as shown in FIG. 7(b), a polarized UV light is radiated to the second substrate 2 while the second substrate 2 is moved in the +x direction, thereby exposing the alignment film that is arranged on the second substrate 2 surface from one end to the other through the photomasks 21c and 21d (the 1st scan). In this case, the second substrate 2 is moved in such a way that the slits in the photomasks 21c and 21d are positioned along the BM 13 arranged in the second substrate 2. Similarly to the direction of photo-irradiation to the first substrate, shown in FIG. 6, the second substrate is irradiated with the polarized UV light from an oblique direction. Similarly to the first substrate, the photomasks 21c and 21d, and the second substrate 2 are arranged with a proximity gap. As a result of the 1st scan, a substantially half region of each pixel (each picture element) is provided with the alignment treatment. As shown in FIG. 6, the liquid crystal molecules, which are positioned near the vertical alignment film surface on the second substrate, each have a pretilt angle, similarly to the first substrate. This pretilt angle is substantially uniform in each exposure region. In addition, as a result of the 1st scan, the second substrate 2 has an exposure region 32, an exposure region 33, and a joint exposure region 34, as shown in FIG. 7(c). The exposure region 32 is exposed through the mask center part 19c of the photomask 21c. The exposure region 33 is exposed through the mask center part 19d of the photomask 21d. The joint exposure part 34 is exposed through the mask joint parts 20c and 20d of the photomasks 21c and 21d. That is, the exposure step in the present Embodiment includes a step of exposing the alignment film that is arranged on the second substrate 2 as follows: the alignment film plane is compartmentalized into the adjacent exposure regions 32 and 33, and the joint exposure part 34 interposed between the regions 32 and 33, and the alignment film in the exposure joint part 34 is exposed through the mask joint parts 20c and 20s, and the alignment film in the exposure regions 32 and 33 is exposed through the mask center parts 19c and 19d.

The second substrate 2 is rotated 180° in the second substrate 2 plane, and then as shown in FIG. 7(d), the second substrate 2 is horizontally moved by about a quarter of a pixel pitch in the y-axis direction in such a way that each slit of the photomasks 21c and 21d is positioned in an unexposed region of each pixel. Then, as shown in FIG. 7(e), with the second substrate 2 being moved, the alignment film is exposed from one end to the other (the 2nd scan) as performed in the 1st scan shown in FIG. 7(b). As a result of the 2nd scan, the rest substantially half region of each pixel (each picture element) is provided with alignment treatment, and thus, the entire region of the vertical alignment film that is on the second substrate 2 is exposed. Similarly to the first substrate, the direction of the light beam radiated to the second substrate 2 in the 1st scan is just opposite to the direction of the light beam radiated to the second substrate 2 in the 2nd scan when the second substrate 2 is viewed in plane, as shown in FIG. 2(b). That is, each picture element in the second substrate 2 has two regions as shown in FIG. 2(b), and the alignment directions of the liquid crystal molecules in the two regions are opposite and parallel to each other.

Thus, one picture element is divided into four domains in the present Embodiment. That is, the alignment division is performed in the following manner: the TFT array substrate is exposed through the photomask where the transmissive parts are arranged in a stripe pattern, each of the transmissive parts having a width about half of the picture element pitch in the lateral direction (the x-axis direction in FIG. 4) when the display face of the liquid crystal display device is viewed in front; and the CF substrate is exposed through the photomask where the transmissive parts are arranged in a stripe pattern, each of the transmissive parts having a width about quarter of the picture element pitch in the vertical direction (the y-axis direction in FIG. 4, the picture element pitch and the pixel pitch in the vertical direction are the same in the present Embodiment) when the display face of the liquid crystal display device is viewed in front. The pattern of the transmissive parts is not especially limited, and it may be appropriately determined depending on a layout of the pixel (picture element), a pixel (picture element) size, a resolution of a panel, and the like. According to the present Embodiment, the four domains are arranged in a matrix pattern. The pattern in which the four domains are arranged is not especially limited, and a horizontal-stripe pattern may be mentioned. In addition, if each picture element is further divided into some sub-pixels, the photomask may have a slit pattern for alignment division of each sub-pixel.

Usable materials and suitable conditions of the production processes in the present Embodiment are mentioned below, but not limited thereto. The light beam for the exposure is not especially limited a polarized UV light, and it may be appropriately determined depending on the alignment film material, the production process, and the like. Non-polarized light (extinction ratio=1:1) may be used.

Liquid crystal material: nematic liquid crystal having a birefringence $\Delta n$ of 0.06 to 0.14, a dielectric anisotropy $\Delta \in$ of $-2.0$ to $-8.0$, a Tni (transition temperature of nematic-anisotropic phase) of 60° C. to 110° C.

Pretilt angle: 85° to 89.9°

Cell gap: 2 μm to 5 μm

Irradiation energy density: 0.01 to 5 J/cm$^2$

Proximity gap: 10 μm to 250 μm

Light source: a low pressure mercury lamp, a high pressure mercury lamp, a heavy hydrogen lamp, a metal halide lamp, an argon resonance lamp, a xenon lamp, an excimer laser Extinction ratio of polarized UV light (polarization degree): 1:1 to 60:1

Irradiation direction of UV light: a direction that makes an angle of 0° to 60° with the normal direction of the substrate surface.

Then, the arrangement embodiment of the slits in the mask joint part through which the joint exposure part is exposed is mentioned in detail. The photomasks 21a and 21b are mentioned first. FIG. 8 is an enlarged plan view schematically showing the photomasks in accordance with Embodiment 1. FIG. 9 is an enlarged plan view schematically showing the mask joint parts of the photomasks in accordance with Embodiment 1. FIG. 10 is a graph showing a change in distribution density of slits in each of the mask joint parts of the photomasks in accordance with Embodiment 1. The mask joint parts 20a and 20b are positioned in a region corresponding to 90 pixels in a direction (the x direction in FIG. 5) vertical to the longitudinal direction of the slit 25. In each of the mask joint parts 20a and 20b in the photomasks 21a and 21b, the slits 25 are formed in every other pixel, as shown in FIGS. 8 and 9. That is, as shown in FIG. 10, in each of the mask joint parts 20a and 20b, the slits 25 are formed in a distribution density of 50% relative to that of the slits 25 in the mask center part. The slits 25 in each of the mask joint parts 20a and 20b are formed on three-picture elements (a set of RGB) basis as shown in FIG. 9. In the present description, the number of pixels arrayed in the direction vertical to the longitudinal direction of the slit in the photomask is simply called "the number of pixels". In the joint exposure part 24, the pixels exposed through the photomask 21a and the pixels exposed through the photomask 21b are alternately arranged in the x-axis direction.

Then, the photomasks 21c and 21d are mentioned. FIG. 11 is an enlarged plan view schematically showing mask joint parts of other photomasks in accordance with Embodiment 1. The mask joint parts 20a and 20b are positioned in a region corresponding to 90 pixels in a direction (the y direction in FIG. 7) vertical to the longitudinal direction of the slit 25. Similarly to the photomasks 21a and 21b, in each of the mask joint parts 20c and 20d in the photo mask 21c and 21d, the slits 25 are formed in every other pixel, as shown in FIG. 11. That is, in each of the mask joint parts 20c and 20d, the slits 25 are formed in a distribution density of 50% relative to that of the slits 25 in the mask center part. In the joint exposure part 34, the pixels exposed through the photomask 21c and the pixels exposed through the photomask 21d are alternately arranged in the y-axis direction.

A step of attaching the first substrate to the second substrate is mentioned below. FIG. 12 is a plan view schematically showing the first and second substrates attached to each other in accordance with Embodiment 1. In the attachment step, a sealing member is arranged around the first substrate or the second substrate prepared as above. Then, for example, plastic beads each having a diameter of 4 μm are sprayed on the first substrate or second substrate on which the sealing member has been arranged, and then, the first substrate and the second substrate are attached to each other. The relationship of the light beam-irradiation direction between the two substrates in one picture element is as shown in FIG. 3. The scanning directions for the substrates facing each other are substantially perpendicular to each other in each domain. The joint exposure part 24 on the first substrate 1 is substantially perpendicular to the joint exposure part 34 on the second substrate 2, as shown in FIG. 12.

Then, for example, the above-mentioned liquid crystal materials are injected between the first substrate and the second substrate, and the liquid crystal molecules exhibit pretilt angles different in a direction depending on the domain. As a result, in each domain, the alignment azimuth of the liquid crystal molecules that are positioned near the center in the surface plane and in the thickness direction of the liquid crystal layer makes an angle of 45° with the light beam-irradiation direction when the substrate is viewed in plane as shown in FIG. 3.

The two polarization plates 6a and 6b are attached on the exterior sides of the first substrate 1 and the second substrate 2 in such a way that their polarization axes are in a relationship shown in FIG. 3. As a result, the liquid crystal molecules are almost vertically aligned when no voltage is applied, and so the liquid crystal display panel in the present Embodiment provides excellent black display (excellent normally black display). The liquid crystal display panel in the present Embodiment shows display characteristics hardly depending on a viewing direction because one pixel is divided into four domains different in alignment direction of liquid crystal molecules.

Then, after common module-producing steps, a liquid crystal display device in the present Embodiment is completed.

A display screen of the liquid crystal display device in accordance with the present Embodiment is mentioned below. According to the liquid crystal display device in the present Embodiment, each alignment film that is arranged on the substrate is provided with alignment (exposure) treatment over several times. Accordingly, the joint line might be generated in the display region corresponding to the joint exposure part of the first and second substrates.

The case that misalignment of photomasks occurs is mentioned first. FIG. 13 is a plan view schematically showing a display region of the liquid crystal display device in accordance with Embodiment 1. FIG. 14 is an enlarged plan view schematically showing a pixel array in the display region of the liquid crystal display device shown in FIG. 13. FIG. 14(a) shows a pixel array in a first display region. FIG. 14(b) shows a pixel array in a joint display region. FIG. 14(c) shows a pixel array in a second display region adjacent to the first display region. FIG. 15 is a plan view schematically showing picture elements in the first and second display regions in the liquid crystal display device shown in FIG. 13. FIG. 15(a) shows picture elements in the first display region. FIG. 15(b) shows picture elements in the second display region. In FIG. 13, the display region in the case that misalignment of photomasks occurs in the step of exposing the first substrate is shown.

When misalignment of the photomasks in the exposure step for the first substrate, a display region 70 in the liquid crystal display device 100 in the present Embodiment has adjacent two display regions 41 and 42 and a joint display region 51 interposed between the display regions 41 and 42, as shown in FIG. 13. As shown in FIGS. 12 and 13, the display region 41 is positioned in a region corresponding to the exposure region 22; the display region 42 is positioned in a region corresponding to the exposure region 23; and the joint display region 51 is positioned in a region corresponding to the joint exposure part 24. As shown in FIG. 14(a), a plurality of pixels 61 are arrayed in the display region 41, and as shown in FIG. 4(c), a plurality of pixels 62 are arrayed in the display region 42. If misalignment of the photomasks occurs in the exposure step for the first substrate, a domain area ratio in each pixel opening is different between the picture elements constituting the pixel 61 and the picture elements constituting the pixel 62. More specifically, as shown in FIG. 15(a), for example, in each opening in the picture elements 63 constituting the pixel 61, a domain boundary line is misaligned to the right of the center line (the broken line in FIG. 15) of the picture elements. The areas of domains D1 and D4 are larger than those of domains D2 and D3. As shown in FIG. 15(b), for example, in the each opening in the picture elements 64 constituting the pixel 62, a domain boundary line is misaligned to the left of the center line (the broken line in FIG. 15(b)) of the picture elements. The areas of the domains D1 and D4 are smaller than those of the domains D2 and D3. Thus, the domain area ratio is different between the picture elements 63 and the picture elements 64. Accordingly, the luminance is generally different between the picture elements 63 and the picture elements 64, in some viewing directions. As a result, the luminance is different between the display region 41 where the picture elements 63 (the pixels 61) are positioned and the display region 42 where the picture elements 64 (the pixels 62) are positioned, in some viewing directions. The difference in domain area ratio between the picture elements 63 and the picture elements 64 can be determined with a commercially available microscope. The difference in luminance between the picture elements 63 and the picture elements 64 can be determined, for example, by measuring a difference in luminance (the maximum luminance) in the each pixel opening between the picture elements 63 and the picture elements 64 with a commercially available luminance meter.

The joint display region 51 is a display region corresponding to the joint exposure part 24 in the first substrate 1. So in the joint display region 51, the pixels 61 and the pixels 62 are arrayed and mixed. Specifically, as shown in FIG. 14(b), in the joint display region 51, an array of the pixels 61 and an array of the pixels 62 are alternately arranged. That is, in the joint display region 51, the pixels 61 and the pixels 62 are mixed on about 50:50 basis. Accordingly, the joint display region 51 has a luminance that is almost intermediate between luminances of the display regions 41 and 42. So the luminance does not suddenly change between the display regions 41 and 42 due to the joint display region 51. Two joint lines, one being observed at a boundary between the display region 41 and the joint display region 51, the other being observed at a boundary between the display region 42 and the joint display region 51, might be observed, but such joint lines have less adverse effects on the display characteristics than a joint line does, the joint line being observed when no joint display region 51 exists, i.e., a joint line that is observed when the display region 41 is directly adjacent to the display region 42. According to the liquid crystal display device in the present Embodiment, the joint display region 51 having a luminance that is almost intermediate between luminances of the display regions 41 and 42 connects the display region 41 to the display region 42, and so the joint line becomes hard to perceive. Accordingly, the display qualities and the yield of the liquid crystal display device can be improved.

Then, the case where misalignment of photomasks occurs in the exposure steps for the first and second substrates is mentioned. FIG. 16 is a plan view schematically showing a display region of the liquid crystal display device in accordance with Embodiment 1.

When misalignment of the photomasks in the exposure steps for the first and second substrates occurs, as shown in FIG. 16, the liquid crystal display device 100 in the present Embodiment has a display region 70 composed of display regions 43, 44, 45, and 46. The display regions 43 and 44, 44 and 45, 45 and 46, and 46 and 43, are arranged to be adjacent to each other. The display region 70 also includes joint display regions 52, 53, 54, and 55. The joint display regions 52 to 55 are interposed between the display regions 43 and 44, 44 and 45, 45 and 46, and 46 and 43, respectively. The display region 70 also includes an intersection display region 56 where the joint display regions 52 to 55 intersect with one another. If misalignment of the photomasks occurs in the exposure steps for the first and second substrates, optical characteristics of pixels are different among the display regions 43 to 46. So the luminance is generally different among the display regions 43 to 46, in some viewing directions.

In the joint display regions 52 to 55, similarly to the case mentioned in FIG. 13, two kinds of pixels, arranged in adjacent two display regions, are alternately arranged. Accordingly, the joint display regions 52 to 55 have a luminance that is almost intermediate between of the display regions 43 and 44, 44 and 45, 45 and 46, and 46 and 43, respectively. So, due to the joint display regions 52 to 55, the luminance does not suddenly change between display regions 43 and 44, 44 and 45, 45 and 46, and 46 and 43. According to the liquid crystal display device in the present Embodiment, even if misalignment of the photomasks occurs in the exposure steps for the first and second substrates, the joint display regions 52 to 55 each having an almost intermediate luminance connect the corresponding two of the display regions 43 to 46 to each other, and so the joint line becomes hard to perceive, similarly to the case mentioned in FIG. 13. In the intersection display region 56, the four kinds of pixels constituting the display regions 43 to 46 are mixed in substantially equal ratio. Accordingly, the intersection display region 56 has an almost average luminance of luminances of the display regions 43 to 46. So due to the intersection display region 56 having the almost average luminance, the intersection display region 56 connects the display regions 43 to 46 to one another. Thus, according to the liquid crystal display device of the present invention, the intersection display region does not cause defects, generally.

Then, the case that misalignment of the photomasks does not occur in the exposure steps for the first and second substrates is mentioned. Even in this case, for example, differences in irradiation amount, irradiation angle, and proximity gap, which is a distance between a mask and a substrate, and further, a difference in polarization axis and/or in polarization degree of polarized light when polarized light is irradiated, might be generated. As shown in FIGS. 13 and 16, the luminance might be different among the display regions which are exposed separately, in some viewing directions, but similarly to the case that the misalignment of photomasks occurs, two kinds of pixels, arranged in adjacent two display regions are alternately arranged in each joint display region. Accordingly, even if differences in exposure conditions except for the misalignment of the photomasks are generated, the joint line becomes hard to be perceived.

According to the exposure step in the present Embodiment, in the mask joint parts 20a and 20b, the slits 25 are arranged in every other pixel (every other set of RGB picture elements), but may be arranged in every other picture element, as shown in FIG. 17. FIG. 17 is an enlarged plan view schematically showing mask joint parts of photomasks in accordance with another example of Embodiment 1. In this case, the liquid crystal display device in the present Embodiment includes adjacent two display regions (hereinafter, also referred to as a "first display region" and a "second display region") and a joint display region interposed between the first and second display regions. In the first display region, a plurality of first picture elements are arrayed. In the second display region, a plurality of second picture elements different from the first picture elements in at least one of a luminance and a domain area ratio in each picture element opening are arrayed. In the joint display region, the first picture element and the second picture element are arrayed and mixed. More specifically, according to such a liquid crystal display device in the present Embodiment, the joint display region has a region where the first picture element and the second picture element are alternately arrayed.

In the exposure step of the present invention, the number of the photomasks used is not limited to two, and it may be three or more. For example, as shown in FIG. 18, a substrate 18 may be exposed through six photomasks 21 that are arranged in a zigzag manner. FIG. 18 is a plan view schematically showing a liquid crystal display device in an exposure step in accordance with another example of Embodiment 1. In such an exposure step, the size of the photomask can be decreased, leading to reduction in production costs on the photomask. If a mask is small, the mask can be suppressed from sagging under its own weight and as a result, an alignment treatment can be performed with higher accuracy. In addition, pattern accuracy of the mask itself can be improved attributed to the small size.

Embodiment 2

A liquid crystal display device in accordance with Embodiment 2 is mentioned. The overlapping contents between the present Embodiment and Embodiment 1 are omitted and not shown in drawings because a difference between the two is just an embodiment of the photomasks used for exposing the alignment film. Like references designate elements having identical functions. FIG. 19 is an enlarged plan view schematically showing photomasks in accordance with Embodiment 2. FIG. 20 is an enlarged plan view schematically showing mask joint parts of the photomasks in accordance with Embodiment 2. FIG. 21 is a graph showing a change in distribution density of slits in each of the mask joint parts of the photomasks in accordance with Embodiment 2. In FIG. 20, one pixel is illustrated as the minimum unit because of space limitations. However, in fact, the slit is arranged on the picture element basis. That is, a slit having a width about half of a picture element pitch is arranged so as to be positioned in each of the RGB picture elements constituting the pixel where the slit is shown in FIG. 20.

In the mask joint parts of the photomasks 21a and 21b, as shown in FIGS. 19 and 20, the distribution density of the slits 25 linearly decreases with increasing distance from the mask center part. More specifically, as shown in Table 1 and FIG. 21, in the mask joint parts of the photomasks 21a and 21b, the number of the slits 25 per block (area corresponding to 10 pixels in the present Embodiment) decreases by one with increasing distance from the mask center part. The slit 25 is arranged on three picture elements (a set of RGB picture elements) basis, in fact. So the number of the slits 25 per block decreases by three. The block has a constant given area corresponding to the constant number of pixels (10 pixels in the present Embodiment). According to the photomasks 21a and 21b, the number of slits is different by one (three, in fact) between the adjacent two blocks. Thus, in the mask joint parts in the photomasks 21a and 21b, the distribution density of the slits 25 decreases with increasing distance from the mask center part. More specifically, it can be also said that in the mask joint part, the distribution density of the slits 25 pseudo-linearly decreases with increasing distance from the mask center part. The block number is given from the mask center part side. The slits 25 in the mask joint parts of the photomasks 21a and 21b are arranged in such a way that the plurality of transmissive parts in the mask joint part of the photomask 21a face a pixel group and the plurality of transmissive parts in the mask joint part of the photomask 21b face another pixel group, the two pixel groups satisfying a mutually complementary arrangement relationship. As a result, the pixels are not redundantly exposed through the photomasks 21a and 21b. Also in the photomasks 21c and 21d, the number of the slits per block (area corresponding to 10 pixels) decreases by one with increasing distance from the mask center part.

TABLE 1

| Block | 1 | 2 | 3 | 4 | 5 | 6 | 7 | 8 | 9 |
|---|---|---|---|---|---|---|---|---|---|
| The number of pixels in block | 10 | 10 | 10 | 10 | 10 | 10 | 10 | 10 | 10 |
| The number of slits in block | 9 | 8 | 7 | 6 | 5 | 4 | 3 | 2 | 1 |
| high ← | | | Distribution density of slit | | | | | → low | |

The exposure step is performed using such photomasks, and so in the liquid crystal display device in the present Embodiment, for example, even if misalignment of the photomasks in the exposure step for the first substrate and/or the second substrate occurs and as a result, optical characteristics are different between pixels (hereinafter, also referred to as "first pixels" and "second pixels") arranged in adjacent two display regions, the first pixels and the second pixels are mixed in the joint display region in such a way that the distribution densities each of the first and second pixels linearly change. Accordingly, due to the joint display region, the luminance smoothly changes between the first display region to the second display region, and as a result, the joint line is not perceived in the joint display region. According to the liquid crystal display device in the present Embodiment, the first pixels and the second pixels are mixed in the joint display region in such a way that the distribution densities each of the first and second pixels monotonically change.

With reference to Table 2, the arrangement form of the slits in each block is mentioned in detail. Table 2 shows the case where the slits are evenly distributed in each block. In Tables 2 and 3, the arrangement of the slits shows the number of pixels (shown in the non-shaded cell) corresponding to a region where the slits are formed and the number of pixels (shown in the shaded cell) corresponding to a region where the slits are not formed (light-shielding region). The distance between slits shows the number of pixels corresponding to the light-shielding region. The difference in distance between slits is a difference between two values showing the distance between slits.

the joint exposure part is 90; the number of picture elements per pixel is 3; and the number of picture elements in the joint exposure part is 270, for example, the joint exposure part is compartmentalized into 15 blocks each corresponding to 16 picture elements, and the number of slits per block decreases by one, as mentioned above. As a result, the number of the slits in the joint exposure part can be more smoothly changed, and so the luminance can more smoothly change between adjacent two display regions. In this case, the liquid crystal display device in the present Embodiment has the first display

TABLE 2

| Block | 1 | 2 | 3 | 4 | 5 |
|---|---|---|---|---|---|
| The number of pixels in block | 10 | 10 | 10 | 10 | 10 |
| Arrangement of slits | 9  4  4  3  4 | 3  3 | 1  3 | 1 |  |
| Distance between slits | 1  1  2  1  2 | 1  3 | 1  1 | 3 |  |
| Difference in distance between slits | 0  1  1  2  2 | 1  0 |  |  |  |

| Block | 6 | 7 | 8 | 9 |
|---|---|---|---|---|
| The number of pixels in block | 10 | 10 | 10 | 10 |
| Arrangement of slits | 1  1  1  1  1  1  1 | 1  1  1  1 | 1  1 | 1 |
| Distance between slits | 3  1  1  3  2  2  4 | 3  7 | 5 |  |
| Difference in distance between slits | 2  0  2  0  1 | 4  2 |  |  |

As shown in Table 2, if the slits are evenly distributed in each block, a region where the difference in distance between the slits (in Table 2, the cell shown in the bold letter) is two or more exists in the mask joint part. If such a region exists, the distance between slits varies and the distribution density of the slits discontinuously changes, which is not so preferable in terms of effectively suppressing the joint line from being perceived. Accordingly, it is preferable that the distance between the slits is appropriately adjusted in the entire mask joint part and that the slits 25 are arranged in such a way that the difference in distance between adjacent two slits is as small as possible, specifically 1 or less. As a result, the distribution density of the slits 25 can be more linearly changed, which can more effectively suppress the joint line from being perceived.

region, the second display region, and the joint display region interposed between the first and second display regions, and in the first display region, a plurality of picture elements (hereinafter, also referred to as "first picture elements") are arrayed, and in the second display region, a plurality of picture elements (hereinafter, also referred to as "second picture elements") different from the first picture elements in at least one of a luminance and a domain area ratio in each picture element opening are arrayed. In addition, in the joint display region of the liquid crystal display device in accordance with the present Embodiment, the numbers each of the first picture elements and the second picture elements per block change by one. With reference to the above-mentioned example, 30 picture elements are residues (270−16×15=30), and regions

TABLE 3

| Block | 1 | 2 | 3 | 4 | 5 |
|---|---|---|---|---|---|
| The number of pixels in block | 10 | 10 | 10 | 10 | 10 |
| Arrangement of slits | 9  4  4  2  3  2 | 1  2  2  2 | 1  1  1  1 | 1  1  1 |  |
| Distance between slits | 1  1  1  1  1  1 | 1  1  1  1 | 1  1  1  1 | 1  1 |  |
| Difference in distance between slits | 0  0  0  0  0 | 0  0  0 | 0  0  0 | 0  0 |  |

| Block | 6 | 7 | 8 | 9 |
|---|---|---|---|---|
| The number of pixels in block | 10 | 10 | 10 | 10 |
| Arrangement of slits | 1  1  1  2  1  2  1  3 | 1  2  1  4 | 1  2  3 | 1  6 |
| Distance between slits | 1  1  2  3  2  3  3 | 3  4  5 | 6 |  |
| Difference in distance between slits | 0  1  1  0  1  1 | 0  1  1 | 1 |  |

According to the present Embodiment, in order to provide a liquid crystal display device showing well-balanced luminance among picture elements in a pixel and excellent color reproducibility, in the mask joint parts of the photomasks 21a and 21b, the distribution density of the slits linearly changes on a pixel (RGB picture elements) basis. However, in the present invention, a distribution density of slits may linearly change on a picture element basis. If the number of pixels in corresponding to these 30 picture elements may be appropriately distributed within and/or without the mask joint part as mentioned below.

Embodiment 3

A liquid crystal display device in accordance with Embodiment 3 is mentioned below. The overlapping contents between the present Embodiment and Embodiments 1 and 2 are omitted and not shown in drawings because a difference between the two is just an embodiment of the photomasks used for exposing the alignment film. Like references designate elements having identical functions. FIG. 22 is an enlarged plan view schematically showing mask joint parts of photomasks in accordance with Embodiment 3. FIG. 23 is a graph showing a change in distribution density of slits in the mask joint parts of the photomasks in accordance with Embodiment 3. In FIG. 22, one pixel is illustrated as the minimum unit because of space limitations. However, in fact, the slit is arranged on the picture element basis. That is, a slit having a width about half of a picture element pitch is arranged so as to be positioned in each of the RGB picture elements constituting the pixel where the slit is shown in FIG. 22.

As shown in FIG. 22, according to each of the photomasks 21a and 21b in the present Embodiment, the mask joint part is positioned in a region corresponding to 98 pixels. In this case, the slits 25 in 9 blocks on the center side of the mask joint part are arranged in such a way that their distribution density linearly decreases, similarly to Embodiment 2. A region corresponding to the residual eight pixels is divided in two and each region corresponding residual four pixels is arranged at each end of the mask joint part. More specifically, as shown in Table 4 and FIGS. 22 and 23, in the region corresponding to the residual 4 pixels arranged at the end on the mask center side of the mask joint part, the slits 25 are arranged so as to be positioned in every pixel, that is, in a distribution density of 100%. In the region corresponding to the residual 4 pixels arranged at the end on the other side of the mask joint part, no slits 25 are arranged. Thus, the region corresponding to the residual 4 pixels on the mask center part side have the same slit arrangement form as in the mask center part, and the region corresponding to the residual 4 pixels on the other side is a light-shielding region. Accordingly, the photomasks shown in FIGS. 22 and 23 have substantially the same embodiment as that of the photomasks in Embodiment 2. The region corresponding to the residual 4 pixels on the mask center part side can be said to belong to the mask center part. In the photomasks 21c and 21d as well as the photomasks 21a and 21b, the slits are arranged in such a way that the region corresponding to the residual pixels is positioned at each end of the mask joint part.

ing a change in distribution density of slits in each of the mask joint parts of the photomasks in accordance with another example of Embodiment 3. FIG. 25(a) is one photomask. FIG. 25(b) shows the other photomask. In FIG. 24, one pixel is illustrated as the minimum unit because of space limitations. However, in fact, the slit is arranged on the picture element basis. That is, a slit having a width about half of a picture element pitch is arranged so as to be positioned in each of the RGB picture elements constituting the pixel where the slit is shown in FIG. 24.

According to the photomasks 21a and 21b (and/or the photomasks 21c and 21d) in the present Embodiment, as shown in FIG. 24, a region corresponding to the residual 8 pixels may be positioned at only one end of the mask joint part. More specifically, as shown in Table 5 and FIG. 25(a), the slits 25 in 9 blocks on the center side of the mask joint part are arranged in such a way that their distribution density linearly decreases, similarly to Embodiment 2, and in the region corresponding to the residual 8 pixels on the other side of the mask joint part, no slits 25 may not be arranged. According to the photomask 21b, as shown in Table 6 and FIG. 25(b), the slits 25 in 9 blocks on the side opposite to the mask center side of the mask joint part are arranged in such a way that their distribution density linearly decreases, similarly to Embodiment 2, and in the region corresponding to the residual 8 pixels on the mask center side of the mask joint part, the slits 25 are arranged so as to be positioned in every pixel, that is, in a distribution density of 100%. Thus, the photomask 21a may have the region corresponding to the residual pixels, i.e., a light-shielding region, on the side opposite to the mask center part of the mask joint part, and the photomask 21b may have the region where the slits are formed in the same distribution density as that of the slits in the mask center part on the mask center part side of the mask joint part. Accordingly, the photomasks shown in FIGS. 24 and 25 have substantially the same embodiment as in the photomasks in Embodiment 2, similarly to the photomasks FIGS. 22 and 23. The region corresponding to the residual pixels on the mask center part side of the mask joint part can be said to belong to the mask center part.

TABLE 4

| Block | Remainder | 1 | 2 | 3 | 4 | 5 | 6 | 7 | 8 | 9 | Remainder |
|---|---|---|---|---|---|---|---|---|---|---|---|
| The number of pixels in block | 4 | 10 | 10 | 10 | 10 | 10 | 10 | 10 | 10 | 10 | 4 |
| The number of slits in block | 4 | 9 | 8 | 7 | 6 | 5 | 4 | 3 | 2 | 1 | 0 |

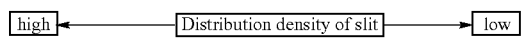
high ← Distribution density of slit → low

FIG. 24 is an enlarged plan view schematically showing the mask joint parts of the photomasks in accordance with another example of Embodiment 3. FIG. 25 is a graph show-

TABLE 5

| Block | 1 | 2 | 3 | 4 | 5 | 6 | 7 | 8 | 9 | Remainder |
|---|---|---|---|---|---|---|---|---|---|---|
| The number of pixels in block | 10 | 10 | 10 | 10 | 10 | 10 | 10 | 10 | 10 | 8 |
| The number of slits in block | 9 | 8 | 7 | 6 | 5 | 4 | 3 | 2 | 1 | 0 |

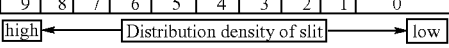
high ← Distribution density of slit → low

TABLE 6

| Block | Remainder | 1 | 2 | 3 | 4 | 5 | 6 | 7 | 8 | 9 |
|---|---|---|---|---|---|---|---|---|---|---|
| The number of pixels in block | 8 | 10 | 10 | 10 | 10 | 10 | 10 | 10 | 10 | 10 |
| The number of slits in block | 8 | 9 | 8 | 7 | 6 | 5 | 4 | 3 | 2 | 1 |

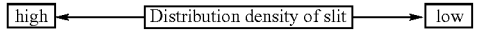
high ← Distribution density of slit → low

According to Embodiment 3, even if the mask joint part has the region corresponding to residual pixels, the joint line can be effectively suppressed from being perceived in the liquid crystal display device in accordance with the present Embodiment, similarly to Embodiment 2.

Embodiment 4

A liquid crystal display device in accordance with Embodiment 4 is mentioned. The overlapping contents between the present Embodiment and Embodiments 1 to 3 are omitted and not shown in drawings because a difference between the two is just an embodiment of the photomasks used for exposing the alignment film. Like references designate elements having identical functions. FIG. 26 is a plan view schematically showing mask joint parts of photomasks in accordance with Embodiment 4. FIG. 27 is a graph showing a change in distribution density of slits in the mask joint parts of the photomasks in accordance with Embodiment 4. In FIG. 26, one pixel is illustrated as the minimum unit because of space limitations. However, in fact, the slit is arranged on the picture element basis. That is, a slit having a width about half of a picture element pitch is arranged so as to be positioned in each of the RGB picture elements constituting the pixel where the slit is shown in FIG. 26.

According to the photomasks 21a and 21b in the present Embodiment, as shown in FIG. 26, the mask joint part is positioned in a region corresponding to 98 pixels. In this case, in the first to fifth blocks and the sixth to ninth blocks each at the end of the mask joint part, the slits 25 are arranged in such a way that their distribution density linearly decreases, similarly to Embodiment 2. A region corresponding residual 8 pixels is arranged in substantially the center of the mask joint part. More specifically, as shown in Table 7 and FIG. 27, the slits 25 in substantially the center of the mask joint part (between the fifth block and the sixth block) are arranged in every other pixel region, that is, in a distribution density of 50%. Also in the photomasks 21c and 21d as well as the photomasks 21a and 21b, the slits are arranged in such a way that the region corresponding to the residual pixels is arranged in substantially the center of the mask joint part.

in the joint display region in such a way that the distribution densities each of the first and second pixels substantially linearly change. More specifically, the liquid crystal display device in the present Embodiment has a region where the first pixels and the second pixels are alternately arrayed in substantially the center of the region (joint display region) where the numbers each of the first pixels and the second pixels per block change by one. Accordingly, the luminance can smoothly change between the first and second display regions, and as a result, the joint line is not perceived in the joint display region.

FIG. 28 is an enlarged plan view schematically showing mask joint parts of photomasks in accordance with another example of Embodiment 4. FIG. 29 is a graph showing a change in distribution density of slits in the mask joint parts of the photomasks in accordance with another example of Embodiment 4. FIG. 29(a) shows one photomask. FIG. 29(b) shows the other photomask. In FIG. 28, one pixel is illustrated as the minimum unit because of space limitations. However, in fact, the slit is arranged on the picture element basis. That is, a slit having a width about half of a picture element pitch is arranged so as to be positioned in each of the RGB picture elements constituting the pixel where the slit is shown in FIG. 28.

According to the photomasks 21a and 21b in the present Embodiment, as shown in FIG. 28, a region corresponding to the residual pixels may not be arranged in the center of the mask joint part as long as it is positioned within the mask joint part. More specifically, the photomask 21a may have a region corresponding to the residual 8 pixels between the second block and the third block, as shown in Table 8 and FIG. 29(a), and the photomask 21b may have a region corresponding to the residual 8 pixels between the seventh block and the eighth block, as shown in Table 9 and FIG. 29(b). In this case, in the region corresponding to the residual 8 pixels of the photomask 21a, the slits 25 are arranged in a distribution density of 75% that is between distribution densities of the slits 25 in two blocks adjacent to the region (the second and third blocks). Further, in the region corresponding to the residual 8

TABLE 7

| Block | 1 | 2 | 3 | 4 | 5 | Remainder | 6 | 7 | 8 | 9 |
|---|---|---|---|---|---|---|---|---|---|---|
| The number of pixels in block | 10 | 10 | 10 | 10 | 10 | 8 | 10 | 10 | 10 | 10 |
| The number of slits in block | 9 | 8 | 7 | 6 | 5 | 4 | 4 | 3 | 2 | 1 |

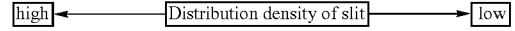
high ← Distribution density of slit → low

Thus, regardless of whether the number of blocks is an even number or an odd number, the region corresponding to the residual pixels where the slits are arranged in a distribution density of 50% is arranged in substantially the center of the mask joint part, and thereby the distribution density of the slits can smoothly change between the two regions where the distribution density of the slits linearly changes. Accordingly, in the liquid crystal display device in the present Embodiment, both of the first pixels and the second pixels are mixed pixels of the photomask 21b, the slits 25 are arranged in a distribution density of 25% that is between distribution densities of the slits 25 in two blocks adjacent to the region (the seventh and eighth blocks). Thus, according to each of the photomasks 21a and 21b, the region where the slits 25 are arranged in a distribution density that is between distribution densities of the slits 25 in two blocks adjacent to the region is arranged between the regions where the number of slits 25 per block decreases by one with increasing distance from the mask center part. In the photomask 21c as well as the photomask 21a, the region corresponding to residual pixels may be arranged between the second block and the third block. In the photomask 21d as well as the photomask 21b, the region corresponding to residual pixels may be arranged between the seventh block and the eighth block.

TABLE 8

| Block | 1 | 2 | Remainder | 3 | 4 | 5 | 6 | 7 | 8 | 9 |
|---|---|---|---|---|---|---|---|---|---|---|
| The number of pixels in block | 10 | 10 | 8 | 10 | 10 | 10 | 10 | 10 | 10 | 10 |
| The number of slits in block | 9 | 8 | 6 | 7 | 6 | 5 | 4 | 3 | 2 | 1 | high ◄———— Distribution density of slit ————► low

TABLE 9

| Block | 1 | 2 | 3 | 4 | 5 | 6 | 7 | Remainder | 8 | 9 |
|---|---|---|---|---|---|---|---|---|---|---|
| The number of pixels in block | 10 | 10 | 10 | 10 | 10 | 10 | 10 | 8 | 10 | 10 |
| The number of slits in block | 9 | 8 | 7 | 6 | 5 | 4 | 3 | 2 | 2 | 1 | high ◄———— Distribution density of slit ————► low

Even in such an embodiment, due to the slits that are arranged in the region corresponding to the residual pixels, the distribution density of the slits can change smoothly between the two regions where the distribution of the slits linearly changes. Accordingly, according to liquid crystal display device produced using the photomasks in accordance with this Embodiment, in the joint display region, the first and second pixels are mixed in such a way that the distribution densities each of the first and second pixels substantially linearly change. More specifically, the liquid crystal display device produced using the photomasks in this embodiment has, between the regions (the joint display regions) where the numbers each of the first and second pixels per block change by one (within the joint display region), a region where the first and second pixels are arrayed in such a way that the distribution density of the first pixels is between distribution densities of the first pixels in two blocks adjacent to the region. Also in the present Embodiment as well as Embodiments 2 and 3, the joint line can be effectively suppressed from being perceived.

Embodiment 5

A liquid crystal display device in accordance with Embodiment 5 is mentioned. The overlapping contents between the present Embodiment and Embodiments 1 to 4 are omitted and not shown in drawings because a difference between the two is just an embodiment of the photomasks used for exposing the alignment film. Like references designate elements having identical functions. FIG. 30 is an enlarged plan view schematically showing mask joint parts of photomasks in accordance with Embodiment 5. FIG. 31 is a graph showing a change in distribution density of slits in the mask joint parts of the photomasks in accordance with Embodiment 5. FIG. 31(a) shows one photomask. FIG. 31(b) shows the other photomask. In FIG. 30, one pixel is illustrated as the minimum unit because of space limitations. However, in fact, the slit is arranged on the picture element basis. That is, a slit having a width about half of a picture element pitch is arranged so as to be positioned in each of the RGB picture elements constituting the pixel where the slit is shown in FIG. 30.

As shown in FIG. 30, according to the photomasks 21a and 21b in the present Embodiment, the mask joint part is positioned in a region corresponding to 98 pixels. In each block corresponding to 10 pixels, the slits 25 are arranged in such a way that their distribution density linearly decreases, similarly to Embodiment 2. Further, a region corresponding to residual 8 pixels is divided into 8 regions and the 8 regions are evenly distributed in the mask joint part. More specifically, according to the photomask 21a, for example, each region corresponding to one residual pixel is arranged between blocks, and such a region is a light-shielding region, as shown in Table 10 and FIG. 31(a). Further, according to the photomask 21b, for example, each region corresponding to one residual pixel is arranged between blocks, and in such a region, the slits 25 are arranged as shown in Table 11 and FIG. 31(b). Also in the photomasks 21c and 21d as well as the photomasks 21a and 21b, the slits are arranged in such a way that the region corresponding to residual pixels is divided into some regions and the regions are evenly distributed in the mask joint part.

TABLE 10

| Block | 1 | Remainder | 2 | Remainder | 3 | Remainder | 4 | Remainder | 5 | Remainder |
|---|---|---|---|---|---|---|---|---|---|---|
| The number of pixels in block | 10 | 1 | 10 | 1 | 10 | 1 | 10 | 1 | 10 | 1 |
| The number of slits in block | 9 | 0 | 8 | 0 | 7 | 0 | 6 | 0 | 5 | 0 | high ◄———— Distribution density of slit ————

| Block | 6 | Remainder | 7 | Remainder | 8 | Remainder | 9 |
|---|---|---|---|---|---|---|---|
| The number of pixels in block | 10 | 1 | 10 | 1 | 10 | 1 | 10 |
| The number of slits in block | 4 | 0 | 3 | 0 | 2 | 0 | 1 |

————► low

TABLE 11

| Block | 1 | Remainder | 2 | Remainder | 3 | Remainder | 4 | Remainder | 5 | Remainder |
|---|---|---|---|---|---|---|---|---|---|---|
| The number of pixels in block | 10 | 1 | 10 | 1 | 10 | 1 | 10 | 1 | 10 | 1 |
| The number of slits in block | 9 | 1 | 8 | 1 | 7 | 1 | 6 | 1 | 5 | 1 | high ← Distribution density of slit

| Block | 6 | Remainder | 7 | Remainder | 8 | Remainder | 9 |
|---|---|---|---|---|---|---|---|
| The number of pixels in block | 10 | 1 | 10 | 1 | 10 | 1 | 10 |
| The number of slits in block | 4 | 1 | 3 | 1 | 2 | 1 | 1 |

→ low

Thus, according to Embodiment 5, even if the mask joint part has the region corresponding to the residual pixels, the distribution density of the slits can substantially linearly change in the mask joint part. Accordingly, in the liquid crystal display device in the present Embodiment, the first and second pixels are mixed in such a way that the distribution densities each of the first and second pixels substantially linearly change in the joint display region. More specifically, according to the liquid crystal display device in the present Embodiment, the second pixels are substantially evenly distributed in the region (joint display region) where the number of the plurality of first pixels per block and the number of the plurality of second pixels per block each change by one. Accordingly, also in the liquid crystal display device in Embodiment 5 as well as those in Embodiments 2 and the like, the joint line can be effectively suppressed from being perceived.

As shown in FIGS. 30 and 31, in the photomask 21*a*, no slits are arranged in the region corresponding to the residual pixel, and in the photomasks 21*b*, the slits are arranged in such a region. However, according to the present Embodiment, the region corresponding to the residual pixel where the slits are arranged is not necessarily included only in the photomask 21*b*. Every region corresponding to the residual pixel may be appropriately arranged between the blocks in either of the photomask 21*a* or 21*b*. Thus, according to the photomasks 21*a* and 21*b*, the plurality of slits (8 or less slits in the present Embodiment) may be substantially evenly distributed in the region where the number of the slits 25 per block decreases by one with increasing distance from the mask center part. In addition, in the liquid crystal display device in the present Embodiment, the first or second pixels may be substantially evenly distributed in the region (the joint display region) where the numbers each of the first and second pixels per block change by one. It should be understand that the photomasks 21*c* and 21*d* also may have this embodiment.

As mentioned in Embodiments 2 to 5, in the present invention, it is preferable that the number of pixels that are positioned in the mask joint part, the number of blocks, and the number of pixels in each block, are determined in such a way that the relationship of (the number of pixels that are positioned in the mask joint part) is not larger than (the number of blocks×the number of pixels in each block) is satisfied. If (the number of pixels that are positioned in the mask joint part) is equal to (the number of the blocks×the number of pixels in each block), all of the pixels that are positioned in the mask joint part can be allocated to blocks without residual pixels. If (the number of pixels that are positioned in the mask joint part) is smaller than (the number of blocks×the number of pixels in the block), not every pixel that is positioned in the mask joint part can be allocated to blocks having the same area, and residual pixels exist. However, the region corresponding to the residual pixel can be arranged within and/or without the mask joint part as mentioned in Embodiment 3 to 5.

The area of the mask joint part can be increased in Embodiments 4 where the region corresponding to the residual pixels is arranged in a region except for the ends of the mask joint part and Embodiment 5 where the region corresponding to the residual pixels is divided into some regions and the regions are distributed in the mask joint part. That is, according to these Embodiments, the distribution density of the slits can be changed over a wider range. Accordingly, the luminance can more smoothly change between the adjacent two display regions. Thus, according to Embodiments 3 to 5 where the region corresponding to the residual pixels are arranged within and/or without the mask joint part, Embodiments 4 and 5 are prefer to Embodiment 3 where the region corresponding to the residual pixels is arranged at one or both ends of the mask joint part, in view of more effectively suppress generation of the joint line.

In the present invention, it is preferable that the number of blocks and the number of pixels in each block are determined in such a way that a relationship of (the number of pixels in each block)=(the number of blocks)+1 is satisfied. As a result, the number of slits can be changed by one between adjacent two blocks, as mentioned in Embodiments 2 to 5. Accordingly, the luminance can more smoothly change between the adjacent two display regions.

Embodiment 6

A liquid crystal display device in accordance with Embodiment 6 is mentioned. The overlapping contents between the present Embodiment and Embodiments 1 to 5 are omitted and not shown in drawings because a difference between the two is just an embodiment of the photomasks used for exposing the alignment film. Like references designate elements having identical functions. FIG. 32 is an enlarged plan view schematically showing mask joint parts of photomasks in accordance with Embodiment 6. In FIG. 32, one pixel is illustrated as the minimum unit because of space limitations. However, in fact, the slit is arranged on the picture element basis. That is, a slit having a width about half of a picture element pitch is arranged so as to be positioned in each of the RGB picture elements constituting the pixel where the slit is shown in FIG. 32.

As shown in FIG. 32, according to the photomasks 21*a* and 21*b* in the present Embodiment, the mask joint part is positioned in a region corresponding to 35 pixels. In this case, the slits 25 in 5 blocks of the mask joint part are arranged in such a way that their distribution density linearly decreases, similarly to Embodiment 2. More specifically, as shown in Table 12, according to the photomasks 21*a* and 21*b*, the number of the slits 25 per block (area corresponding to 6 pixels in the present Embodiment) decreases by one with increasing distance from the mask center part. The arrangement form of the slits in the mask joint part is left-right reversed between the photomask 21a and the photomask 21b, as shown in FIG. 32. That is, the pattern of the slits 25 in the mask joint parts is substantially the same between the photomasks 21a and 21b. A pixel group in a region where the slits are arranged and a pixel group in a region where no slits are arranged (light-shielding region) in the mask joint part are arranged symmetrically with respect to the center line of the mask joint part (the center line in the third block in the present Embodiment). In addition, also in the photomasks 21c and 21d as well as the photomasks 21a and 21b, the slits are arranged in such a way that the slits are arranged symmetrically with respect to the center line of the mask joint part.

TABLE 12

| Block | 1 | 2 | 3 | 4 | 5 |
|---|---|---|---|---|---|
| The number of pixels in block | 6 | 6 | 6 | 6 | 6 |
| The number of slits in block | 5 | 4 | 3 | 2 | 1 | high ← Distribution density of slit → low

As a result, similarly to the above-mentioned Embodiments, according to the liquid crystal display device in the present Embodiment, the joint line can be effectively suppressed from being perceived. According to the liquid crystal display device in the present Embodiment, the first pixels and the second pixels in the joint display region are arranged symmetrically with respect to the center line of the joint display region.
Embodiment 7

A liquid crystal display device in accordance with Embodiment 7 is mentioned. The overlapping contents between the present Embodiment and Embodiments 1 to 6 are omitted and not shown in drawings because a difference between the two is just an embodiment of the photomasks used for exposing the alignment film. Like references designate elements having identical functions. FIGS. 33(a) to (c) are plan views each schematically showing a first substrate in an exposure step in accordance with Embodiment 7.

According to the present Embodiment, the alignment film is exposed by shot exposure. More specifically, similarly to Embodiment 1, a photomask 21a having a mask center part 19a and a mask joint part 20a and a photomask 21b having a mask center part 19b and a mask joint part 20b are used. In the photomasks 21a and 21b, a plurality of slits extending in the y-axis direction are arranged in the x-axis direction. The photomasks 21a and 21b each have an area slightly large than half of the first substrate 1.

Then, an alignment marker (not shown) that is on the first substrate 1 is scanned, and the photomask 21a and the first substrate 1 are arranged at a desired position. With the photomask 21a and the first substrate 1 being fixed, the alignment film that is arranged on the first substrate 1 surface can be exposed by one shot from a direction oblique to the surface of the first substrate 1 (the 1st shot) through the photomask 21a. Then, the first substrate 1 is horizontally moved by substantially half of a picture element pitch in the x-axis direction, in such a way that each slit in the photomask 21a is positioned in an unexposed region of each pixel. Then, the alignment film is exposed by one shot (2nd shot) in the opposite direction at substantially the same incident angle as that in the 1st shot. As a result, each pixel (each picture element) in substantially half region on the left side in the first substrate 1, specifically, each picture element that overlaps with the mask center part 19a and some picture elements that overlap with a part of the mask joint part 20a are each divided into two domains where alignment directions are parallel and opposite to each other, like the picture elements shown in FIG. 2(a).

As shown in FIG. 33(b), a substantially half region on the right side of each pixel in the first substrate 1 is subjected to shot exposure twice through the photomask 21b, similarly to the exposure using the photomask 21a. Thus, also in the present Embodiment, as shown in FIG. 33(c), the first substrate 1 includes: an exposure region 22, which is exposed through the mask center part 19a of the photomask 21a; an exposure region 23, which is exposed through the mask center part 19b of the photomask 21b; and a joint exposure part 24, which is exposed through the mask joint parts 20a and 20b of the photomasks 21a and 21b. According to the present Embodiment, the second substrate is subjected to the shot exposure in the same manner as in the first substrate.

According to the present Embodiment, in the mask joint parts of the photomasks, each being positioned in the joint exposure part, the distribution density of the slits is appropriately decreased, similarly to Embodiments 1 to 6. Also in the present Embodiment where the shot exposure is employed as well as in Embodiments 1 to 6 where the scan exposure is employed, the display qualities and the yield of the liquid crystal display device can be improved.

As mentioned above, the present invention is mentioned in detail with reference to Embodiments 1 to 7. Within the scope of the invention, the above-mentioned Embodiments may be appropriately combined.

The present application claims priority to Patent Application No. 2007-54793 filed in Japan on Mar. 5, 2007 under the Paris Convention and provisions of national law in a designated State, the entire contents of which are hereby incorporated by reference.

BRIEF DESCRIPTION OF DRAWINGS

FIG. 2(a) shows the first substrate. FIG. 2(b) shows the second substrate.

FIG. 14(a) shows a pixel array in the first display region.

FIG. 14(b) shows a pixel array in the joint display region.

FIG. 14(c) shows a pixel array in the second display region adjacent to the first display region.

FIG. 15(a) shows picture elements in the first display region. FIG. 15(b) shows picture elements in the second display region.

FIG. 25(a) is one photomask.

FIG. 25(b) shows the other photomask.

FIG. 29(a) shows one photomask.

FIG. 29(b) shows the other photomask.

FIG. 31(a) shows one photomask.

FIG. 31(b) shows the other photomask.

EXPLANATION OF NUMERALS AND SYMBOLS

Figure 1:
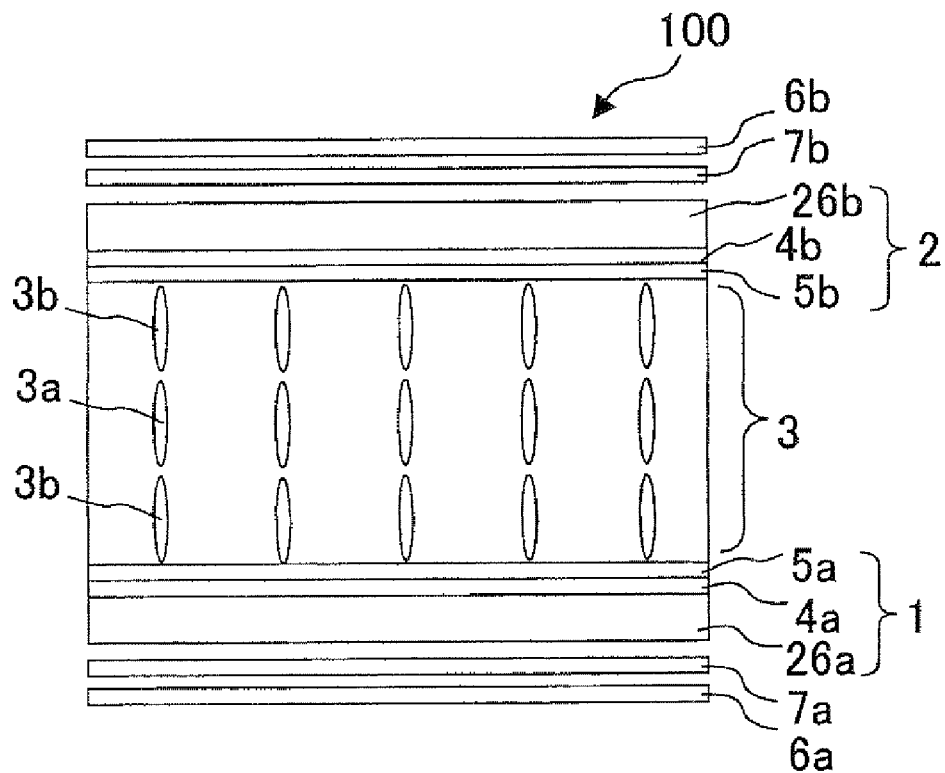
FIG. 1 is a cross-sectional view schematically showing the configuration of the liquid crystal display device in accordance with Embodiment 1.
Figure 2:
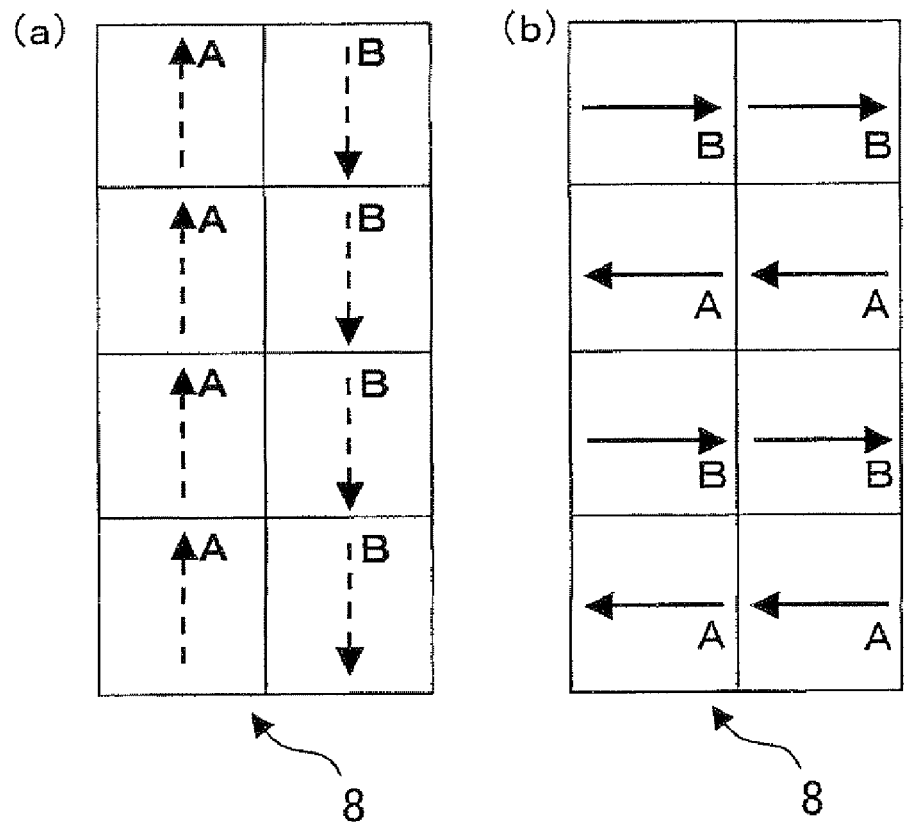
FIG. 2 is a plan view schematically showing a direction of photo-irradiation to the vertical alignment film in each picture element in the liquid crystal display device in accordance with Embodiment 1.
Figure 3:
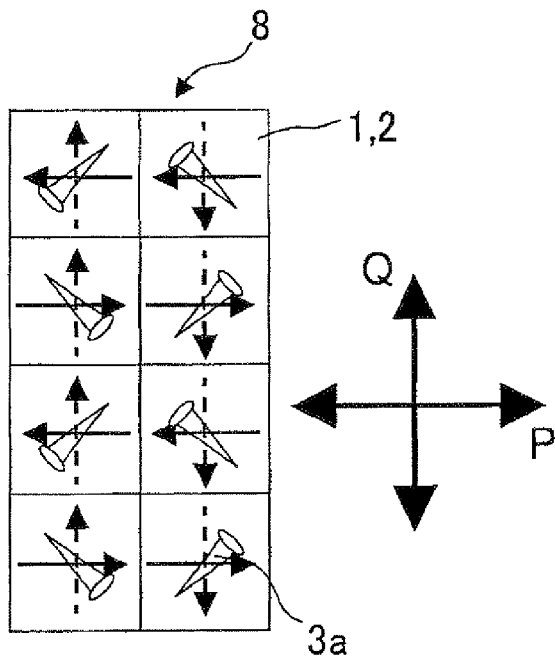
FIG. 3 is a plan view schematically showing: a direction of photo-irradiation to the vertical alignment film; an alignment direction of a liquid crystal molecule when a voltage is applied; and a direction of a polarization axis of a polarization plate and in each picture element in the liquid crystal display device in accordance with Embodiment 1.
Figure 4:
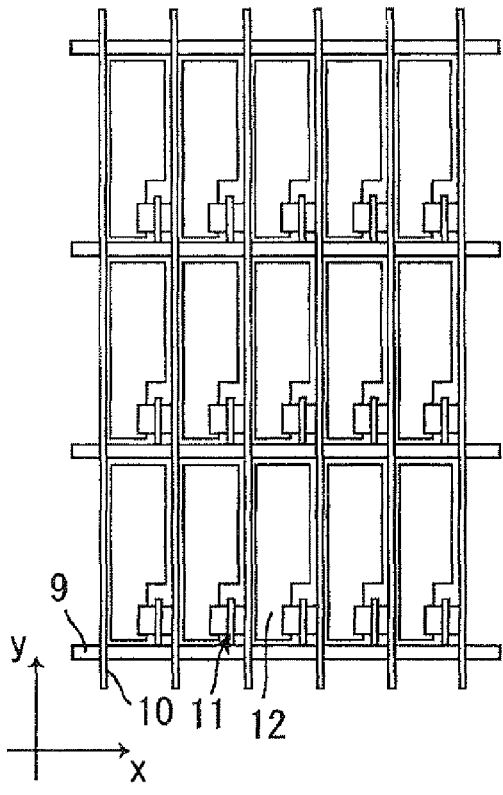
FIG. 4(a) is a plan view schematically showing the first substrate (TFT array substrate) in accordance with Embodiment 1.
FIG. 4(b) is a plan view schematically showing the second substrate (CF substrate) in accordance with Embodiment 1.
Figure 4:
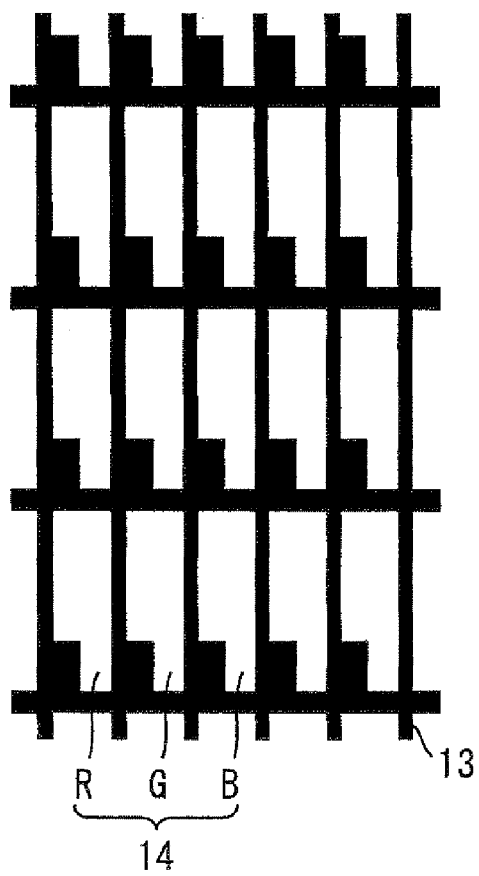
Figure 5:
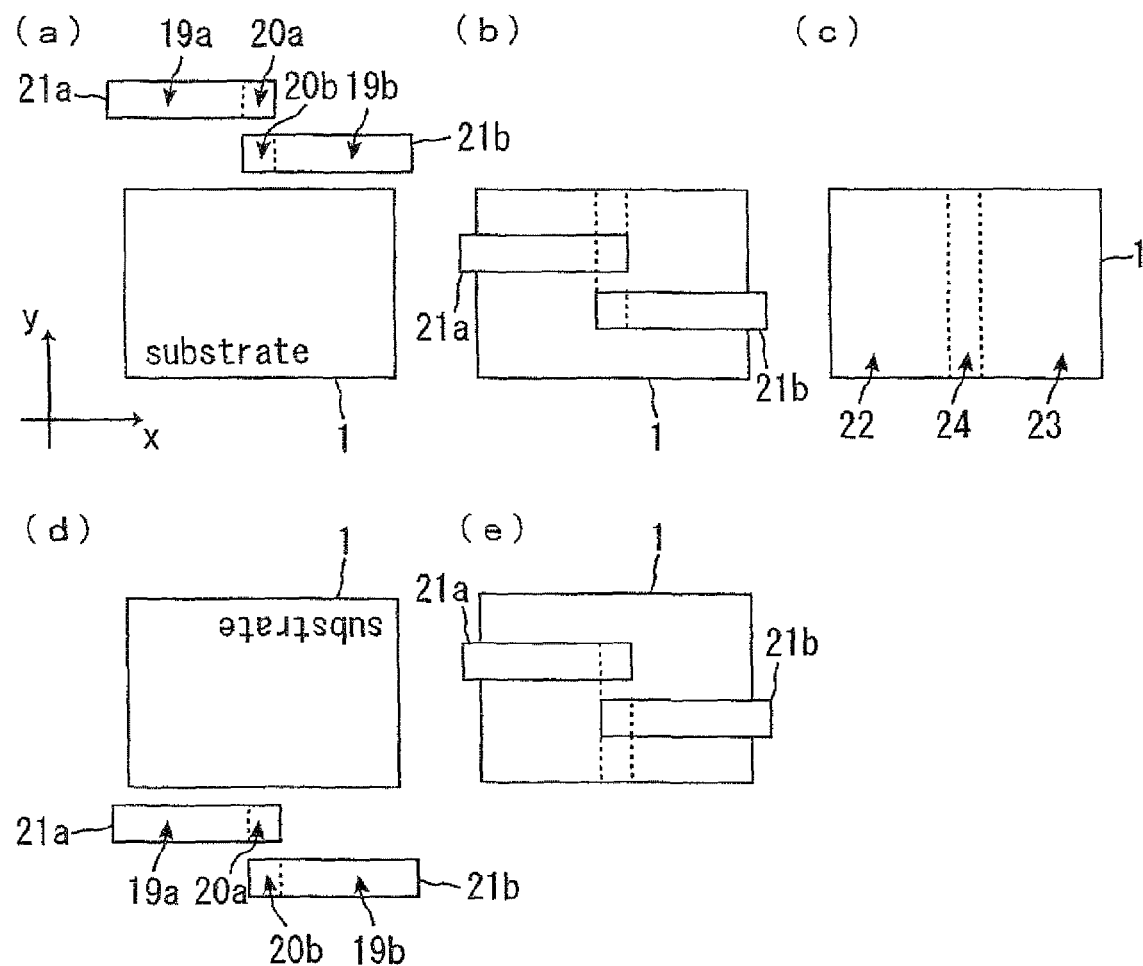
FIGS. 5(a) to 5(e) are plan views each schematically showing the first substrate in the exposure step in accordance with Embodiment 1.
Figure 6:
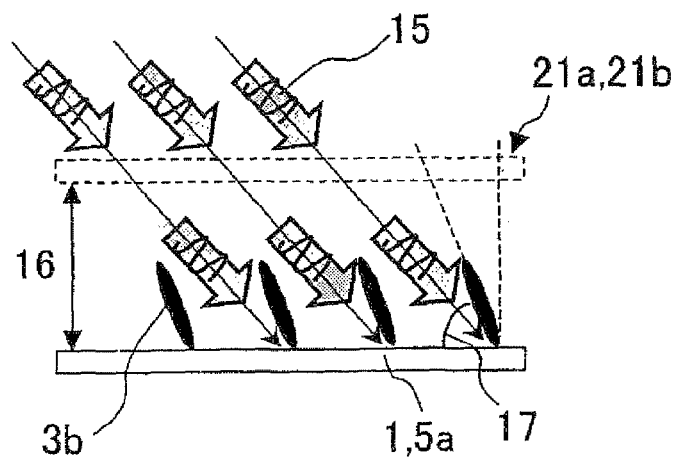
FIG. 6 is a cross-sectional view schematically showing the first substrate in the exposure step in accordance with Embodiment 1 and showing an embodiment of photo-irradiation to the first substrate.
Figure 7:
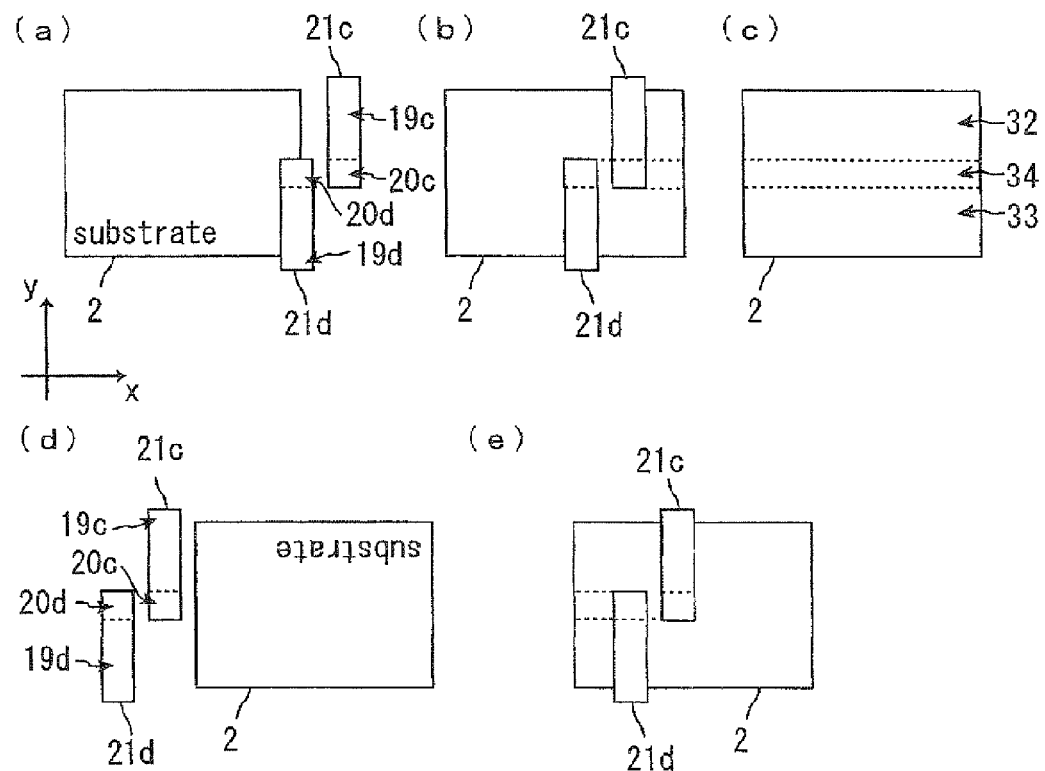
FIGS. 7(a) to 7(e) are plan views schematically showing the second substrate in the exposure step in accordance with Embodiment 1.
Figure 8:
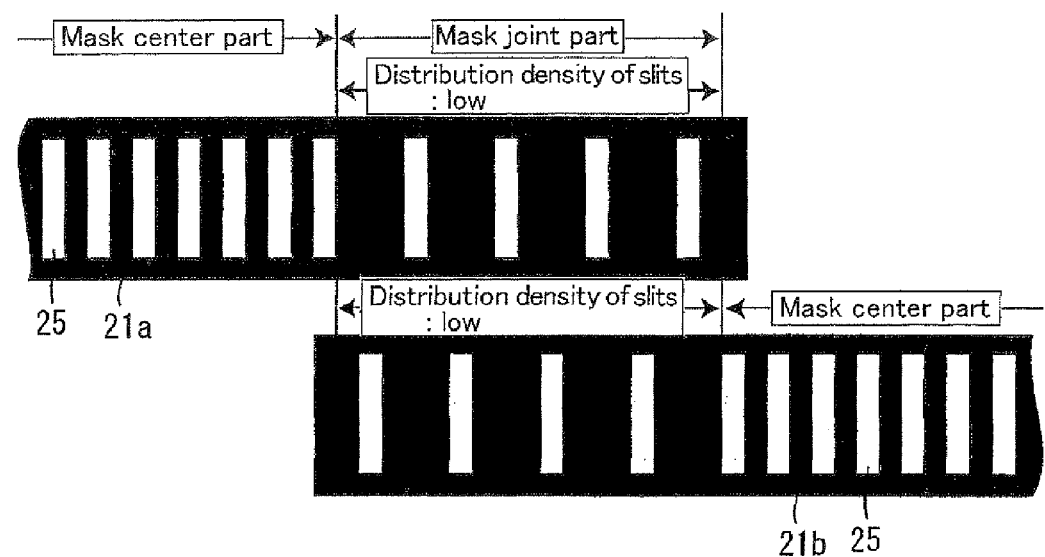
FIG. 8 is an enlarged plan view schematically showing the photomasks in accordance with Embodiment 1.
Figure 9:
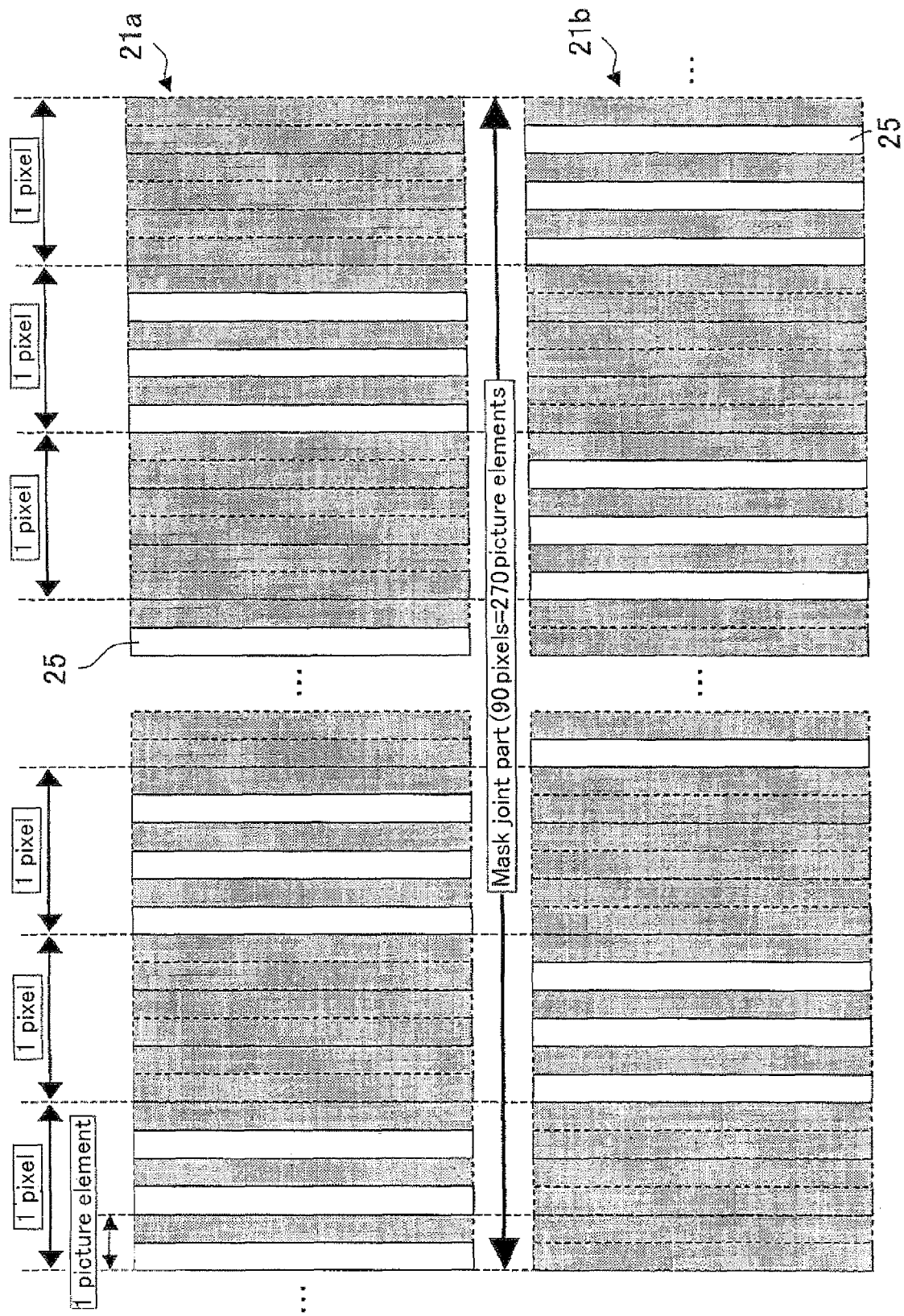
FIG. 9 is an enlarged plan view schematically showing the mask joint parts of the photomasks in accordance with Embodiment 1.
Figure 10:
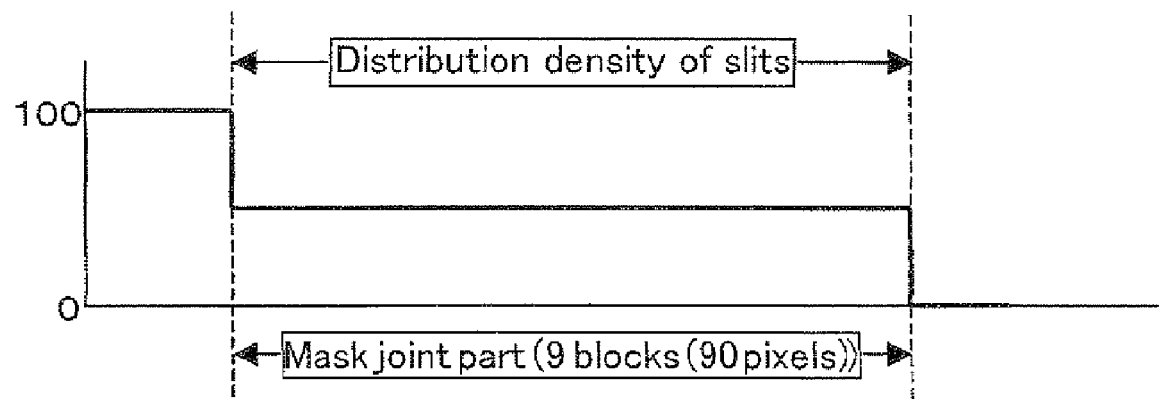
FIG. 10 is a graph showing a change in distribution density of the slits in each of the mask joint parts of the photomasks in accordance with Embodiment 1.
Figure 11:
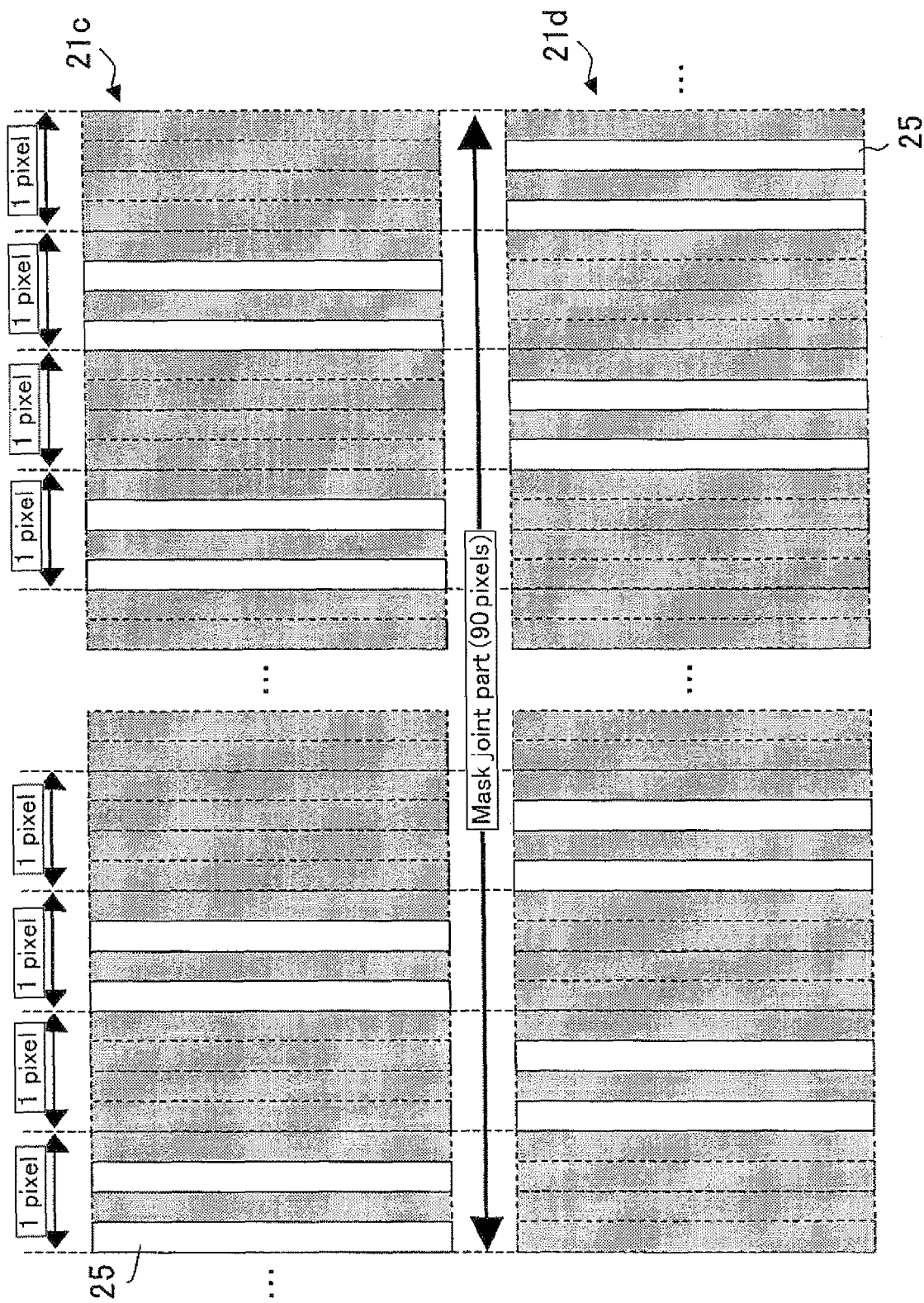
FIG. 11 is an enlarged plan view schematically showing mask joint parts of other photomasks in accordance with Embodiment 1.
Figure 12:
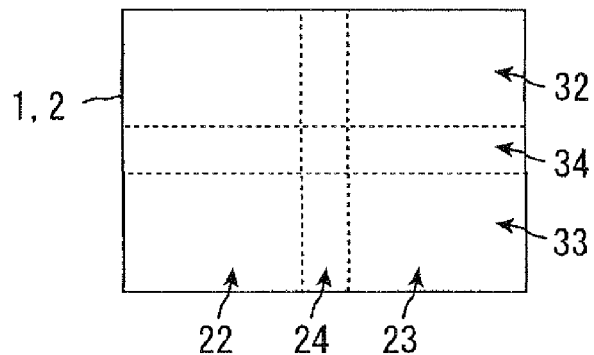
FIG. 12 is a plan view schematically showing the first and second substrates attached to each other in accordance with Embodiment 1.
Figure 13:
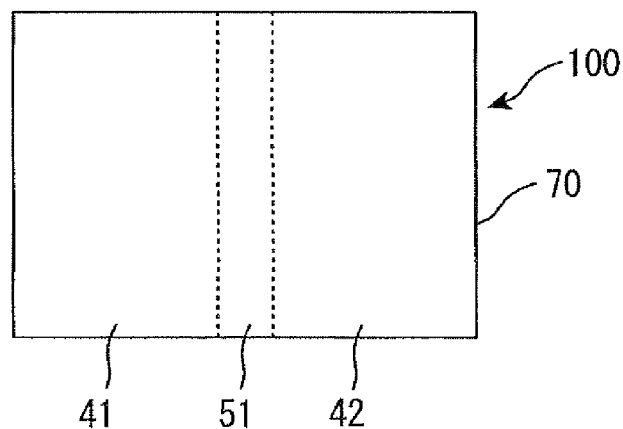
FIG. 13 is a plan view schematically showing the display region of the liquid crystal display device in accordance with Embodiment 1.
Figure 14:
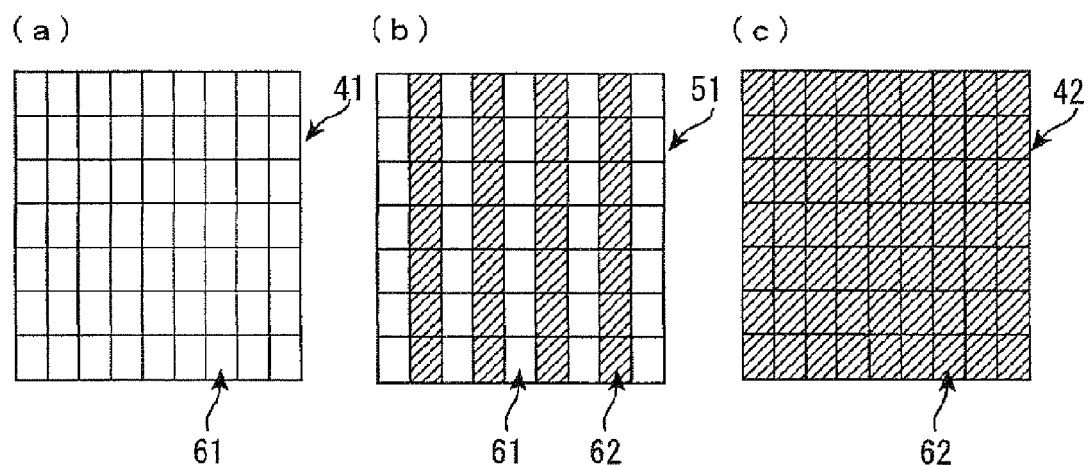
FIG. 14 is an enlarged plan view schematically showing a pixel array in the display region of the liquid crystal display device shown in FIG. 13.
Figure 15:
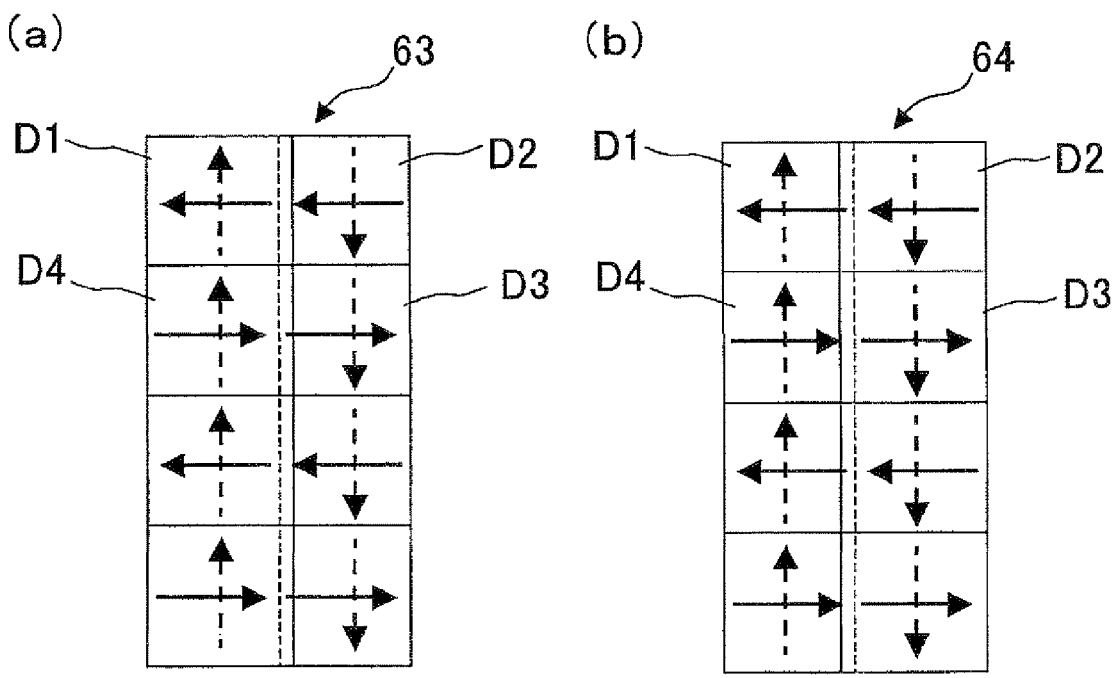
FIG. 15 is a plan view schematically showing picture elements in the first and second display regions in the liquid crystal display device shown in FIG. 13.
Figure 16:
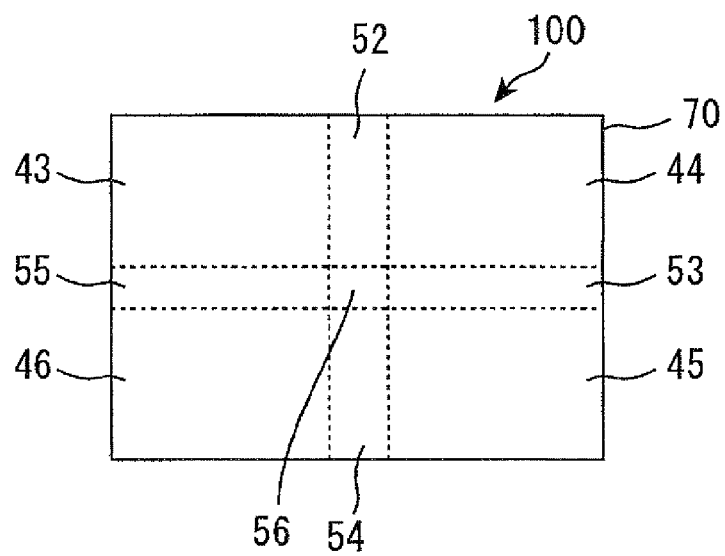
FIG. 16 is a plan view schematically showing the display region of the liquid crystal display device in accordance with another example of Embodiment 1.
Figure 17:
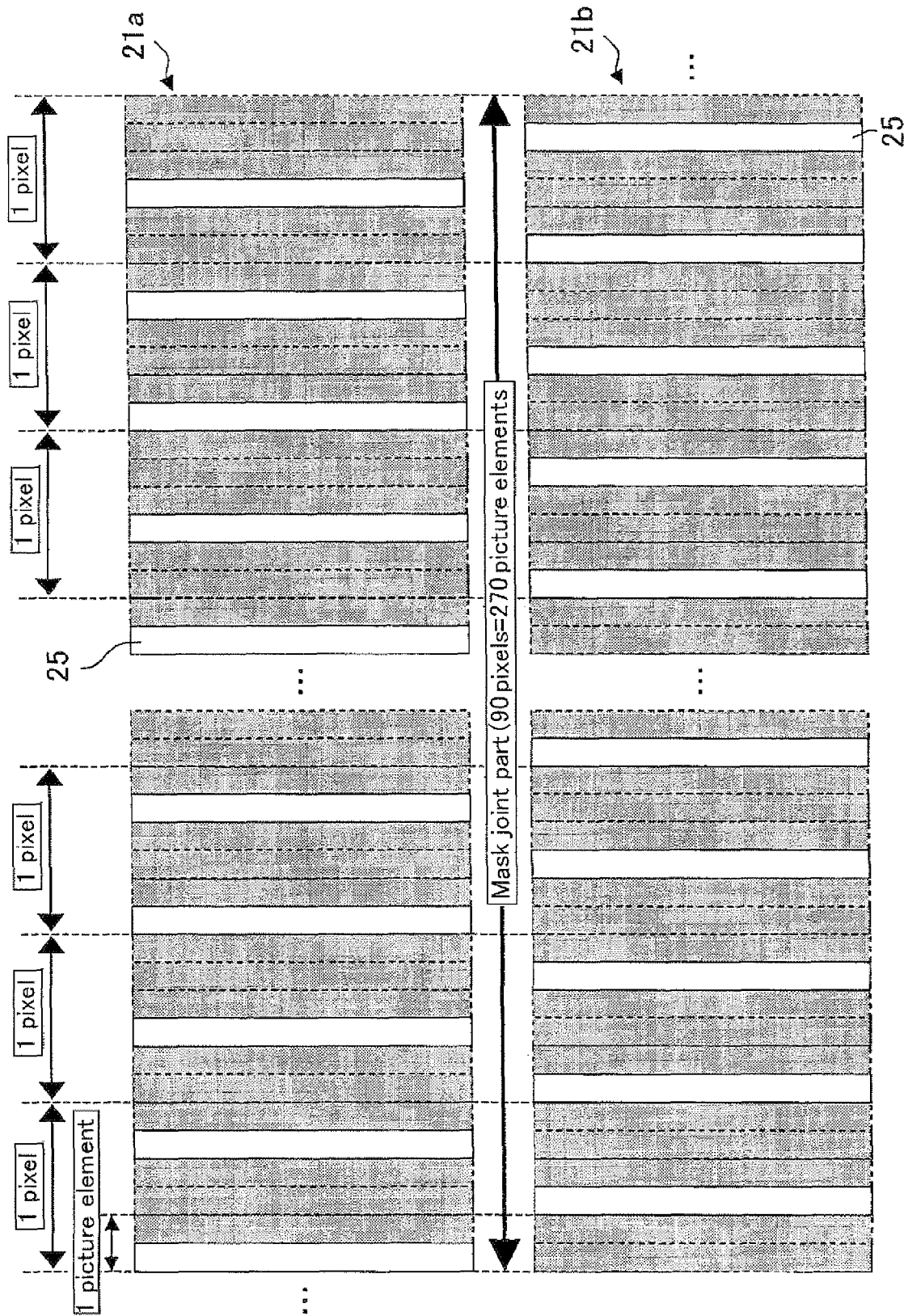
FIG. 17 is an enlarged plan view schematically showing mask joint parts of photomasks in accordance with another example of Embodiment 1.
Figure 18:
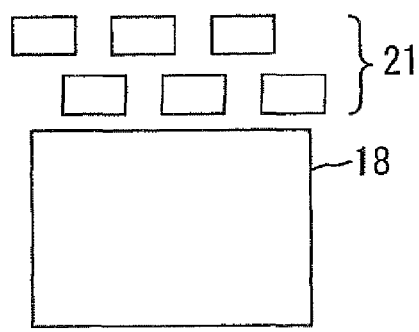
FIG. 18 is a plan view schematically showing a liquid crystal display device in an exposure step in accordance with another example of Embodiment 1.
Figure 19:
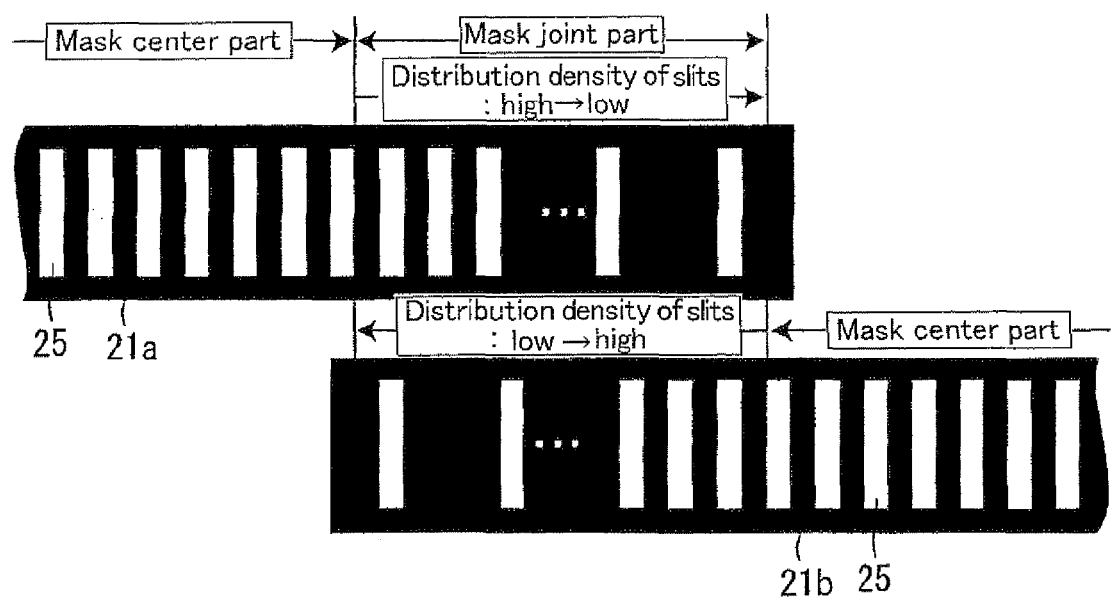
FIG. 19 is an enlarged plan view schematically showing the photomasks in accordance with Embodiment 2.
Figure 20:
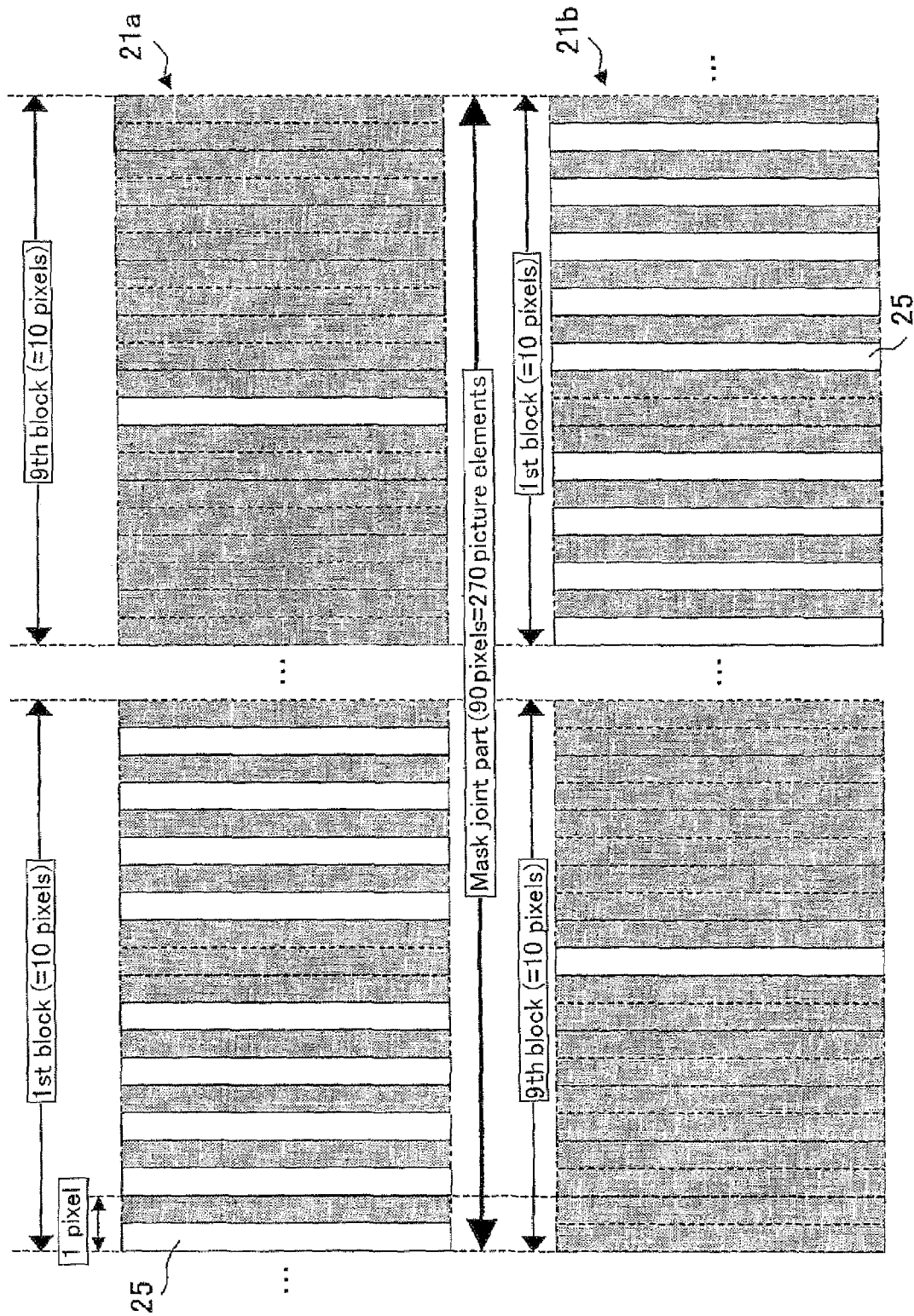
FIG. 20 is an enlarged plan view schematically showing the mask joint parts of the photomasks in accordance with Embodiment 2.
Figure 21:
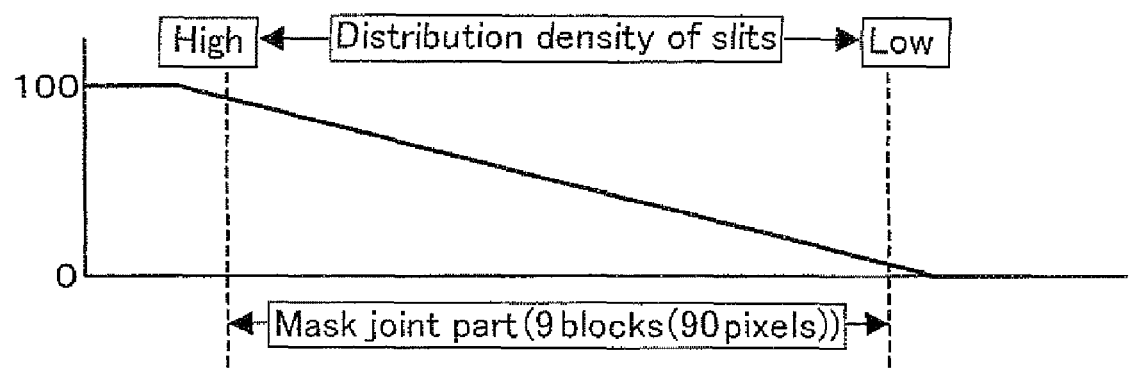
FIG. 21 is a graph showing a change in distribution density of slits in each of the mask joint parts of the photomasks in accordance with Embodiment 2.
Figure 22:
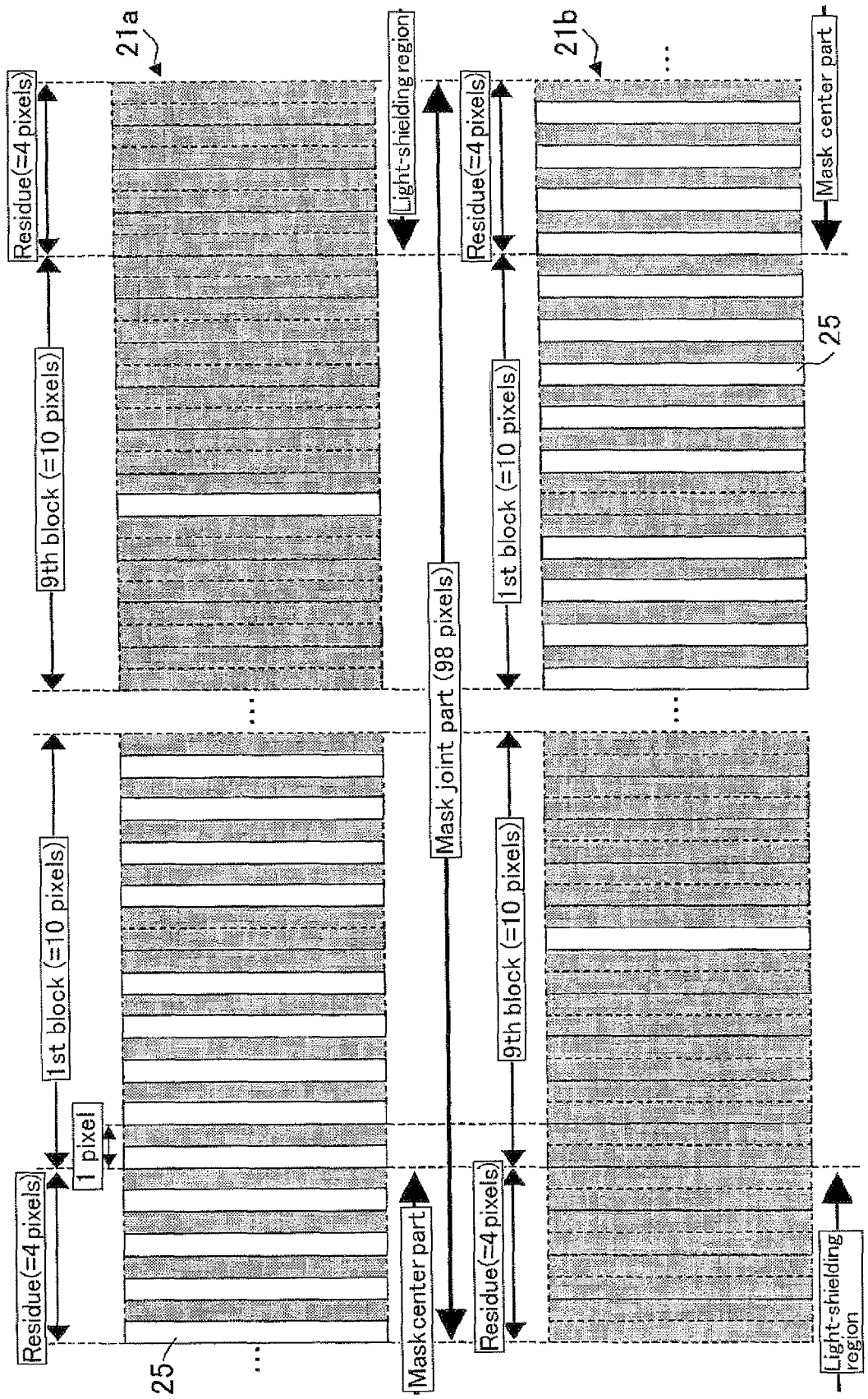
FIG. 22 is an enlarged plan view schematically showing the mask joint parts of the photomasks in accordance with Embodiment 3.
Figure 23:
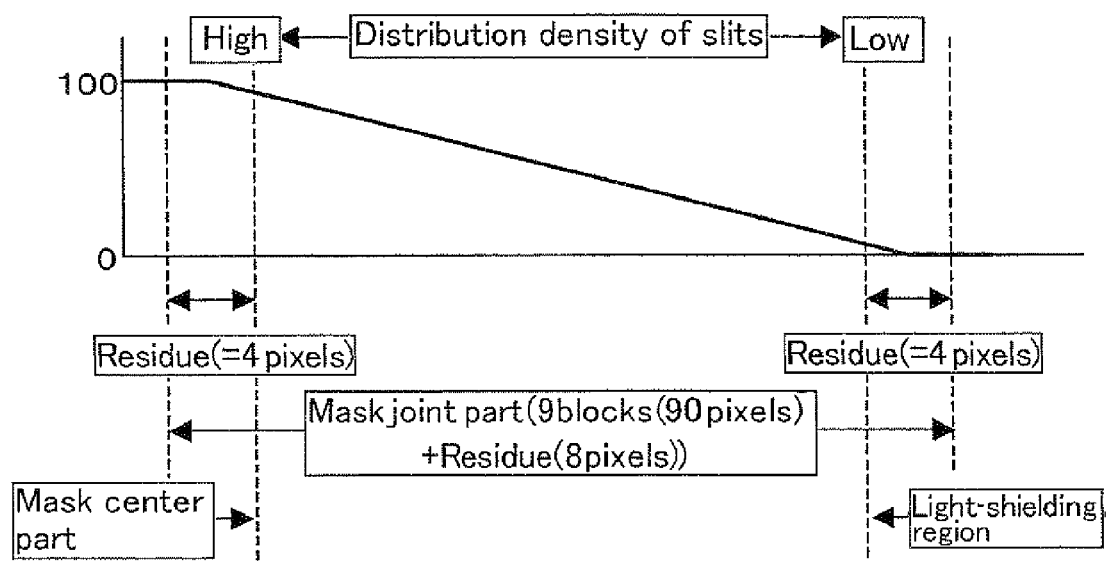
FIG. 23 is a graph showing a change in distribution density of slits in the mask joint parts of the photomasks in accordance with Embodiment 3.
Figure 24:
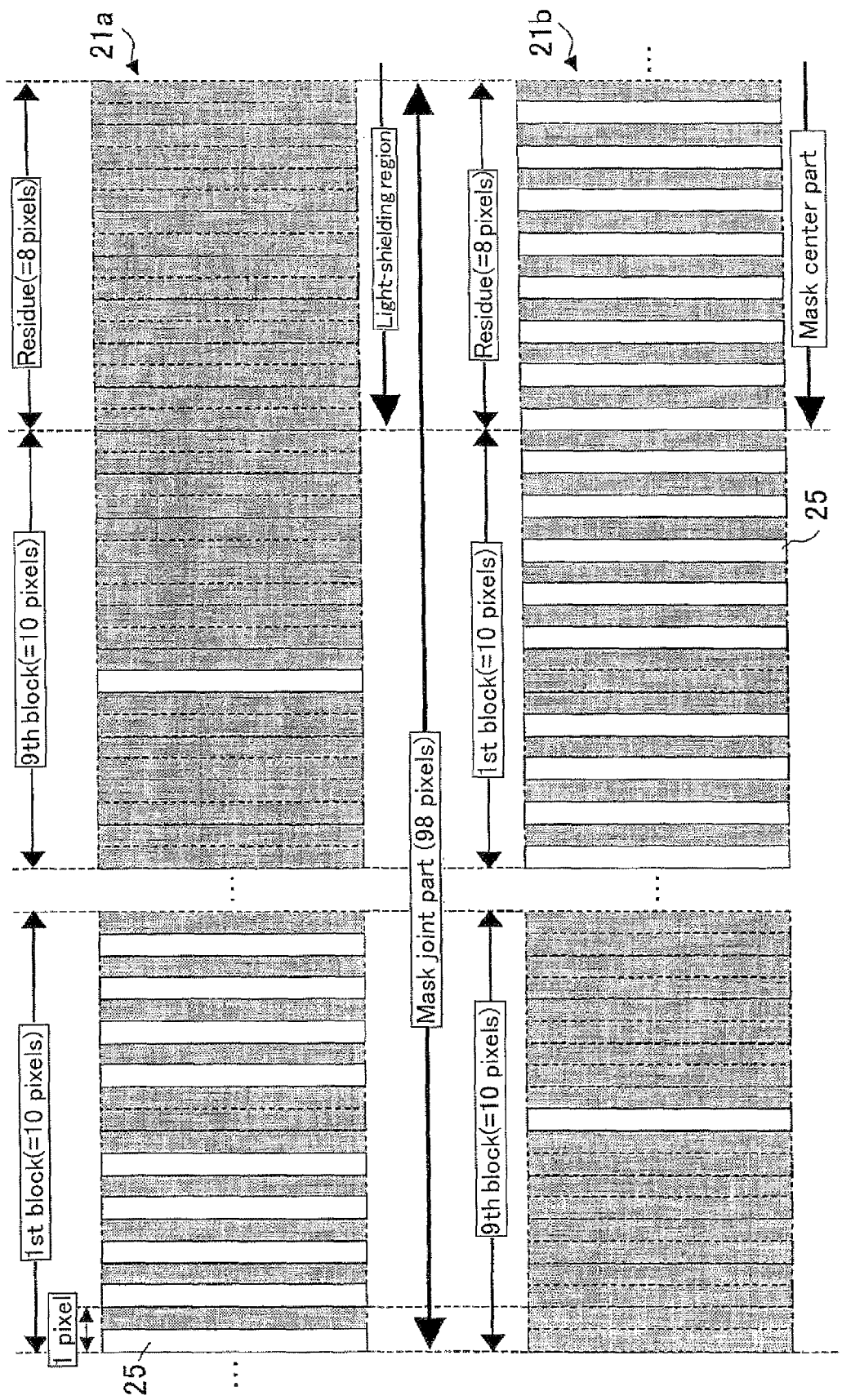
FIG. 24 is an enlarged plan view schematically showing the mask joint parts of the photomasks in accordance with another example of Embodiment 3.
Figure 25:
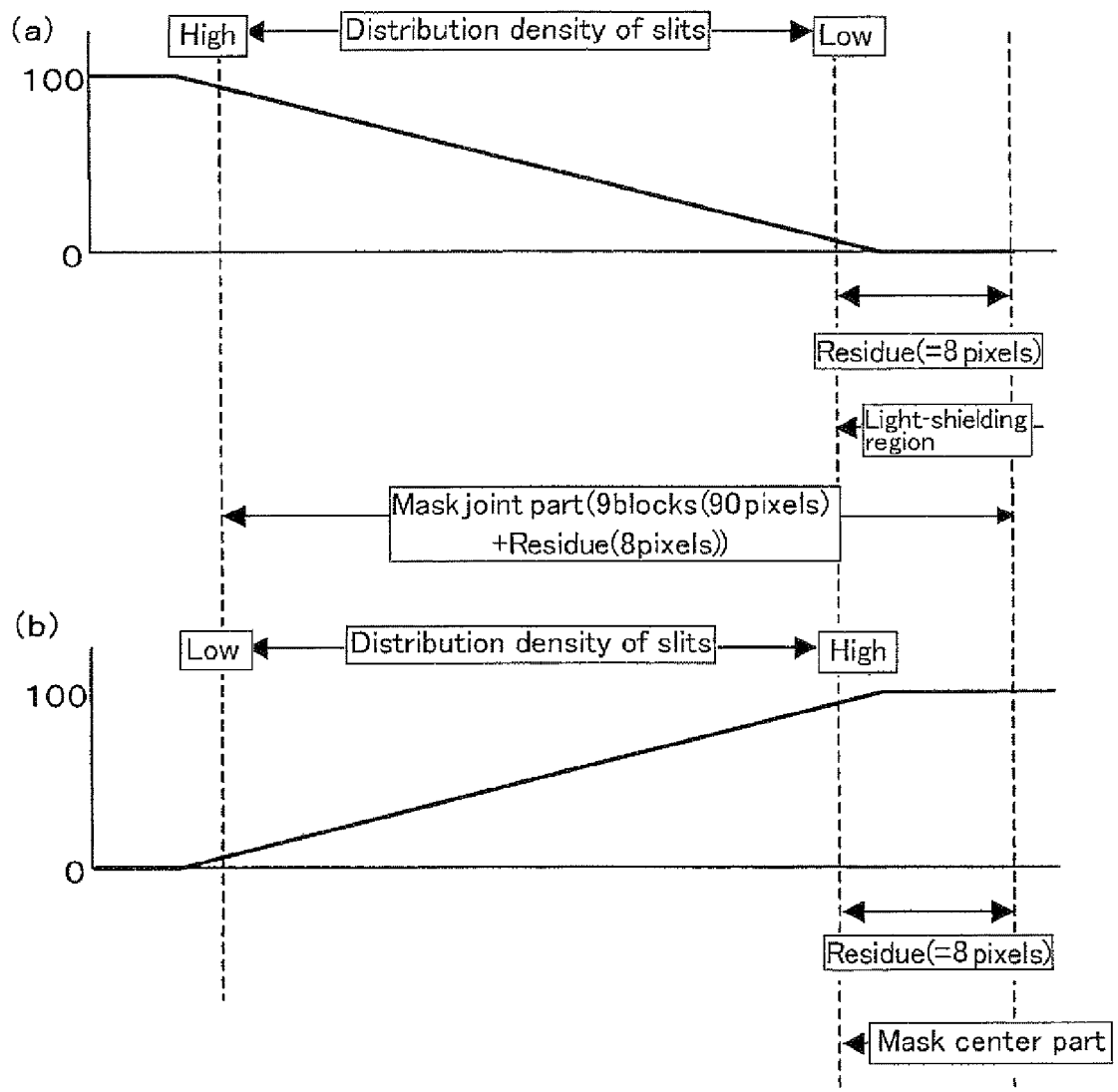
FIG. 25 is a graph showing a change in distribution density of slits in each of the mask joint parts of the photomasks in accordance with another example of Embodiment 3.
Figure 26:
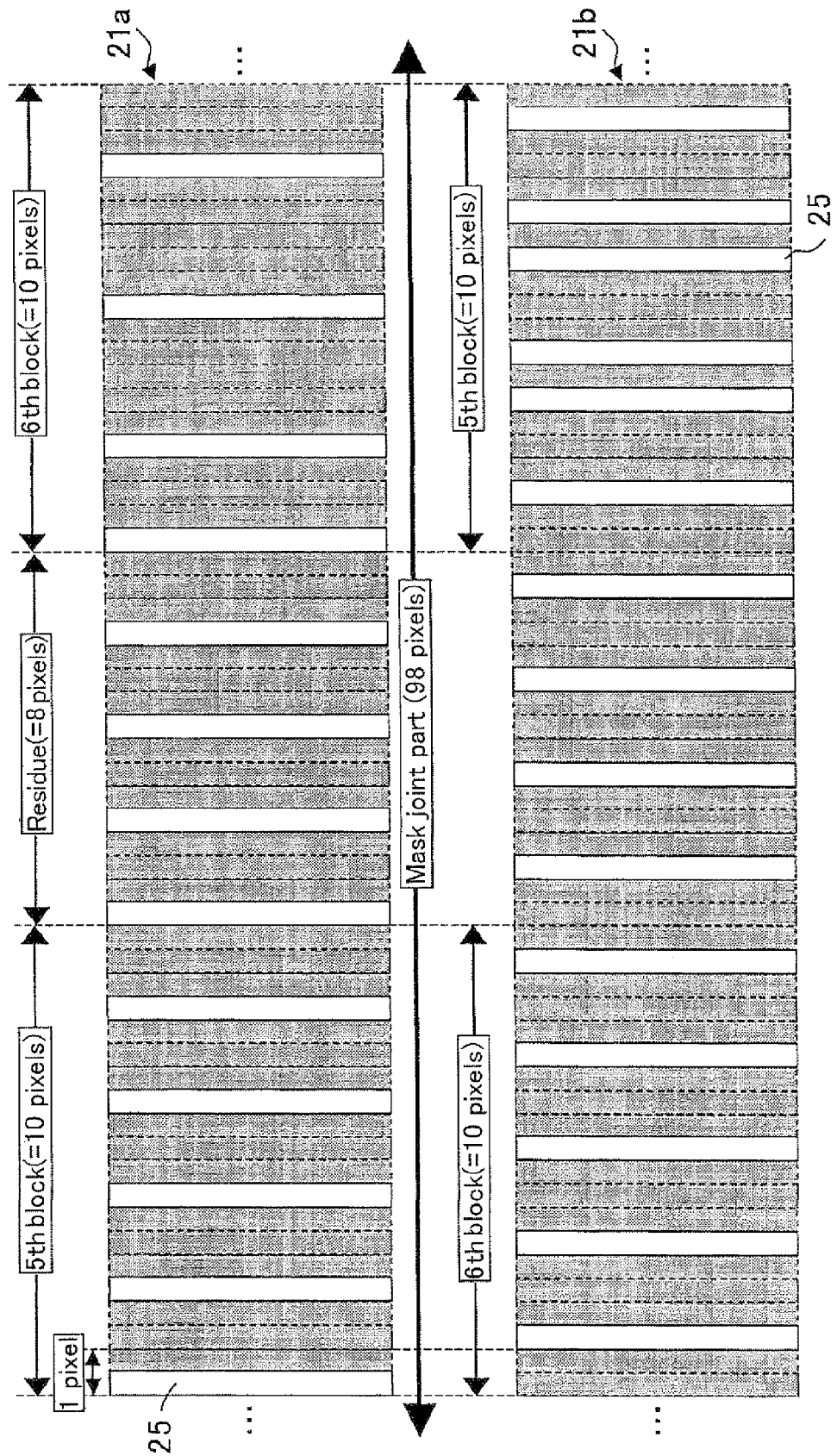
FIG. 26 is a plan view schematically showing the mask joint parts of the photomasks in accordance with Embodiment 4.
Figure 27:
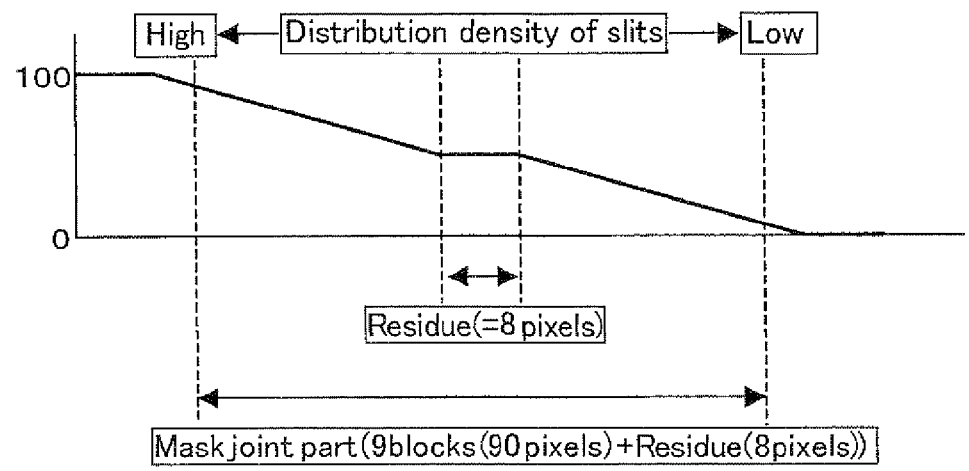
FIG. 27 is a graph showing a change in distribution density of slits in the mask joint parts of the photomasks in accordance with Embodiment 4.
Figure 28:
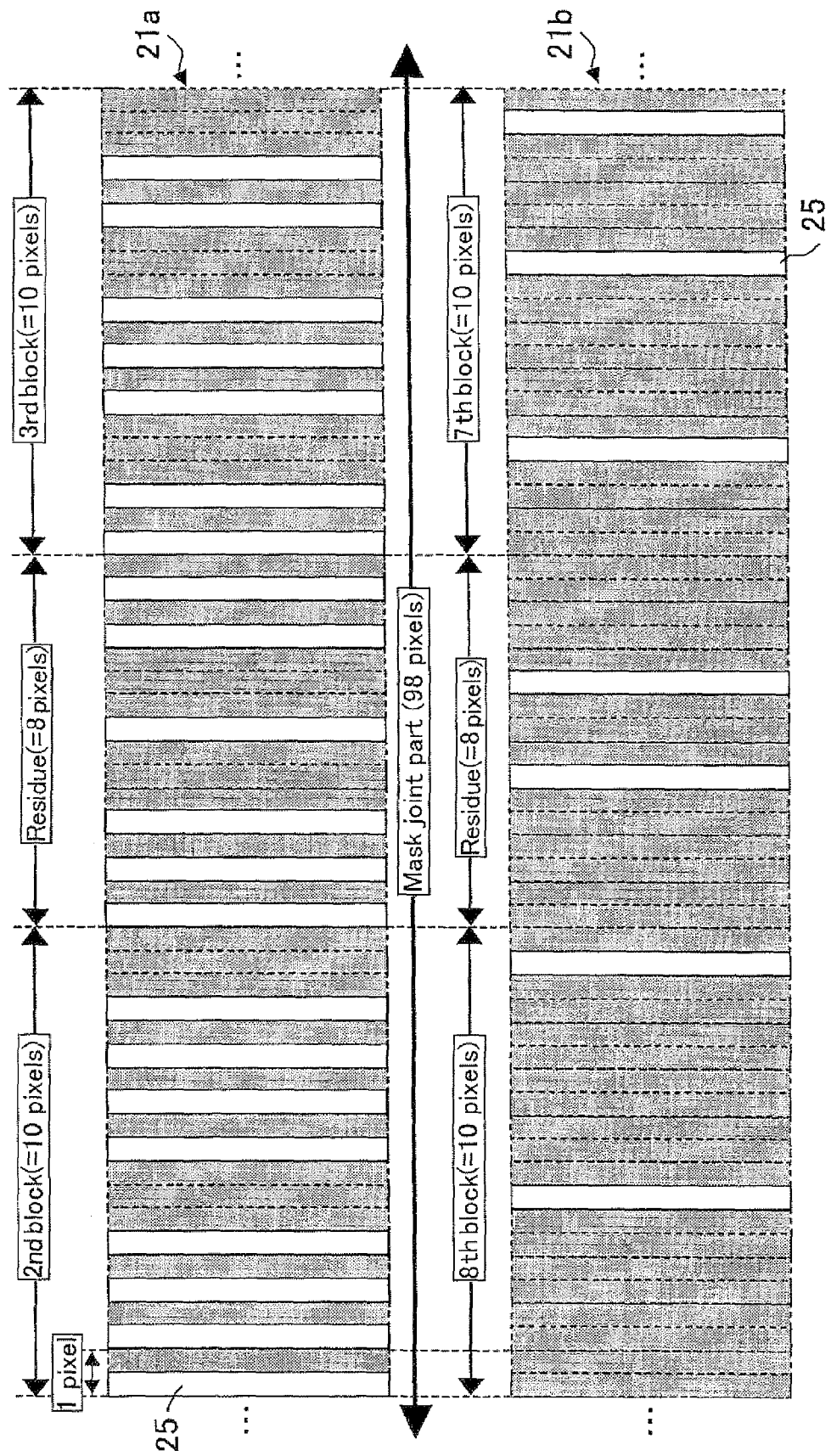
FIG. 28 is an enlarged plan view schematically showing the mask joint parts of the photomasks in accordance with another example of Embodiment 4.
Figure 29:
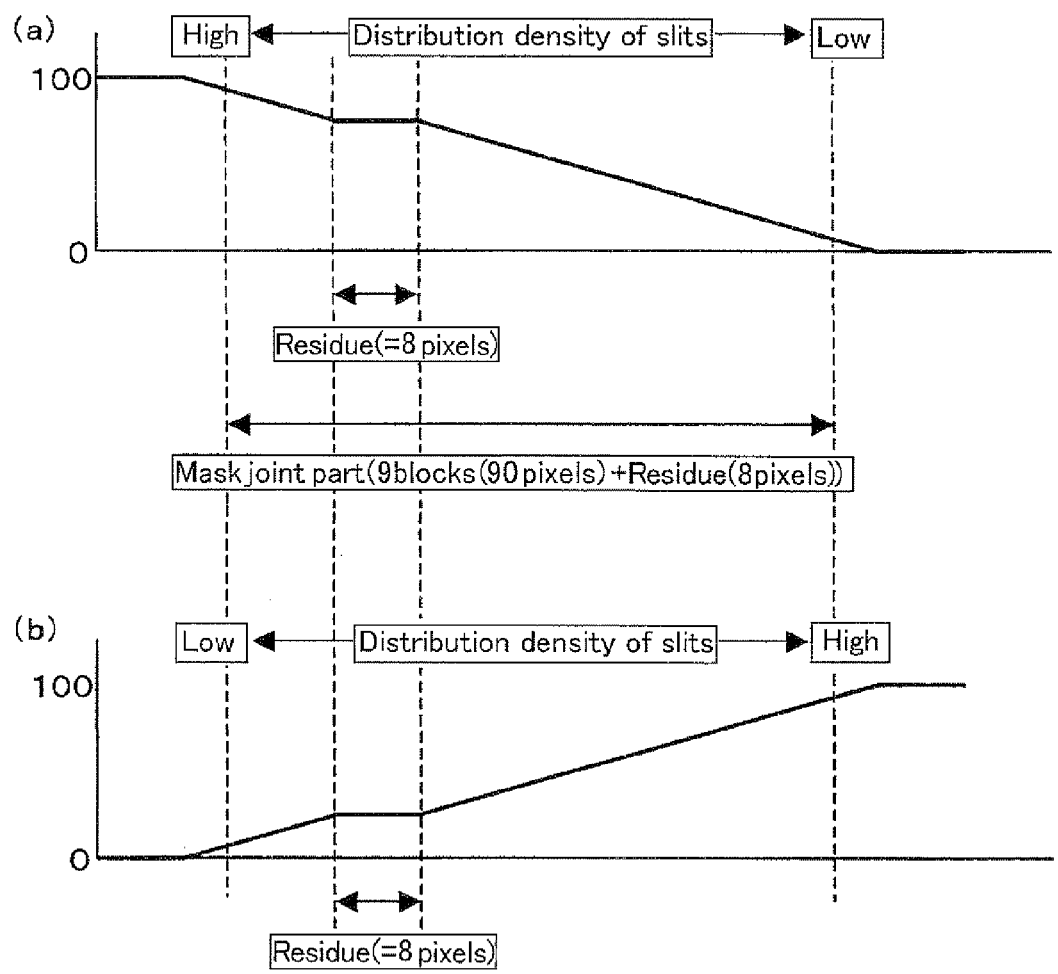
FIG. 29 is a graph showing a change in distribution density of slits in the mask joint parts of the photomasks in accordance with another example of Embodiment 4.
Figure 30:
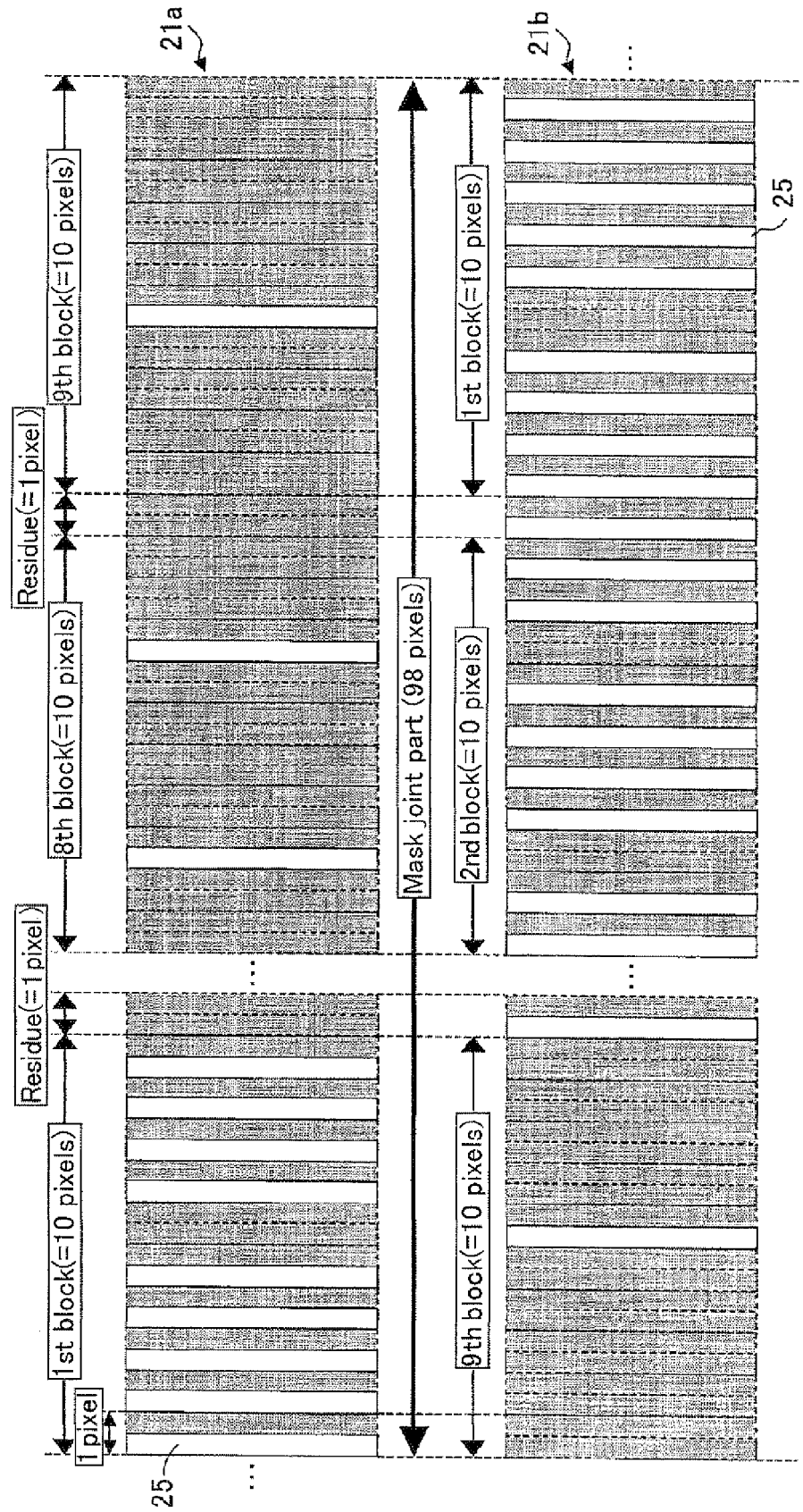
FIG. 30 is an enlarged plan view schematically showing the mask joint parts of the photomasks in accordance with Embodiment 5.
Figure 31:
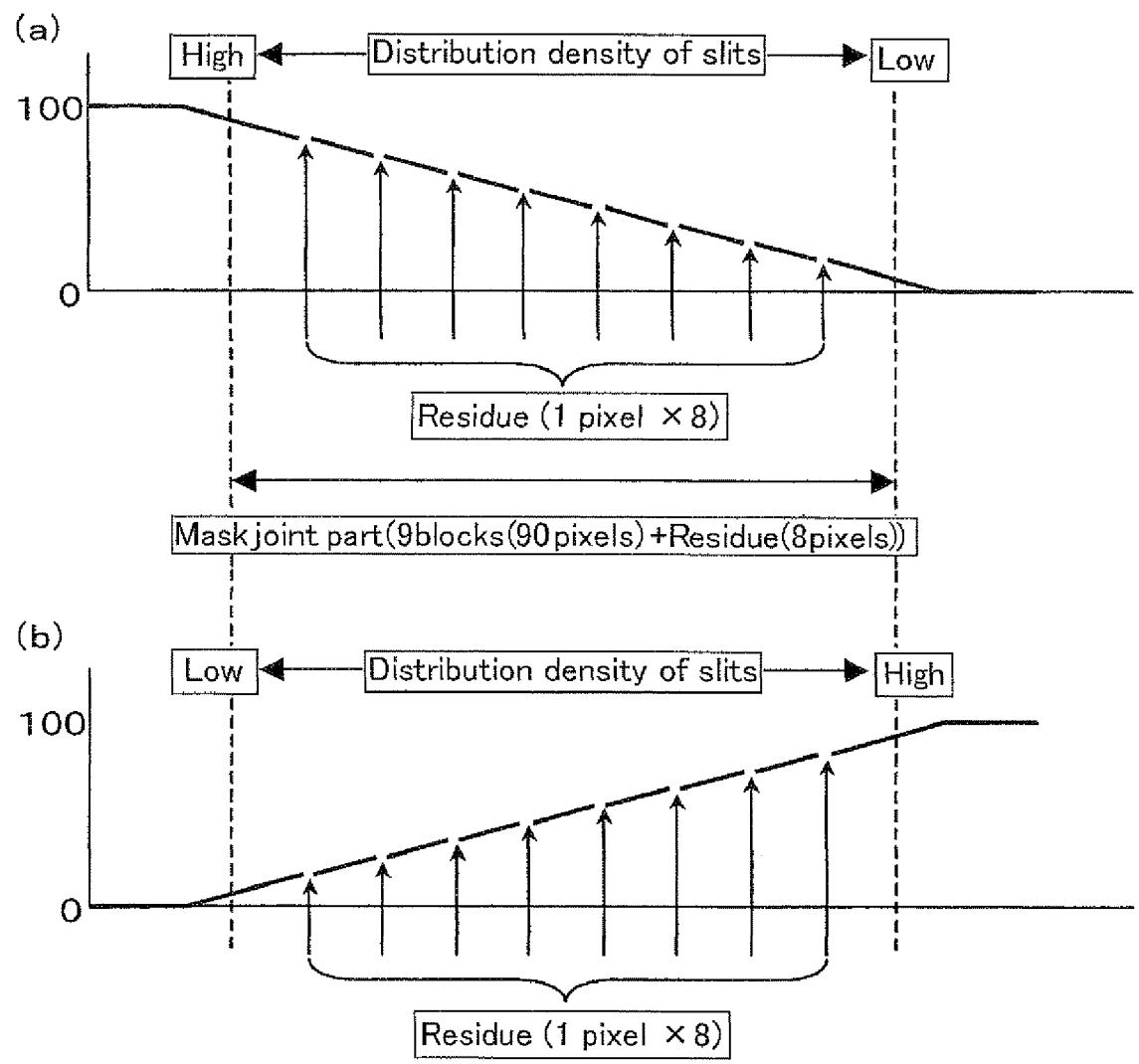
FIG. 31 is a graph showing a change in distribution density of slits in the mask joint parts of the photomasks in accordance with Embodiment 5.
Figure 32:
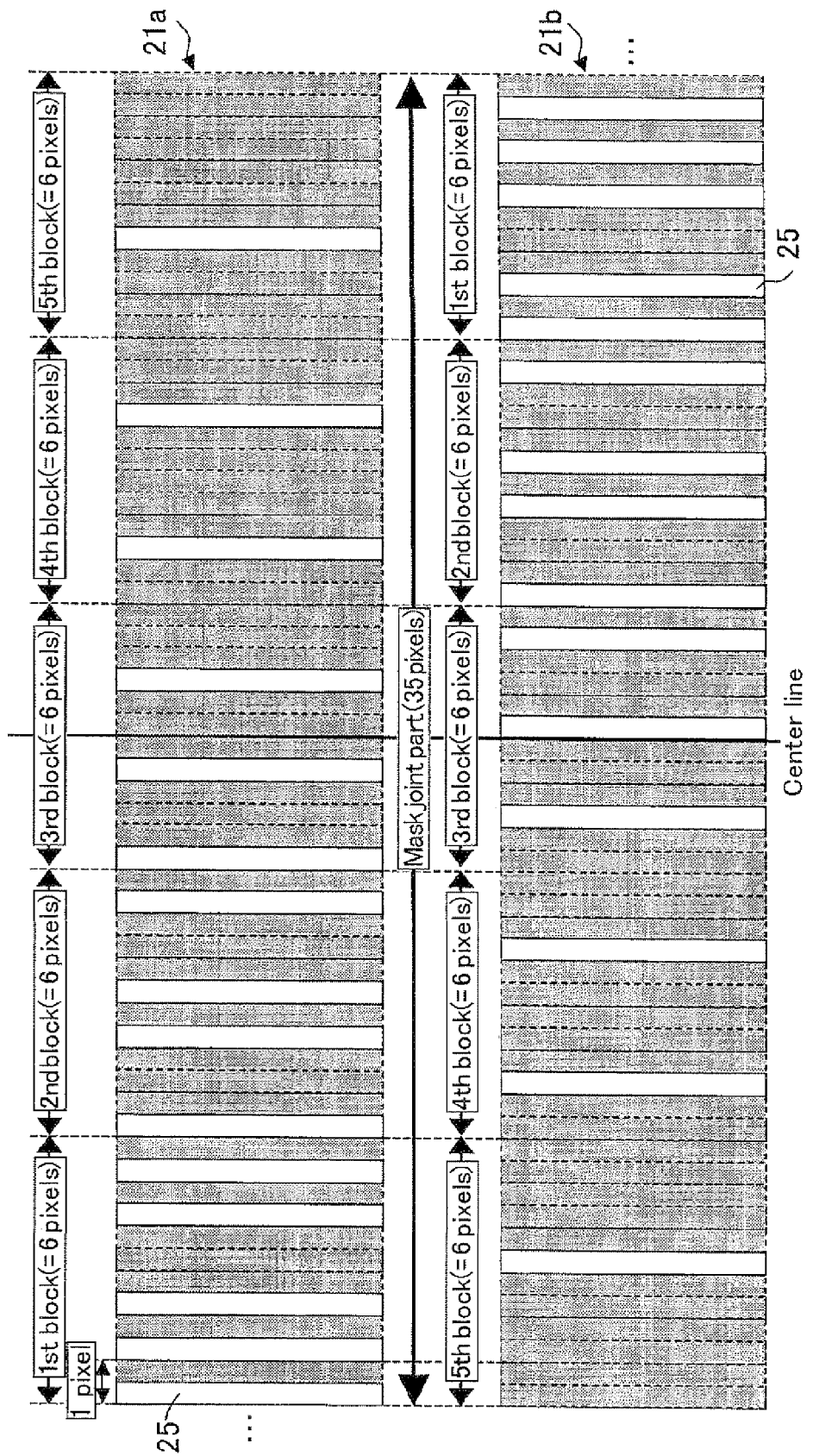
FIG. 32 is an enlarged plan view schematically showing the mask joint parts of the photomasks in accordance with Embodiment 6.
Figure 33:
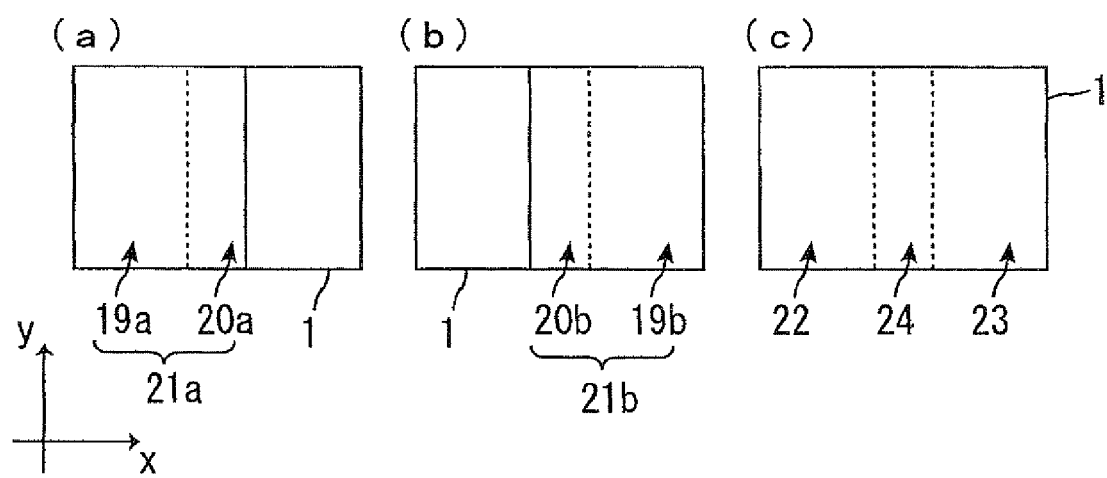
FIGS. 33(a) to (c) are plan views each schematically showing the first substrate in an exposure step in accordance with Embodiment 7.

1: First substrate
1: Second substrate
3: Liquid crystal layer
3a, 3b: Liquid crystal molecule
4a, 4b: Transparent electrode
5a, 5b: Vertical alignment film
6a, 6b: Polarization plate
7a, 7b: Retarder
8, 63, 64: Picture element
9: Scanning signal line
10: Data signal line
11: TFT
12: Pixel electrode
13: Black matrix (BM)
14: Color filter
15: Light beam (polarized UV ray)
16: Proximity gap
17: Pretilt angle
18: Substrate
19a, 19b, 19c, 19d: Mask center part
20a, 20b, 20c, 20d: Mask joint part
21, 21a, 21b, 21c, 21d: Photomask
22, 23, 32, 33: Exposure region
24, 34: Joint exposure part
25: Slit
26a, 26b: Insulating substrate
41, 42, 43, 44, 45, 46: Display region
51, 52, 53, 54, 55: Joint display region
56: Intersection display region
61, 62: Pixel
70: Display region
100: Liquid crystal display device
P: Direction of polarization axis of polarization plate 6a
Q: Direction of polarization axis of polarization plate 6b
A, B: Direction
R: Red colored layer
G: Blue colored layer
B: Green colored layer D1, D2, D3, D4: Domain

The invention claimed is:

1. A production method of a liquid crystal display device, the liquid crystal display device including:
a pair of substrates facing each other;
a liquid crystal layer arranged between the pair of substrates;
an alignment film arranged on a liquid crystal layer-side surface of at least one of the pair of substrates; and
a pixel including two or more regions different in alignment direction,
the production method comprising
an exposure step of exposing a part of the alignment film using a photomask having a mask center part and a mask joint part,
the mask center part having a plurality of transmissive parts formed within a light-shielding region,
the mask joint part having a region where a plurality of transmissive parts are formed within a light-shielding region in a distribution density lower than a distribution density of the plurality of transmissive parts in the mask center part.

2. The production method according to claim 1,
wherein the exposure step includes a step of exposing the alignment film as follows:
a plane of the alignment film is compartmentalized into two or more exposure regions and a joint exposure part interposed between adjacent two exposure regions of the two or more exposure regions,
the alignment film in one of the adjacent two exposure regions is exposed through the mask center part, and
the alignment film in the joint exposure part is exposed through the mask joint part.

3. The production method according to claim 2,
wherein the exposure step includes a step of exposing the alignment film using a plurality of the photomasks,
the alignment film in a first exposure region of the adjacent two exposure regions and in the joint exposure region is exposed through a first photomask of the plurality of the photomasks,
the alignment film in a second exposure region of the adjacent two exposure regions and in the joint exposure region is exposed through a second photomask of the plurality of the photomasks,
the plurality of transmissive parts are formed in the mask joint parts in the first and second photomasks in such a way that the plurality of transmissive parts in the mask joint part of the first photomask face a pixel group and the plurality of transmissive parts in the mask joint part of the second photomask face another pixel group,
the two pixel groups satisfying a mutually complementary arrangement relationship.

4. The production method according to claim 1,
wherein the distribution density of the plurality of transmissive parts in the mask joint part is half of the distribution density of the plurality of transmissive parts in the mask center part.

5. The production method according to claim 1,
wherein the mask joint part has a region where the distribution density of the plurality of transmissive parts decreases with increasing distance from the mask center part.

6. The production method according to claim 5,
wherein the mask joint part has a region where the distribution density of the plurality of transmissive parts linearly decreases with increasing distance from the mask center part.

7. The production method according to claim 6,
wherein the mask joint part has a region where the number of the plurality of transmissive parts per given area decreases by one with increasing distance from the mask center part.

8. The production method according to claim 7,
wherein in the mask joint part, the number of the plurality of transmissive parts per given area decreases by one with increasing distance from the mask center part.

9. The production method according to claim 7,
wherein the plurality of transmissive parts are evenly distributed in the region where the number of the plurality of transmissive parts per given area decreases by one with increasing distance from the mask center part.

10. The production method according to claim 7,
wherein the photomask has, in the center of the region where the number of the plurality of transmissive parts per given area decreases by one with increasing distance from the mask center part, a region where the plurality of transmissive parts are formed in a distribution density half of the distribution density of the plurality of transmissive parts in the mask center part.

11. The production method according to claim 7,
wherein the photomask has, in the region where the number of the plurality of transmissive parts per given area decreases by one with increasing distance from the mask center part, an additional region where the plurality of transmissive parts are formed in a distribution density that is between distribution densities of the plurality of transmissive parts in two given areas adjacent to the additional region.

12. The production method according to claim 1,
wherein in the mask joint part,
the plurality of transmissive parts and the light-shielding region are arranged
in such a way that the plurality of transmissive parts face a pixel group and the light-shielding region faces another pixel group,
the two pixel groups being arranged symmetrically with respect to a center line of the mask joint part.

13. The production method according to claim 1,
wherein in the exposure step, the alignment film is exposed by moving at least one of the substrate and a light source.

14. The production method according to claim 1,
wherein in the exposure step, the alignment film is exposed, with the substrate and a light source being fixed.

15. The production method according to claim 1,
wherein the liquid crystal display device includes a plurality of the pixels,
in the exposure step, the alignment film is exposed so that each pixel includes two regions different in an alignment direction of liquid crystal molecules near a surface of the alignment film when the pair of substrates are viewed in plane, and
the alignment direction in one region is parallel and opposite to the alignment direction in the other region.

16. The production method according to claim 15,
wherein the alignment film is arranged on each of the pair of substrates,
the production method includes:
exposure of the alignment films; and
attachment of the pair of substrates,
each performed so that in each substrate, liquid crystal molecules near a surface of the alignment film in each pixel are aligned in two parallel and opposite directions when the pair of substrates are viewed in plane, and an alignment direction of liquid crystal molecules near a surface of the alignment film on one of the pair of substrates is perpendicular to an alignment direction of liquid crystal molecules near a surface of the alignment film on the other substrate when the pair of substrates are viewed in plane.

17. The production method according to claim 16, wherein the liquid crystal layer includes liquid crystal molecules with negative dielectric anisotropy, and the alignment film aligns the liquid crystal molecules nearly vertically to a surface of the alignment film when no voltage is applied to the liquid crystal layer.

18. The production method according to claim 16, wherein the liquid crystal layer includes liquid crystal molecules with positive dielectric anisotropy, and the alignment film aligns the liquid crystal molecules nearly horizontally to a surface of the alignment film when no voltage is applied to the liquid crystal layer.

19. A liquid crystal display device produced by the production method according to claim 1.

* * * * *